US009447265B2

(12) United States Patent
Lam et al.

(10) Patent No.: US 9,447,265 B2
(45) Date of Patent: *Sep. 20, 2016

(54) POLYETHYLENE BLEND COMPOSITIONS AND FILM

(71) Applicant: NOVA Chemicals (International) S.A., Fribourg (CH)

(72) Inventors: Patrick Lam, Calgary (CA); Victoria Ker, Calgary (CA); Karen Grabow, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/741,770

(22) Filed: Jun. 17, 2015

(65) Prior Publication Data

US 2015/0284552 A1 Oct. 8, 2015

Related U.S. Application Data

(63) Continuation of application No. 14/107,356, filed on Dec. 16, 2013, now Pat. No. 9,096,745.

(30) Foreign Application Priority Data

Dec. 24, 2012 (CA) ..................................... 2800056

(51) Int. Cl.
*C08L 23/06* (2006.01)
*C08L 23/08* (2006.01)
*C08J 5/18* (2006.01)

(52) U.S. Cl.
CPC ........ *C08L 23/06* (2013.01); *C08J 5/18* (2013.01); *C08L 23/08* (2013.01); *C08L 23/0815* (2013.01); *C08L 2203/16* (2013.01); *C08L 2205/025* (2013.01); *C08L 2207/066* (2013.01)

(58) Field of Classification Search
CPC .... C08L 23/06; C08L 23/08; C08L 23/0815; C08L 2203/16; C08L 2207/066; C08L 2205/025; C08L 2314/06; C08J 5/18; C08F 210/00
See application file for complete search history.

(56) References Cited

U.S. PATENT DOCUMENTS

| | | |
|---|---|---|
| 2,825,721 A | 3/1958 | Hogan et al. |
| 3,023,203 A | 2/1962 | Dye |
| 3,248,179 A | 4/1966 | Norwood |
| 3,622,251 A | 11/1971 | Allen |
| 3,704,287 A | 11/1972 | Johnson |
| 4,011,382 A | 3/1977 | Levine et al. |
| 4,077,904 A | 3/1978 | Noshay et al. |
| 4,100,105 A | 7/1978 | Levine et al. |
| 4,115,639 A | 9/1978 | Brown et al. |
| 4,302,565 A | 11/1981 | Goeke et al. |
| 4,302,566 A | 11/1981 | Karol et al. |
| 4,325,849 A | 4/1982 | Rosen et al. |
| 4,482,687 A | 11/1984 | Noshay et al. |
| 4,543,399 A | 9/1985 | Jenkins, III et al. |
| 4,564,605 A | 1/1986 | Collomb-Ceccarini et al. |
| 4,588,790 A | 5/1986 | Jenkins, III et al. |
| 4,613,484 A | 9/1986 | Ayres et al. |
| 4,701,432 A | 10/1987 | Welborn, Jr. |
| 4,721,763 A | 1/1988 | Bailly et al. |
| 4,808,561 A | 2/1989 | Welborn, Jr. |
| 4,879,359 A | 11/1989 | Chamla et al. |
| 4,912,075 A | 3/1990 | Chang |
| 4,925,821 A | 5/1990 | Chang |
| 4,935,397 A | 6/1990 | Chang |
| 4,937,217 A | 6/1990 | Chang |
| 4,937,301 A | 6/1990 | Chang |
| 4,960,741 A | 10/1990 | Bailly et al. |
| 5,008,228 A | 4/1991 | Chang |
| 5,026,795 A | 6/1991 | Hogan |
| 5,028,670 A | 7/1991 | Chinh et al. |
| 5,057,475 A | 10/1991 | Canich et al. |
| 5,064,802 A | 11/1991 | Stevens et al. |
| 5,093,415 A | 3/1992 | Brady, III et al. |
| 5,096,867 A | 3/1992 | Canich |
| 5,132,380 A | 7/1992 | Stevens et al. |
| 5,206,075 A | 4/1993 | Hodgson, Jr. |
| 5,238,892 A | 8/1993 | Chang |
| 5,240,894 A | 8/1993 | Burkhardt et al. |
| 5,281,679 A | 1/1994 | Jejelowo et al. |
| 5,283,278 A | 2/1994 | Daire et al. |
| 5,288,933 A | 2/1994 | Kao et al. |
| 5,290,745 A | 3/1994 | Jorgensen et al. |

(Continued)

FOREIGN PATENT DOCUMENTS

| | | | |
|---|---|---|---|
| CA | 2 716 772 A1 | 4/2011 | |
| CA | 2 734 167 A1 | 9/2012 | |

(Continued)

OTHER PUBLICATIONS

Coulter, Iain M.; Jeremic, Dusan; Kazakov, Alexei; McKay, Ian D.; "Development of NOVA's Single Site Catalyst Technology for Use in the Gas Phase Process" presentation; Advances in Polyolefins II, Napa, California; Oct. 24-27, 1999.
Spence, Rupert; McKay, Ian; Carter, Charles; Koch, Linda; Jeremic, Dusan; Muir, James; Kazakov, Alex; "Cyclopentadienyl Phosphinimine Titanium Catalysts-Structure, Activity and Product Relationships in Heterogeneous Olefin Polymerisation" presentation; 2002 Canadian Society for Chemistry Conference. Spence, Rupert; McKay, Ian; Carter, Charles; Koch, Linda; Jeremic, Dusan; Muir, James; Kazakov, Alex; "Cyclopentadienyl Phosphinimine Titanium Catalysts-Structure, Activity and Product Relationships in Heterogeneous Olefin Polymerisation" presentation; 2002 Canadian Society for Chemistry Conference.
Wild, L; Ryle, T.R.; Knobelock, D.C.; and Peat, I.R.; Determination of Branching Distributions in Polyethylene and Ethylene Copolymers; Journal of Polymer Science: Polymer Physics Edition; vol. 20; (1982), pp. 441-455.

(Continued)

*Primary Examiner* — Nathan M Nutter
(74) *Attorney, Agent, or Firm* — Julie L. Heinrich

(57) ABSTRACT

A polymer blend comprising first and second polyethylene copolymers is presented which has good processability, and which when made into film shows good toughness-stiffness balance, reasonable MD tear, as well as good optical properties.

19 Claims, 11 Drawing Sheets

(56) References Cited

U.S. PATENT DOCUMENTS

| | | |
|---|---|---|
| 5,317,036 A | 5/1994 | Brady, III et al. |
| 5,324,800 A | 6/1994 | Welborn, Jr. et al. |
| 5,332,706 A | 7/1994 | Nowlin et al. |
| 5,346,925 A | 9/1994 | Sugano et al. |
| 5,352,749 A | 10/1994 | DeChellis et al. |
| 5,382,630 A | 1/1995 | Stehling et al. |
| 5,382,631 A | 1/1995 | Stehling et al. |
| 5,405,922 A | 4/1995 | DeChellis et al. |
| 5,420,220 A | 5/1995 | Cheruvu et al. |
| 5,422,325 A | 6/1995 | Jejelowo et al. |
| 5,453,471 A | 9/1995 | Bernier et al. |
| 5,462,999 A | 10/1995 | Griffin et al. |
| 5,466,649 A | 11/1995 | Jejelowo |
| 5,466,766 A | 11/1995 | Patsidis et al. |
| 5,468,702 A | 11/1995 | Jejelowo |
| 5,487,938 A | 1/1996 | Spencer et al. |
| 5,518,973 A | 5/1996 | Miro et al. |
| 5,525,678 A | 6/1996 | Mink et al. |
| 5,525,689 A | 6/1996 | Tsutsui et al. |
| 5,529,965 A | 6/1996 | Chang |
| 5,530,065 A | 6/1996 | Farley et al. |
| 5,548,014 A | 8/1996 | Tse et al. |
| 5,554,704 A | 9/1996 | Burkhardt et al. |
| 5,616,661 A | 4/1997 | Eisinger et al. |
| 5,625,015 A | 4/1997 | Brinen et al. |
| 5,629,253 A | 5/1997 | Chang |
| 5,633,394 A | 5/1997 | Welborn, Jr. et al. |
| 5,639,835 A | 6/1997 | Jejelowo |
| 5,643,847 A | 7/1997 | Walzer, Jr. |
| 5,665,665 A | 9/1997 | Brinen et al. |
| 5,668,228 A | 9/1997 | Chinh et al. |
| 5,677,375 A | 10/1997 | Rifi et al. |
| 5,677,383 A | 10/1997 | Chum et al. |
| 5,684,097 A | 11/1997 | Palmroos et al. |
| 5,698,487 A | 12/1997 | Sacchetti et al. |
| 5,703,187 A | 12/1997 | Timmers |
| 5,714,424 A | 2/1998 | Warthen et al. |
| 5,723,400 A | 3/1998 | Morini et al. |
| 5,723,402 A | 3/1998 | Pullukat et al. |
| 5,731,261 A | 3/1998 | Balducci et al. |
| 5,759,940 A | 6/1998 | Sacchetti et al. |
| 5,767,032 A | 6/1998 | Hokkanen et al. |
| 5,770,664 A | 6/1998 | Okumura et al. |
| 5,844,045 A | 12/1998 | Kolthammer et al. |
| 5,869,575 A | 2/1999 | Kolthammer et al. |
| 5,874,513 A | 2/1999 | Watanabe et al. |
| 5,965,677 A | 10/1999 | Stephan et al. |
| 5,972,510 A | 10/1999 | O'Hare et al. |
| 6,002,033 A | 12/1999 | Razavi et al. |
| 6,022,935 A | 2/2000 | Fischer et al. |
| 6,034,021 A | 3/2000 | Wilson et al. |
| 6,063,879 A | 5/2000 | Stephan et al. |
| 6,235,672 B1 | 5/2001 | McKay et al. |
| 6,248,845 B1 | 6/2001 | Loveday et al. |
| 6,255,426 B1 | 7/2001 | Lue et al. |
| 6,277,931 B1 | 8/2001 | Jaber et al. |
| 6,300,436 B1 | 10/2001 | Agapiou et al. |
| 6,306,984 B1 | 10/2001 | Agapiou et al. |
| 6,319,989 B1 | 11/2001 | Anderson et al. |
| 6,339,134 B1 | 1/2002 | Crowther et al. |
| 6,342,463 B1 | 1/2002 | Stephan et al. |
| 6,359,072 B1 | 3/2002 | Whaley |
| 6,372,864 B1 | 4/2002 | Brown |
| 6,384,158 B1 | 5/2002 | Bamberger et al. |
| 6,388,115 B1 | 5/2002 | Crowther et al. |
| 6,391,819 B1 | 5/2002 | Agapiou et al. |
| 6,399,535 B1 | 6/2002 | Shih et al. |
| 6,420,507 B1 | 7/2002 | Kale et al. |
| 6,441,116 B1 | 8/2002 | Shikuma et al. |
| 6,462,161 B1 | 10/2002 | Cady et al. |
| 6,469,103 B1 | 10/2002 | Jain et al. |
| 6,472,342 B2 | 10/2002 | Agapiou et al. |
| 6,476,171 B1 | 11/2002 | Lue et al. |
| 6,489,413 B1 | 12/2002 | Floyd et al. |
| 6,528,597 B2 | 3/2003 | Loveday et al. |
| 6,559,090 B1 | 5/2003 | Shih et al. |
| 6,562,905 B1 | 5/2003 | Nummila-Pakarinen et al. |
| 6,562,924 B2 | 5/2003 | Benazouzz et al. |
| 6,608,153 B2 | 8/2003 | Agapiou et al. |
| 6,642,340 B1 | 11/2003 | Takahashi et al. |
| 6,686,306 B2 | 2/2004 | Shih |
| 6,734,131 B2 | 5/2004 | Shih et al. |
| 6,777,509 B2 | 8/2004 | Brown et al. |
| 6,828,394 B2 | 12/2004 | Vaughan et al. |
| 6,932,592 B2 | 8/2005 | Farley et al. |
| 6,936,675 B2 | 8/2005 | Szul et al. |
| 6,956,088 B2 | 10/2005 | Farley et al. |
| 6,958,375 B2 | 10/2005 | Shih et al. |
| 6,984,695 B2 | 1/2006 | Brown et al. |
| 7,018,710 B2 | 3/2006 | Kallio et al. |
| 7,141,632 B2 | 11/2006 | Vaughan et al. |
| 7,166,676 B2 | 1/2007 | Jacobsen et al. |
| 7,172,816 B2 | 2/2007 | Szul et al. |
| 7,179,876 B2 | 2/2007 | Szul et al. |
| 7,235,606 B2 | 6/2007 | Spencer et al. |
| 7,354,880 B2 | 4/2008 | Agapiou et al. |
| 7,381,783 B2 | 6/2008 | Loveday et al. |
| 7,476,715 B2 | 1/2009 | McKay et al. |
| 7,521,518 B2 | 4/2009 | Jacobsen et al. |
| 7,531,602 B2 | 5/2009 | Hoang et al. |
| 7,534,847 B2 | 5/2009 | Mihan et al. |
| 7,601,409 B2 | 10/2009 | Ohlsson |
| 7,875,690 B2 | 1/2011 | Graham et al. |
| 7,952,873 B2 | 5/2011 | Glahn et al. |
| 7,968,659 B2 | 6/2011 | Chai |
| 8,080,294 B2 | 12/2011 | Lu |
| 8,084,560 B2 | 12/2011 | Kolb et al. |
| 8,114,946 B2 | 2/2012 | Yang et al. |
| 8,247,065 B2 | 8/2012 | Best et al. |
| 8,338,551 B2 | 12/2012 | Jacobsen et al. |
| 9,096,745 B2 * | 8/2015 | Lam ................ C08L 23/06 |
| 2006/0122054 A1 | 6/2006 | Hoang et al. |
| 2006/0188678 A1 | 8/2006 | Ohlsson et al. |
| 2007/0260016 A1 | 11/2007 | Best et al. |
| 2008/0045406 A1 | 2/2008 | McKay et al. |
| 2008/0108768 A1 | 5/2008 | Loveday et al. |
| 2008/0194780 A1 | 8/2008 | Kuo et al. |
| 2011/0003099 A1 | 1/2011 | Vinck |
| 2011/0040041 A1 | 2/2011 | Kolb et al. |
| 2011/0165395 A1 | 7/2011 | Van Hoyweghen et al. |
| 2011/0212315 A1 | 9/2011 | Fantinel et al. |
| 2012/0100356 A1 | 4/2012 | Ohlsson et al. |
| 2012/0302707 A1 | 11/2012 | Gao et al. |
| 2013/0345377 A1 | 12/2013 | Ker et al. |

FOREIGN PATENT DOCUMENTS

| | | |
|---|---|---|
| CA | 2 742 461 A1 | 12/2012 |
| EP | 0 102 503 A2 | 3/1984 |
| EP | 0 103 130 A2 | 3/1984 |
| EP | 0 107 127 A1 | 5/1984 |
| EP | 0 231 102 A2 | 8/1987 |
| EP | 0 659 773 A1 | 6/1995 |
| EP | 0 703 246 A1 | 3/1996 |
| EP | 1 308 464 A1 | 5/2003 |
| WO | 93/03093 A1 | 2/1993 |
| WO | 95/14044 A1 | 5/1995 |
| WO | 95/25141 A1 | 9/1995 |
| WO | 95/32995 A1 | 12/1995 |
| WO | 96/06187 A1 | 2/1996 |
| WO | 97/02297 A1 | 1/1997 |
| WO | 99/47598 A1 | 9/1999 |
| WO | 99/48605 A1 | 9/1999 |
| WO | 99/50311 A1 | 10/1999 |
| WO | 2011/129956 A1 | 10/2011 |

OTHER PUBLICATIONS

Hungenberg, K.D.; Kerth, J.; Langhauser, F.; Marczinke, B.; and Schlund, R.; Gas Phase Polymerization of alpha-Olefins with Ziegler-Natta and Metallocene Catalysts: a Comparison; Ziegler Catalysts (G. Fink, R. Mulhaupt and H.H. Brintzinger, eds., Springer-Verlag, 1995, pp. 363-386.

(56) References Cited

OTHER PUBLICATIONS

Hlatky, Gregory G.; Heterogeneous Single-Site Catalysts for Olefin Polymerization; Chem. Rev. (2000); 100, pp. 1347-1376.

Fink, Gerhard; Steinmets, Bernd; Zechlin, Joachim; Przybyla, Christian; and Tesche, Bernd; Propene Polymerization with Silica-Supported Metallocene/MAO Catalysts; Chem. Rev. 2000, 100, pOp. 1377-1390.

Peri, J.B. and Hensley, A.L., Jr.; The Surface Structure of Silica Gel; The Journal of Physical Chemistry, 72(8), 1968, pp. 2926-2933.

Brunauer, Stephen; Emmett, P.H. and Teller, Edward; Adsorption of Gases in Multimolecular Layers; Journal of the American Chemical Society, 1938, v. 60; pp. 309-319.

Clark, James H. and Macquarrie, Duncan J.; Catalysts, Supported; Kirk-Othmer Encylopedia of Chemical Technology, Copyright 2001 by John Wiley & Sons, Inc.; published online Nov. 15, 2002; vol. 5; pp. 322-344.

Pangborn, Amy B.; Giardello, Michael S.; Grubbs, Robert H.; Rosen, Robert K.; and Timmers, Francis J.; Safe and Convenient Procedure for Solvent Purification; Organometallics, 1996, vol. 15, No. 5, pp. 1518-1520.

Hieber, C.A.; and Chiang, H.H.; Some Correlations Involving the Shear Viscosity of Polystyrene Melts; Rheologica Acta, vol. 28, No. 4 (1989); pp. 321-332.

Hieber, C.A.; and Chiang, H.H.; Shear-Rate-Dependence Modeling of Polymer Melt Viscosity; Polymer Engineering and Science, Jul. 1992, vol. 32, No. 14, pp. 931-938.

Bird, R.B.; Armstrong, R.C.; and Hasseger, O.; Dynamics of Polymeric Liquids; Chapter 4: The Generalized Newtonian Fluid; vol. 1, Fluid Mechanics, 2nd Edition, John Wiley & Sons (1987); pp. 169-175.

\* cited by examiner

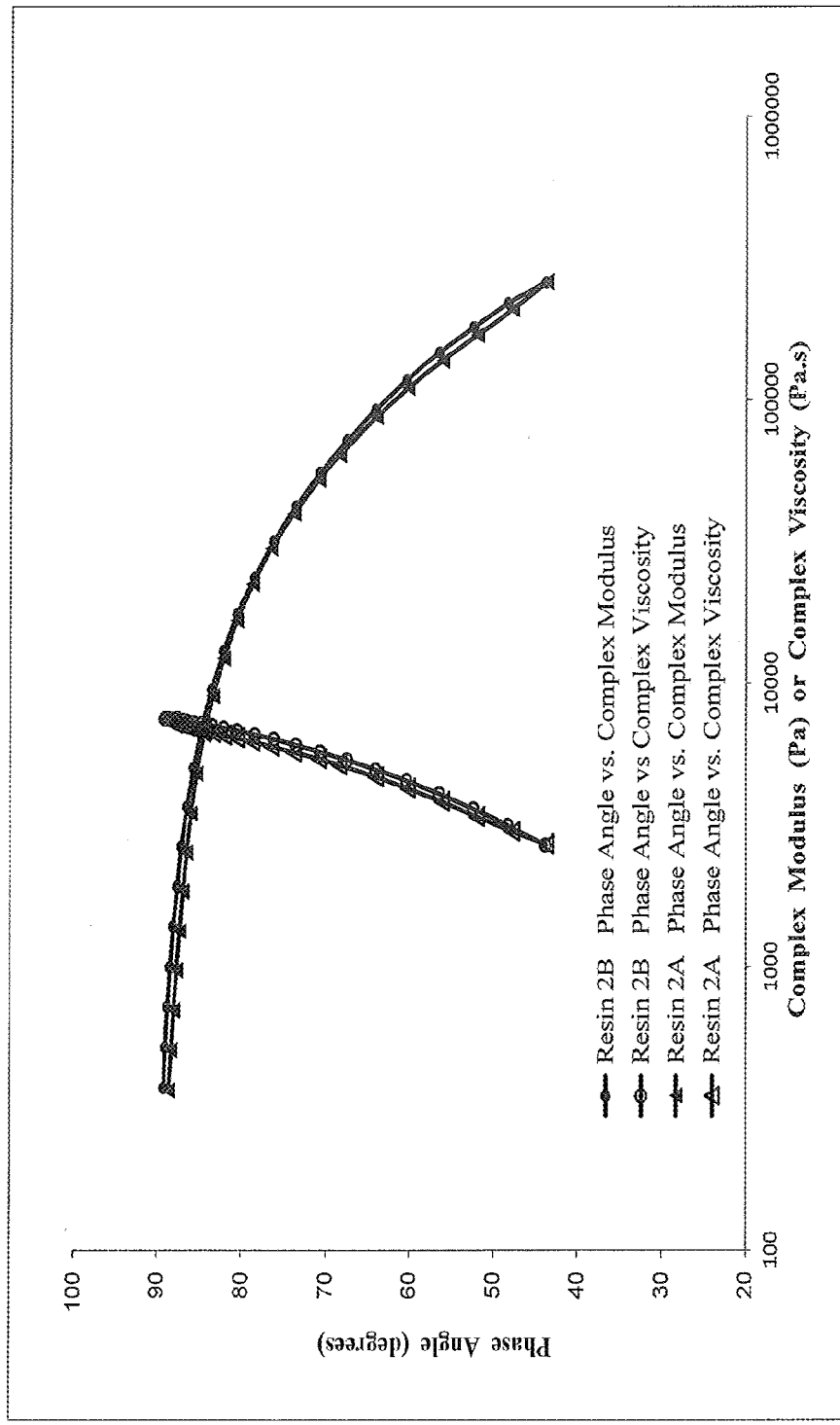

POLYETHYLENE BLEND COMPOSITIONS AND FILM

REFERENCE TO RELATED APPLICATION

This application is a continuation of U.S. Ser. No. 14/107,356, filed Dec. 16, 2013, which is entitled "Polyethylene Blend Compositions and Film" which is herein incorporated by reference in its entirety.

FIELD OF THE INVENTION

A polymer blend having good processability, good toughness-stiffness balance, and which shows good optical properties when made into films is presented. A polymer blend comprises from about 5 to about 95 wt % of a first polyethylene copolymer having a density of from about 0.916 to about 0.936 g/cm$^3$, a melt index ($I_2$) of from about 0.1 to about 2.0 g/10 min, a melt flow ratio ($I_{21}/I_2$) of from about 32 to about 50, a molecular weight distribution ($M_w/M_n$) of from about 3.6 to about 6.5, a reverse comonomer distribution profile as determined by GPC-FTIR, a multimodal TREF profile, and a composition distribution breadth index CDBI$_{50}$ of from about 45 to about 75 wt % as determined by TREF; and which satisfies at least one of the following relationships:

$(M_w/M_n) \geq 72[(I_{21}/I_2)^{-1} + 10^{-6}(M_n)]$;

$\delta^{XO}$ of from 55° to 70°;

$\delta^{XO} \leq 83.0 - 1.25(\text{CDBI}_{50})/(M_w/M_n)$; or $\delta^{XO} \leq 80.7 - (\text{CDBI}_{50})/(M_w/M_n)$ at a $\delta^{XO}$ of from 55° to 70°.

The balance of the polymer blend comprises a second polyethylene copolymer which is different from the first polyethylene copolymer.

BACKGROUND OF THE INVENTION

The search for polyethylene products having an improved balance of physical properties and processability has led to the development of products having improved output capacity and ever improving end use properties such as enhanced film tear or dart impact properties.

In co-pending CA Pat. Appl. No. 2,734,167, we showed that suitably substituted phosphinimine catalysts gave narrow molecular weight distribution copolymers which when made into film showed a good balance of optical and physical properties.

Polymers and films made in the gas phase using various single site catalysts, including so called "phosphinimine" catalysts, were disclosed at Advances in Polyolefins II, Napa, California—Oct. 24-27, 1999 ("Development of NOVA's Single Site Catalyst Technology for use in the Gas Phase Process"—I. Coulter; D. Jeremic; A. Kazakov; I. McKay).

In a disclosure made at the 2002 Canadian Society for Chemistry Conference ("Cyclopentadienyl Phosphinimine Titanium Catalysts—Structure, Activity and Product Relationships in Heterogeneous Olefin Polymerization." R. P. Spence; I. McKay; C. Carter; L. Koch; D. Jeremic; J. Muir; A. Kazakov. NOVA Research and Technology Center, CIC, 2002), it was shown that phosphinimine catalysts bearing variously substituted cyclopentadienyl and indenyl ligands were active toward the gas phase polymerization of ethylene when in supported form.

There is still potential for new blend compositions exhibiting a good balance of physical properties and good processability.

SUMMARY OF INVENTION

Provided are polymer blends having good processability, good toughness-stiffness balance, and which show good optical properties when made into films.

Provided is a polymer blend comprising a polyethylene copolymer having a density of from about 0.916 to about 0.936 g/cm$^3$, a melt index ($I_2$) of from about 0.1 to about 2.0 g/10 min, a melt flow ratio ($I_{21}/I_2$) of from about 32 to about 50, a molecular weight distribution ($M_w/M_n$) of from about 3.6 to about 6.5, a reverse comonomer distribution profile as determined by GPC-FTIR, a multimodal TREF profile, a composition distribution breadth index CDBI$_{50}$ of from about 45 wt % to about 75 wt % as determined by TREF and which satisfies at least one of the following relationships:

$(M_w/M_n) \geq 72[(I_{21}/I_2)^{-1} + 10^{-6}(M_n)]$;

$\delta^{XO}$ of from 55° to 70°;

$\delta^{XO} \leq 83.0 - 1.25(\text{CDBI}_{50})/(M_w/M_n)$; or $\delta^{XO} \leq 80.7 - (\text{CDBI}_{50})/(M_w/M_n)$ at a $\delta^{XO}$ of from 55° to 70°.

Provided is a polymer blend comprising from about 5 to about 99 wt % based on the total weight of the polymer blend, of a polyethylene copolymer having a density of from about 0.916 to about 0.936 g/cm$^3$, a melt index ($I_2$) of from about 0.1 to about 2.0 g/10 min, a melt flow ratio ($I_{21}/I_2$) of from about 32 to about 50, a molecular weight distribution ($M_w/M_n$) of from about 3.6 to about 6.5, a reverse comonomer distribution profile as determined by GPC-FTIR, a multimodal TREF profile, a composition distribution breadth index CDBI$_{50}$ of from about 45 wt % to about 75 wt % as determined by TREF and which satisfies at least one of the following relationships:

$(M_w/M_n) \geq 72[(I_{21}/I_2)^{-1} + 10^{-6}(M_n)]$;

$\delta^{XO}$ of from 55° to 70°;

$\delta^{XO} \leq 83.0 - 1.25(\text{CDBI}_{50})/(M_w/M_n)$; or $\delta^{XO} \leq 80.7 - (\text{CDBI}_{50})/(M_w/M_n)$ at a $\delta^{XO}$ of from 55° to 70°.

Provided is a polymer blend comprising: a) from about 5 to about 95 wt % of a first polyethylene copolymer having a density of from about 0.916 to about 0.936 g/cm$^3$, a melt index ($I_2$) of from about 0.1 to about 2.0 g/10 min, a melt flow ratio ($I_{21}/I_2$) of from about 32 to about 50, a molecular weight distribution ($M_w/M_n$) of from about 3.6 to about 6.5, a reverse comonomer distribution profile as determined by GPC-FTIR, a multimodal TREF profile, a composition distribution breadth index CDBI$_{50}$ of from about 45 wt % to about 75 wt % as determined by TREF and which further satisfies the relationship: $(M_w/M_n) \geq 72 \ [(I_{21}/I_2)^{-1} + 10^{-6}(M_n)]$; and b) from about 95 to about 5 wt % of a second polyethylene copolymer which is a linear low density polyethylene (LLDPE) different from the first polyethylene copolymer and having a density of from about 0.910 to about 0.940 g/cm$^3$, a melt index ($I_2$) of from about 0.2 to about 5.0 g/10 min, and a melt flow ratio ($I_{21}/I_2$) of less than about 35.

Provided is a polymer blend comprising: a) from about 5 to about 95 wt % of a first polyethylene copolymer having a density of from about 0.916 to about 0.936 g/cm³, a melt index ($I_2$) of from about 0.1 to about 1.0 g/10 min, a melt flow ratio ($I_{21}/I_2$) of from about 32 to about 50, a molecular weight distribution ($M_w/M_n$) of from about 3.6 to about 6.5, a reverse comonomer distribution profile as determined by GPC-FTIR, a multimodal TREF profile, a composition distribution breadth index $CDBI_{50}$ of from about 45 wt % to about 75 wt % as determined by TREF and which further satisfies the relationship: $(M_w/M_n) \geq 72 \ [(I_{21}/I_2)^{-1}+10^{-6} (M_n)]$; and b) from about 95 to about 5 wt % of a second polyethylene copolymer which is a linear low density polyethylene (LLDPE) having a density of from about 0.910 to about 0.940 g/cm³, a melt index ($I_2$) of from about 0.2 to about 5.0 g/10 min, and a melt flow ratio ($I_{21}/I_2$) of less than about 32.

Provided is a polymer blend comprising: a) from about 5 to about 95 wt % of a first polyethylene copolymer having a density of from about 0.916 to about 0.936 g/cm³, a melt index ($I_2$) of from about 0.1 to about 1.0 g/10 min, a melt flow ratio ($I_{21}/I_2$) of at least about 30, a molecular weight distribution ($M_w/M_n$) of from about 3.6 to about 6.5, a reverse comonomer distribution profile as determined by GPC-FTIR, a multimodal TREF profile, a composition distribution breadth index $CDBI_{50}$ of from about 45 wt % to about 75 wt % as determined by TREF and which further satisfies the relationship: $(M_w/M_n) \geq 72 \ [(I_{21}/I_2)^{-1}+10^{-6} (M_n)]$; and b) from about 95 to about 5 wt % of a second polyethylene copolymer which is a linear low density polyethylene (LLDPE) having a density of from about 0.910 to about 0.940 g/cm³, a melt index ($I_2$) of from about 0.2 to about 5.0 g/10 min, and a melt flow ratio ($I_{21}/I_2$) of less than about 35.

BRIEF DESCRIPTION OF DRAWINGS

FIG. 4A show plots of the phase angle vs the complex modulus and the phase angle vs. complex viscosity for resins 2A and 2B as determined by dynamic mechanical analysis (DMA).

DETAILED DESCRIPTION

Figure 1A:
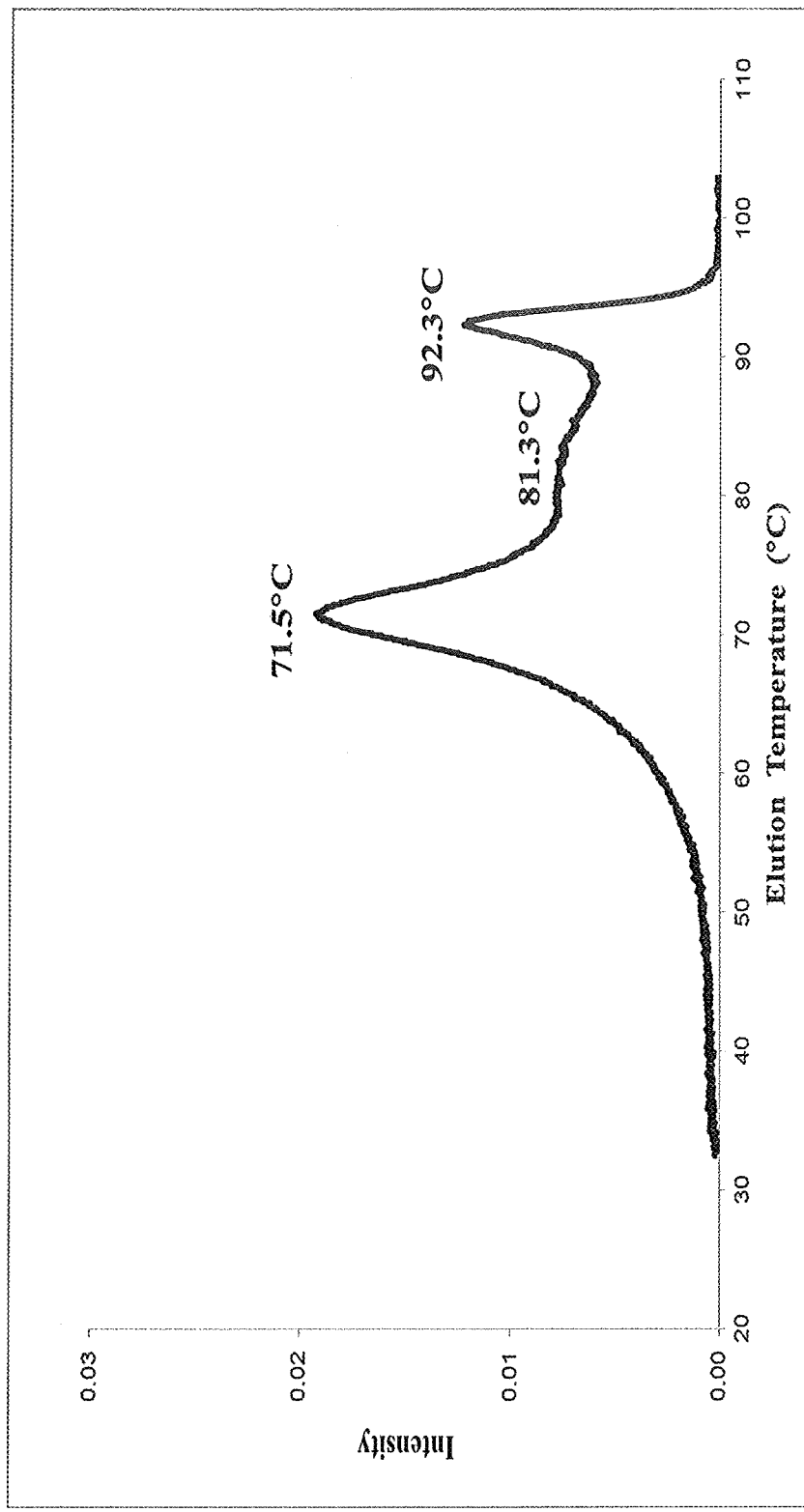
FIG. 1A shows a temperature rising elution fractionation (TREF) analysis and profile of a first polyethylene copolymer used according to the present invention.

Other than in the operating examples or where otherwise indicated, all numbers or expressions referring to quantities of ingredients, reaction conditions, etc. used in the specification and claims are to be understood as modified in all instances by the term "about." Accordingly, unless indicated to the contrary, the numerical parameters set forth in the following specification and attached claims are approximations that can vary depending upon the desired properties, which the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, that the amounts of the components actually used will conform to the maximum of 100 percent.

We recently developed a new polymer composition having good processability and good physical properties. The polymer composition, which can be made with a phosphinimine catalyst, has a density of from 0.916 g/cm³ to 0.930 g/cm³, a melt index ($I_2$) of from about 0.1 to about 1.0 g/10 min, a melt flow ratio ($I_{21}/I_2$) of from about 32 to about 50, a molecular weight distribution ($M_w/M_n$) of from 3.6 to 6.0, a reverse comonomer distribution profile as determined by GPC-FTIR, a multimodal TREF profile, and a composition distribution breadth index $CDBI_{50}$ of from 35 to 70 wt % as determined by TREF. We now report on polymer blends comprising a similar polymer composition and have found that the copolymer composition improves melt strength, shear thinning behavior and dart impact properties when blended with other linear low density polyethylenes, and brings about good stiffness-toughness balance, and good optical properties when blends comprising the copolymer composition are made into films.

In some embodiments, the present invention provides polymer blends which have good processability and melt strength and, when made into film, have a relatively high dart impact strength, as well as good optical properties.

In an embodiment of the invention, the polymer blend comprises a polyethylene copolymer having a density of from about 0.916 to about 0.936 g/cm³, a melt index ($I_2$) of from about 0.1 to about 2.0 g/10 min, a melt flow ratio ($I_{21}/I_2$) of from about 32 to about 50, a molecular weight distribution ($M_w/M_n$) of from about 3.6 to about 6.5, a reverse comonomer distribution profile as determined by GPC-FTIR, a multimodal TREF profile, and a composition distribution breadth index $CDBI_{50}$ of from about 45 to about 75 wt % as determined by TREF; and which satisfies at least one of the following relationships:

$$(M_w/M_n) \geq 72[(I_{21}/I_2)^{-1}+10^{-6}(M_n)];$$

$$\delta^{XO} \text{ of from } 55° \text{ to } 70°;$$

$$\delta^{XO} \leq 83.0 - 1.25(CDBI_{50})/(M_w/M_n); \text{ or}$$

$$\delta^{XO} \leq 80.7 - (CDBI_{50})/(M_w/M_n) \text{ at a } \delta^{XO} \text{ of from } 55° \text{ to } 70°.$$

As used herein, the terms "linear low density polyethylene" and "LLDPE" refer to a polyethylene homopolymer or, a copolymer having a density of from about 0.910 g/cm³ to about 0.945 g/cm³. Unlike high pressure low density polyethylene (HPLDPE), the LLDPE is a linear polymer that contains a minimal amount or relatively small amount, or zero amounts of long chain branching compared to HPLDPE. HPLDPE, in contrast, is often referred to as "branched" because it has a relatively large number of long chain branches extending from the main polymer backbone.

In the present invention, the term "polyethylene copolymer" is used interchangeably with the term "ethylene copolymer", or "copolymer" and both connote a polymer comprising polymerized ethylene units and at least one type of polymerized alpha olefin with ethylene being the majority monomer present.

The comonomers that are useful in general for making polyethylene copolymers include α-olefins, such as $C_3$-$C_{20}$ alpha-olefins, or $C_3$-$C_{10}$ alpha-olefins, or $C_3$-$C_8$ alpha-olefins. The α-olefin comonomer may be linear or branched, and two or more comonomers may be used, if desired. Examples of suitable comonomers include propylene; 1-butene; 1-pentene; 1-pentene with one or more methyl, ethyl, or propyl substituents; 1-hexene; 1-hexene with one or more methyl, ethyl, or propyl substituents; 1-heptene; 1-heptene with one or more methyl, ethyl, or propyl substituents; 1-octene; 1-octene with one or more methyl, ethyl, or propyl substituents; 1-nonene; 1-nonene with one or more methyl, ethyl, or propyl substituents; ethyl, methyl, or dimethyl-substituted 1-decene; 1-dodecene; and styrene. Without limitation, the combinations of ethylene with a comonomer may include: ethylene propylene, ethylene butene, ethylene 1-pentene; ethylene 4-methyl-1-pentene; ethylene 1-hexene; ethylene 1-octene; ethylene decene; ethylene dodecene; ethylene 1-hexene 1-pentene; ethylene 1-hexene 4-methyl-1-pentene; ethylene 1-hexene 1-octene; ethylene 1-hexene decene; ethylene 1-hexene dodecene; ethylene 1-octene 1-pentene; ethylene 1-octene 4-methyl-1-pentene; ethylene 1-octene 1-hexene, ethylene 1-octene decene; ethylene 1-octene dodecene; combinations thereof and like permutations.

Polyethylene copolymers having more than two types of monomers, such as terpolymers, are also included within the term "copolymer" as used herein.

In embodiments of the invention, the first and second polyethylene copolymer blend components will comprise at least about 75 weight % of ethylene units, or at least about 80 wt % of ethylene units, or at least about 85 wt % of ethylene units with the balance being an alpha-olefin unit, based on the weight of each blend component.

The term "polymer blend" is herein meant to connote a dry blend of two different polymers, in-reactor blends, including blends arising from the use of multi or mixed catalyst systems in a single reactor zone, and blends that result from the use of one or more catalysts in one or more reactors under the same or different conditions (e.g., a blend resulting from in series reactors each running under different conditions and/or with different catalysts).

In an embodiment of the invention, the polymer blend will comprise a first polyethylene copolymer and a second polyethylene copolymer, each of which are described further below.

The First Polyethylene Copolymer

In some embodiments, the polymer blends of the present invention comprises from about 1 to about 99 wt % of a first polyethylene copolymer which in an embodiment of the invention has a density of from about 0.916 g/cm³ to about 0.936 g/cm³, a melt index ($I_2$) of from about 0.1 to about 2.0 g/10 min, a melt flow ratio ($I_{21}/I_2$) of at least about 28, a molecular weight distribution ($M_w/M_n$) of from about 3.0 to about 7.0, a reverse comonomer distribution profile as determined by GPC-FTIR, a multimodal TREF profile, and a composition distribution breadth index $CDBI_{50}$ of from about 35 to about 75 wt % as determined by TREF.

In an embodiment of the invention, the first polyethylene copolymer satisfies the following relationship: $(M_w/M_n) \geq 72[(I_{21}/I_2)^{-1}+10^{-6}(M_n)]$, where Mw/Mn is the molecular weight distribution, Mw is the weight average molecular weight, Mn is the number average molecular weight, $I_2$ is the melt index in g/10 min, and $I_{21}$ is the high load melt index in g/10 min.

In embodiments of the invention, the first polyethylene copolymer has a $\delta^{XO}$ of less than about 70° or from about 55° to about 70°, where $\delta^{XO}$ is the crossover phase angle from a Van Gurp-Palmen (VGP) plot as determined by dynamic mechanical analysis (DMA).

In an embodiment of the invention, the first polyethylene copolymer satisfies the following relationship: $\delta^{XO} \leq 83.0 - 1.25 (CDBI_{50})/(M_w/M_n)$, where $\delta^{XO}$ is the crossover phase angle from a Van Gurp-Palmen (VGP) plot as determined by dynamic mechanical analysis (DMA) and $CDBI_{50}$ is the comonomer distribution breadth index as determined by TREF analysis.

In an embodiment of the invention, the first polyethylene copolymer satisfies the following relationship: $\delta^{XO} \leq 80.7 - (CDBI_{50})/(M_w/M_n)$ at a $\delta^{XO}$ of from about 55° to about 70°, where $\delta^{XO}$ is the crossover phase angle from a Van Gurp-Palmen (VGP) plot as determined by dynamic mechanical analysis (DMA) and $CDBI_{50}$ is the comonomer distribution breadth index as determined by TREF analysis.

In an embodiment of the invention, the first polyethylene copolymer satisfies one or more of the following relationships:

$(M_w/M_n) \geq 72 [(I_{21}/I_2)^{-1} + 10^{-6} (M_n)]$, where Mw/Mn is the molecular weight distribution, Mw is the weight average molecular weight, Mn is the number average molecular weight, $I_2$ is the melt index in g/10 min, and $I_{21}$ is the high load melt index in g/10 min;

$\delta^{XO}$ of from about 55° to about 70°, where $\delta^{XO}$ is the crossover phase angle from a Van Gurp-Palmen (VGP) plot as determined by dynamic mechanical analysis (DMA);

$\delta^{XO} \leq 83.0 - 1.25 (CDBI_{50})/(M_w/M_n)$, where $\delta^{XO}$ is the crossover phase angle from a Van Gurp-Palmen (VGP) plot as determined by dynamic mechanical analysis (DMA) and $CDBI_{50}$ is the comonomer distribution breadth index as determined by TREF analysis; and $\delta^{XO} \leq 80.7 - (CDBI_{50})/(M_w/M_n)$ at a $\delta^{XO}$ of from about 55° to about 70°, where $\delta^{XO}$ is the crossover phase angle from a Van Gurp-Palmen (VGP) plot as determined by dynamic mechanical analysis (DMA) and $CDBI_{50}$ is the comonomer distribution breadth index as determined by TREF analysis.

In embodiments of the invention, the first polyethylene copolymer is a copolymer of ethylene and an alpha olefin selected from 1-butene, 1-hexene and 1-octene.

In an embodiment of the invention, the first polyethylene copolymer is a copolymer of ethylene and 1-hexene.

In embodiments of the invention, the first polyethylene copolymer composition will comprise at least about 75 weight % of ethylene units, or at least about 80 wt % of ethylene units, or at least about 85 wt % of ethylene units with the balance being an alpha-olefin unit, based on the weight of the ethylene copolymer composition.

In embodiments of the invention, the first polyethylene copolymer will have a melt index ($I_2$) of from about 0.01 to about 3.0 g/10 min, or from about 0.1 to about 2.5 g/10 min, or from about 0.1 to about 2.0 g/10 min, or from about 0.25 to about 2.0 g/10 min, or from about 0.01 to about 1.0 g/10 min, or from about 0.1 to about 1.0 g/10 min, or less than about 1.0 g/10 min, or from about 0.1 to less than about 1.0 g/10 min, or from about 0.25 to about 1.0 g/10 min, or from about 0.25 to about 0.9 g/10 min, or from about 0.25 to about 0.80 g/10 min, or from about 0.2 to about 0.9 g/10 min, or from about 0.20 to about 0.85 g/10 min, or from about 0.25 to about 0.85 g/10 min. In embodiments of the invention, the first polyethylene copolymer will have a melt index ($I_2$) of from greater than about 1.0 to about 2.0 g/10 min, or from greater than about 1.0 to about 1.75 g/10 min, or from greater than about 1.0 to about 1.5 g/10 min.

In an embodiment of the invention, the first polyethylene copolymer has a melt index ($I_2$) of less than about 1.0 g/10 min.

In an embodiment of the invention, the first polyethylene copolymer has melt index ($I_2$) of from about 0.25 to about 0.80 g/10 min.

In embodiments of the invention, the first polyethylene copolymer will have a density of from about 0.916 g/cc to about 0.936 g/cc including narrower ranges within this range, such as for example, from about 0.916 g/cc to about 0.935 g/cc, or from about 0.916 g/cc to about 0.932 g/cc, or from about 0.916 g/cc to about 0.930 g/cc, or from about 0.917 g/cc to about 0.932 g/cc, or from about 0.917 g/cc to about 0.930 g/cc, or from about 0.916 g/cc to about 0.925 g/cc, or from about 0.917 g/cc to about 0.927 g/cc, or from about 0.917 g/cc to about 0.926 g/cc, or from about 0.917 g/cc to about 0.925 g/cc, or from about 0.917 g/cc to about 0.923 g/cc, or from about 0.918 g/cc to about 0.932 g/cc, or from about 0.918 g/cc to about 0.930 g/cc, or from about 0.918 to about 0.930 g/cc, or from about 0.918 to about 0.928 g/cc, or from about 0.920 to about 0.935 (note: "g" stands for gram; "cc" stands for cubic centimeter, $cm^3$).

In an embodiment of the invention, the first polyethylene copolymer will have a density of from about 0.916 g/cc to about 0.936 g/cc. In an embodiment of the invention, the first polyethylene copolymer will have a density of greater than about 0.916 g/cc to less than about 0.930 g/cc. In an embodiment of the invention, the first polyethylene copolymer will have a density of from about 0.917 g/cc to about 0.927 g/cc. In an embodiment of the invention, the first polyethylene copolymer composition will have a density of from about 0.918 g/cc to about 0.927 g/cc.

The first polyethylene copolymer may have a unimodal, broad unimodal, bimodal, or multimodal profile in a gel permeation chromatography (GPC) curve generated according to the method of ASTM D6474-99. The term "unimodal" is herein defined to mean there will be one significant peak or maximum evident in the GPC-curve. A unimodal profile includes a broad unimodal profile. By the term "bimodal", it is meant that there will be a secondary peak or shoulder which represents a higher or lower molecular weight component (i.e., the molecular weight distribution, can be said to have two maxima in a molecular weight distribution curve). Alternatively, the term "bimodal" connotes the presence of two maxima in a molecular weight distribution curve generated according to the method of ASTM D6474-99. The term "multi-modal" denotes the presence of two or more maxima in a molecular weight distribution curve generated according to the method of ASTM D6474-99.

In an embodiment of the invention, the first polyethylene copolymer will have a unimodal profile in a gel permeation chromatography (GPC) curve generated according to the method of ASTM D6474-99.

In embodiments of the invention, the first polyethylene copolymer will exhibit a weight average molecular weight ($M_w$) as determined by gel permeation chromatography (GPC) of from about 30,000 to about 250,000, including narrower ranges within this range, such as, for example, from about 50,000 to about 200,000, or from about 50,000 to about 175,000, or from about 75,000 to about 150,000, or from about 80,000 to about 130,000.

In embodiments of the invention, the first polyethylene copolymer will exhibit a number average molecular weight ($M_n$) as determined by gel permeation chromatography (GPC) of from about 5,000 to about 100,000 including narrower ranges within this range, such as for example from about 7,500 to about 100,000, or from about 7,500 to about 75,000, or from about 7,500 to about 50,000, or from about 10,000 to about 100,000, or from about 10,000 to about 75,000, or from about 10,000 to about 50,000.

In embodiments of the invention, the first polyethylene copolymer will exhibit a Z-average molecular weight ($M_Z$) as determined by gel permeation chromatography (GPC) of from about 50,000 to about 1,000,000 including narrower ranges within this range, such as for example from about 75,000 to about 750,000, or from about 100,000 to about 00,000, or from about 100,000 to about 400,000, or from about 125,000 to about 375,000, or from about 150,000 to about 350,000, or from about 175,000 to about 375,000, or from about 175,000 to about 400,000, or from about 200,000 to about 400,000, or from about 225,000 to about 375,000.

In embodiments of the invention, the first polyethylene copolymer will have a molecular weight distribution ($M_w/M_n$) as determined by gel permeation chromatography (GPC) of from about 3.0 to about 7.0, including narrower ranges within this range, such as, for example, from about 3.5 to about 7.0, or from about 3.5 to about 6.5, or from about 3.0 to about 6.5, or from about 3.6 to about 6.5, or from about 3.6 to about 6.0, or from about 3.5 to about 5.5, or from about 3.6 to about 5.5, or from about 3.5 to about 5.0, or from about 4.0 to about 6.0, or from about 4.0 to about 5.5.

In an embodiment of the invention, the first polyethylene copolymer has a molecular weight distribution ($M_w/M_n$) of from about 4.0 to about 5.5.

In embodiments of the invention, the first polyethylene copolymer will have a Z-average molecular weight distribution ($M_z/M_w$) as determined by gel permeation chromatography (GPC) of from about 2.0 to about 5.5, including narrower ranges within this range, such as for example, from about 2.0 to about 5.0, or from about 2.0 to about 4.5, or from about 2.0 to about 4.0, or from about 2.0 to about 2.5, or from about 2.0 to about 3.0, or from about 2.0 to about 3.5.

In an embodiment of the invention, the first polyethylene copolymer has a Z-average molecular weight distribution ($M_z/M_w$) of from about 2.0 to about 4.0.

In an embodiment of the invention, the first ethylene copolymer will have a flat comonomer incorporation profile as measured using Gel-Permeation Chromatography with Fourier Transform Infra-Red detection (GPC-FTIR). In an embodiment of the invention, the first ethylene copolymer will have a negative (i.e., "normal") comonomer incorporation profile as measured using GPC-FTIR. In an embodiment of the invention, the first ethylene copolymer will have an inverse (i.e., "reverse") or partially inverse comonomer incorporation profile as measured using GPC-FTIR. If the comonomer incorporation decreases with molecular weight, as measured using GPC-FTIR, the distribution is described as "normal" or "negative". If the comonomer incorporation is approximately constant with molecular weight, as measured using GPC-FTIR, the comonomer distribution is described as "flat" or "uniform". The terms "reverse comonomer distribution" and "partially reverse comonomer distribution" mean that in the GPC-FTIR data obtained for the copolymer, there is one or more higher molecular weight components having a higher comonomer incorporation than in one or more lower molecular weight segments. The term "reverse(d) comonomer distribution" is used herein to mean, that across the molecular weight range of the ethylene copolymer, comonomer contents for the various polymer fractions are not substantially uniform and the higher molecular weight fractions thereof have proportionally higher comonomer contents (i.e., if the comonomer incorporation rises with molecular weight, the distribution is described as "reverse" or "reversed"). Where the comonomer incorporation rises with increasing molecular weight and then declines slightly or where the comonomer incorporation initially declines with molecular weight and then rises at still higher molecular weight, the comonomer distribution is still considered "reverse", but may also be described as "partially reverse".

In an embodiment of the invention, the first polyethylene copolymer will have a reversed comonomer incorporation profile as measured using GPC-FTIR.

In an embodiment of the invention, the first polyethylene copolymer will have a comonomer incorporation profile as determined by GPC-FTIR which satisfies the following condition: SCB/1000 at MW of 200,000−SCB/1000 at MW of 50,000 is a positive number or greater than 1.0; where "−" is a minus sign, SCB/1000 is the comonomer content determined as the number of short chain branches per thousand carbons and MW is the corresponding molecular weight (i.e., the absolute molecular weight) on a GPC or GPC-FTIR chromatograph.

In an embodiment of the invention, the first polyethylene copolymer will have a comonomer incorporation profile as determined by GPC-FTIR which satisfies the following condition: SCB/1000 at MW of 200,000−SCB/1000 at MW of 50,000>2.0; where SCB/1000 is the comonomer content determined as the number of short chain branches per thousand carbons and MW is the corresponding molecular weight (i.e., the absolute molecular weight) on a GPC or GPC-FTIR chromatograph.

In an embodiment of the invention, the first polyethylene copolymer will have a comonomer incorporation profile as determined by GPC-FTIR which satisfies the following condition: SCB/1000C at MW of 200,000−SCB/1000C at MW of 50,000>3.0; where SCB/1000C is the comonomer content determined as the number of short chain branches per thousand carbons and MW is the corresponding molecular weight (i.e., the absolute molecular weight) on a GPC or GPC-FTIR chromatograph.

In an embodiment of the invention, the first polyethylene copolymer will have a comonomer incorporation profile as determined by GPC-FTIR which satisfies the following condition: SCB/1000C at MW of 200,000−SCB/1000C at MW of 50,000>4.0; where SCB/1000C is the comonomer content determined as the number of short chain branches per thousand carbons and MW is the corresponding molecular weight (i.e., the absolute molecular weight) on a GPC or GPC-FTIR chromatograph.

In an embodiment of the invention, the first polyethylene copolymer will have a comonomer incorporation profile as determined by GPC-FTIR which satisfies the following condition: SCB/1000 at MW of 200,000−SCB/1000 at MW of 50,000>5.0; where SCB/1000 is the comonomer content determined as the number of short chain branches per thousand carbons and MW is the corresponding molecular weight (i.e., the absolute molecular weight) on a GPC or GPC-FTIR chromatograph.

In an embodiment of the invention, the first polyethylene copolymer will have a comonomer incorporation profile as determined by GPC-FTIR which satisfies the following condition: SCB/1000 at MW of 200,000−SCB/1000 at MW of 50,000>6.0; where SCB/1000 is the comonomer content determined as the number of short chain branches per thousand carbons and MW is the corresponding molecular weight (i.e., the absolute molecular weight) on a GPC or GPC-FTIR chromatograph.

In an embodiment of the invention, the first polyethylene copolymer will have a comonomer incorporation profile as determined by GPC-FTIR which satisfies the following condition: SCB/1000C at MW of 200,000−SCB/1000C at MW of 50,000 of from about 2.0 to about 8.0 including narrower ranges within this range; where SCB/1000C is the comonomer content determined as the number of short chain branches per thousand carbons and MW is the corresponding molecular weight (i.e., the absolute molecular weight) on a GPC or GPC-FTIR chromatograph.

In an embodiment of the invention, the first polyethylene copolymer will have a comonomer incorporation profile as determined by GPC-FTIR which satisfies the following condition: SCB/1000C at MW of 200,000–SCB/1000C at MW of 50,000 of from about 3.0 to about 7.0 including narrower ranges within this range; where SCB/1000C is the comonomer content determined as the number of short chain branches per thousand carbons and MW is the corresponding molecular weight (i.e., the absolute molecular weight) on a GPC or GPC-FTIR chromatograph.

In embodiments of the invention, the first polyethylene copolymer will have a melt flow ratio (the MFR=$I_{21}/I_2$) of from about 28 to about 60, or from about 30 to about 60 or from about 32 to about 60. In further embodiments of the invention, the copolymer will have an $I_{21}/I_2$ of at least about 28, or at least about 30, or from about 30 to about 55, or from about 30 to about 50, or from about 30 to about 45, or from about 32 to about 50 or from about 35 to about 55, or from about 36 to about 50, or from about 36 to about 48, or from about 36 to about 46, or from about 35 to about 50, or from greater than about 35 to less than about 50, or from greater than about 35 to about 50.

In an embodiment of the invention, the first polyethylene copolymer has a melt flow ratio ($I_{21}/I_2$) of from about 32 to about 50. In an embodiment of the invention, the first polyethylene copolymer has a melt flow ratio ($I_{21}/I_2$) of from about 35 to about 50. In an embodiment of the invention, the first polyethylene copolymer has a melt flow ratio ($I_{21}/I_2$) of from about 36 to about 50.

In embodiments of the invention, the first polyethylene copolymer will have a composition distribution breadth index $CDBI_{50}$, as determined by temperature elution fractionation (TREF) of from about 40% to about 75% by weight, or from about 45% to about 75% by weight, or from about 50% to about 75% by weight, or from about 55% to about 75% by weight, or from about 60% to about 75% by weight. In embodiments of the invention, the first polyethylene copolymer will have a $CDBI_{50}$ of from about 50% to about 70%, or about 55% to about 70%, or from about 50% to about 69%, or from about 55% to about 69%, or from about 55% to about 65%, or from about 60% to about 75%, or from about 60% to about 70%, or from about 60% to about 69%, or from about 55% to about 67%, or from about 60% to about 66% (by weight).

In an embodiment of the invention, the first polyethylene copolymer has a $CDBI_{50}$ of from about 50 wt % to about 77 wt %. In an embodiment of the invention, the first polyethylene copolymer has a $CDBI_{50}$ of from about 55 wt % to about 75 wt %. In an embodiment of the invention, the first polyethylene copolymer has a $CDBI_{50}$ of from about 60 wt % to about 73 wt %.

The composition distribution of a polyethylene copolymer may also be characterized by the T(75)-T(25) value, where the T(25) is the temperature at which about 25 wt % of the eluted copolymer is obtained, and T(75) is the temperature at which about 75 wt % of the eluted copolymer is obtained in a TREF experiment as described in the Examples section.

In an embodiment of the present invention, the first polyethylene copolymer will have a T(75)-T(25) of from about 5 to about 25° C. as determined by TREF. In an embodiment of the present invention, the first polyethylene copolymer will have a T(75)-T(25) of from about 7 to about 25° C. as determined by TREF. In an embodiment of the present invention, the first polyethylene copolymer will have a T(75)-T(25) of from about 10 to about 25° C. as determined by TREF. In an embodiment of the present invention, the first polyethylene copolymer will have a T(75)-T(25) of from about 7 to about 22.5° C. as determined by TREF. In an embodiment of the present invention, the first polyethylene copolymer will have a T(75)-T(25) of from about 7.0 to about 20° C. as determined by TREF. In an embodiment of the present invention, the first polyethylene copolymer will have a T(75)-T(25) of from about 5 to about 17.5° C. as determined by TREF. In an embodiment of the present invention, the first polyethylene copolymer will have a T(75)-T(25) of from about 7 to about 17.5° C. as determined by TREF.

In embodiments of the invention, the first polyethylene copolymer will have a CY a-parameter (also called the Carreau-Yasuda shear exponent) of from about 0.01 to about 0.4, or from about 0.05 to about 0.4, or from about 0.05 to about 0.3, or from about 0.01 to about 0.3, or from about 0.01 to about 0.25, or from about 0.05 to about 0.30, or from about 0.05 to about 0.25.

In embodiments of the invention, the first polyethylene copolymer will have a normalized shear thinning index, SHI @0.1 rad/s (i.e., the $\eta^*_{0.1}/\eta_0$) of from about 0.001 to about 0.90, or from about 0.001 to about 0.8, or from about 0.001 to about 0.5, or less than about 0.9, or less than about 0.8, or less than about 0.5.

In an embodiment of the invention, the first polyethylene copolymer will have a TREF profile, as measured by temperature rising elution fractionation, which is multimodal, comprising at least two elution intensity maxima or peaks.

In an embodiment of the invention, the first polyethylene copolymer will have an amount of copolymer eluting at a temperature at or below about 40° C., of less than about 5 wt % as determined by temperature rising elution fractionation (TREF).

In an embodiment of the invention, the first polyethylene copolymer will have an amount of copolymer eluting at a temperature of from about 90° C. to about 105° C., of from about 5 to about 30 wt % as determined by temperature rising elution fractionation (TREF). In an embodiment of the invention, from about 5 to about 25 wt % of the first polyethylene copolymer will be represented within a temperature range of from about 90° C. to about 105° C. in a TREF profile. In an embodiment of the invention, from about 7.5 to about 25 wt % of the first polyethylene copolymer will be represented within a temperature range of from about 90° C. to about 105° C. in a TREF profile. In an embodiment of the invention, from about 10 to about 25 wt % of the first polyethylene copolymer will be represented within a temperature range of from about 90° C. to about 105° C. in a TREF profile.

In another embodiment of the invention, from about 5 to about 22.5 wt % of the first polyethylene copolymer will be represented at a temperature range of from about 90° C. to about 105° C. in a TREF profile. In another embodiment of the invention, from about 5 to about 20.0 wt % of the first polyethylene copolymer will be represented at a temperature range of from about 90° C. to about 105° C. in a TREF profile.

In embodiments of the invention, less than about 1 wt %, or less than about 0.5 wt %, or less than about 0.05 wt %, or about 0 wt % of the first polyethylene copolymer will elute at a temperature of above about 100° C. in a TREF analysis.

In an embodiment of the invention, the first polyethylene copolymer will have a TREF profile, as measured by temperature rising elution fractionation, comprising: i) a multimodal TREF profile comprising at least two elution intensity maxima (or peaks); ii) less than about 5 wt % of the copolymer represented at a temperature at or below about 40° C.; and iii) from about 5 to about 25 wt % of the copolymer represented at a temperature of from about 90° C. to about 105° C.

In an embodiment of the invention, the first polyethylene copolymer has a multimodal TREF profile comprising at least two elution intensity maxima (or peaks).

In an embodiment of the invention, the first polyethylene copolymer has a multimodal TREF profile defined by at least two intensity maxima (or peaks) occurring at elution temperatures T(low), and T(high), where T(low) is from about 60° C. to about 87° C., and T(high) is from about 88° C. to about 100° C.

In an embodiment of the invention, the first polyethylene copolymer has a multimodal TREF profile defined by at least two intensity maxima (or peaks) occurring at elution temperatures T(low), and T(high), where T(low) is from about 62° C. to about 87° C., and T(high) is from about 89° C. to about 100° C.

In an embodiment of the invention, the first polyethylene copolymer has a multimodal TREF profile defined by at least two intensity maxima (or peaks) occurring at elution temperatures T(low), and T(high), where T(low) is from about 65° C. to about 85° C., and T(high) is from about 90° C. to about 100° C.

In an embodiment of the invention, the first polyethylene copolymer has a multimodal TREF profile defined by at least two intensity maxima (or peaks) occurring at elution temperatures T(low), and T(high), where T(low) is from about 65° C. to about 85° C., and T(high) is from about 90° C. to about 98° C.

In an embodiment of the invention, the first polyethylene copolymer has a multimodal TREF profile defined by at least two intensity maxima (or peaks) occurring at elution temperatures T(low), and T(high), where T(low) is from about 70° C. to about 85° C., and T(high) is from about 90° C. to about 98° C.

In an embodiment of the invention, the first polyethylene copolymer has a multimodal TREF profile defined by at least two intensity maxima (or peaks) occurring at elution temperatures T(low), and T(high), where T(low) is from about 70° C. to about 80° C., and T(high) is from about 90° C. to about 98° C.

In an embodiment of the invention, the first polyethylene copolymer has a multimodal TREF profile defined by at least two intensity maxima (or peaks) occurring at elution temperatures T(low), and T(high), where T(low) is from about 70° C. to about 80° C., and T(high) is from about 90° C. to about 95° C.

In an embodiment of the invention, the first polyethylene copolymer has a multimodal TREF profile defined by at least two elution intensity maxima (or peaks) occurring at elution temperatures T(low), and T(high), where (high)–T(low) is from about 7.5° C. to about 35° C., or from about 10.0° C. to about 30° C., or from about 12.5° C. to about 30° C., or from about 7.0° C. to about 27° C., or from about 7° C. to about 25° C., or from about 10° C. to about 27° C., or from about 10° C. to about 25° C., or from about 10° C. to about 22.5° C., or from about 12.5° C. to about 22.5° C.

In an embodiment of the invention, the first polyethylene copolymer has a multimodal TREF profile defined by at least two intensity maxima (or peaks) occurring at elution temperatures T(low), and T(high), where T(low) is from about 65° C. to about 85° C., and T(high) is from about 90° C. to about 98° C., where (high)–T(low) is from about 7.5° C. to about 35° C., or from about 10.0° C. to about 30° C., or from about 12.5° C. to about 30° C., or from about 7.0° C. to about 27° C., or from about 7° C. to about 25° C., or from about 10° C. to about 27° C., or from about 10° C. to about 25° C., or from about 10° C. to about 22.5° C., or from about 12.5° C. to about 22.5° C.

In an embodiment of the invention, the first polyethylene copolymer has a multimodal TREF profile comprising at least three elution intensity maxima (or peaks).

In an embodiment of the invention, the first polyethylene copolymer has a trimodal TREF profile comprising three elution intensity maxima (or peaks).

In an embodiment of the invention, the first polyethylene copolymer has a multimodal TREF profile defined by three elution intensity maxima (or peaks) occurring at elution temperatures T(low), T(medium or "med" for short) and T(high), where the intensity of the peaks at T(low) and T(high) is greater than the intensity of the peak at T(med).

In an embodiment of the invention, the first polyethylene copolymer has a multimodal TREF profile defined by three elution intensity maxima (or peaks) occurring at elution temperatures T(low), T(medium or "med" for short) and T(high), where T(low) is from about 60° C. to about 87° C., T(high) is from about 88° C. to about 100° C., and T(med) is higher than T(low), but lower than T(high).

In an embodiment of the invention, the first polyethylene copolymer has a multimodal TREF profile defined by three elution intensity maxima (or peaks) occurring at elution temperatures T(low), T(medium or "med" for short) and T(high), where T(low) is from about 62° C. to about 87° C., T(high) is from about 89° C. to about 100° C., and T(med) is higher than T(low), but lower than T(high).

In an embodiment of the invention, the first polyethylene copolymer has a multimodal TREF profile defined by three elution intensity maxima (or peaks) occurring at elution temperatures T(low), T(medium or "med" for short) and T(high), where T(low) is from about 65° C. to about 85° C., T(high) is from about 90° C. to about 100° C., and T(med) is higher than T(low), but lower than T(high).

In an embodiment of the invention, the first polyethylene copolymer has a multimodal TREF profile defined by three elution intensity maxima (or peaks) occurring at elution temperatures T(low), T(medium or "med" for short) and T(high), where T(low) is from about 65° C. to about 85° C., T(high) is from about 90° C. to about 98° C., and T(med) is higher than T(low), but lower than T(high).

In an embodiment of the invention, the first polyethylene copolymer has a multimodal TREF profile defined by three elution intensity maxima (or peaks) occurring at elution temperatures T(low), T(medium or "med" for short) and T(high), where T(low) is from about 65° C. to about 80° C., T(high) is from about 90° C. to about 98° C., and T(med) is higher than T(low), but lower than T(high).

In an embodiment of the invention, the first polyethylene copolymer has a multimodal TREF profile defined by three elution intensity maxima (or peaks) occurring at elution temperatures T(low), T(medium or "med" for short) and T(high), where T(low) is from about 65° C. to about 87° C., T(high) is from about 88° C. to about 100° C., and T(med) is higher than T(low), but lower than T(high), where (high)–T(low) is from about 7.5° C. to about 35° C., or from about 10.0° C. to about 30° C., or from about 12.5° C. to about 30° C., or from about 7.0° C. to about 27° C., or from about 7° C. to about 25° C., or from about 10° C. to about 27° C., or from about 10° C. to about 25° C.

In an embodiment of the invention, the first polyethylene copolymer has a multimodal TREF profile defined by three elution intensity maxima (or peaks) occurring at elution temperatures T(low), T(medium or "med" for short) and T(high), where T(low) is from about 62° C. to about 82° C., T(med) is from about 76° C. to about 89° C. but is higher than T(low), and T(high) is from about 90° C. to about 100° C. In an embodiment of the invention, the first polyethylene copolymer has a multimodal TREF profile defined by three elution intensity maxima (or peaks) occurring at elution temperatures T(low), T(medium or "med" for short) and T(high), where T(low) is from about 65° C. to about 80° C., T(med) is from about 75° C. to about 90° C. but is higher than T(low), and T(high) is from about 90° C. to about 100° C. but is higher than T(med). In an embodiment of the invention, the first polyethylene copolymer has a multimodal TREF profile defined by three elution intensity maxima (or peaks) occurring at elution temperatures T(low), T(medium or "med" for short) and T(high), where T(low) is from about 67° C. to about 78° C., T(med) is from about 79° C. to about 89° C., and T(high) is from about 90° C. to about 100° C. In an embodiment of the invention, the first polyethylene copolymer has a multimodal TREF profile defined by three elution intensity maxima (or peaks) occurring at elution temperatures T(low), T(medium or "med" for short) and T(high), where T(low) is from about 67° C. to about 78° C., T(med) is from about 80° C. to about 87° C., and T(high) is from about 88° C. to about 98° C.

In embodiments of the invention, the first polyethylene copolymer has a multimodal TREF profile defined by three elution intensity maxima (or peaks) occurring at elution temperatures T(low), T(medium or "med" for short) and T(high), where T(med)–T(low) is from about 3° C. to about 25° C., or from about 5° C. to about 20° C.; or from about 5° C. to about 15° C., or from about 7° C. to about 15° C.

In embodiments of the invention, the first polyethylene copolymer has a multimodal TREF profile defined by three elution intensity maxima (or peaks) occurring at elution temperatures T(low), T(medium or "med" for short) and T(high), where T(high)–T(med) is from about 3° C. to about 20° C., or from about 3° C. to about 17° C., or from about 3° C. to about 15° C., or from about 5° C. to about 20° C., or from about 5° C. to about 17° C., or from about 5° C. to about 15° C., or from about 7° C. to about 17° C., or from about 7° C. to about 15° C. or from about 10° C. to about 17° C., or from about 10° C. to about 15° C.

In embodiments of the invention, the first polyethylene copolymer has a multimodal TREF profile defined by three elution intensity maxima (or peaks) occurring at elution temperatures T(low), T(medium or "med" for short) and T(high), where T(high)–T(low) is from about 15° C. to about 35° C., or from about 15° C. to about 30° C., or from 1 about 7° C. to about 30° C., or from about 15° C. to about 27° C., or from about 17° C. to about 27° C., or from about 20° C. to about 30° C. or from about 20° C. to about 27° C., or from about 15° C. to about 25° C. or from about 15° C. to about 22.5° C.

In an embodiment of the invention, the first polyethylene copolymer has a multimodal TREF profile comprising three elution intensity maxima (or peaks) occurring at elution temperatures T(low), T(medium or "med" for short) and T(high), where the intensity of the peaks at T(low) and T(high) are greater than the intensity of the peak at T(med); and where T(med)–T(low) is from about 3° C. to about 25° C.; where T(high)–T(med) is from about 5° C. to about 15° C.; and where T(high)–T(low) is from about 15° C. to about 35° C.

In an embodiment of the invention, the first polyethylene copolymer has a multimodal TREF profile comprising three elution intensity maxima (or peaks) occurring at elution temperatures T(low), T(medium or "med" for short) and T(high), where the intensity of the peaks at T(low) and T(high) are greater than the intensity of the peak at T(med); and where T(med)–T(low) is from about 3° C. to about 15° C.; where T(high)–T(med) is from about 5° C. to about 15° C.; and where T(high)–T(low) is from, about 15° C. to about 30° C.

In an embodiment of the invention, the first polyethylene copolymer has two melting peaks as, measured by differential scanning calorimetry (DSC).

In embodiments of the invention, the first polyethylene copolymer will have a hexane extractables level of ≤about 3.0 wt %, or ≤about 2.0 wt %, or ≤about 1.5 wt % or ≤about 1.0 wt %. In an embodiment of the invention, the first polyethylene copolymer has a hexane extractables level of from about 0.2 to about 3.0 wt %, or from about 0.2 to about 2.5 wt %, or from about 0.2 to about 2.0 wt %, or from about 0.2 to about 1.0 wt %.

The Second Polyethylene Copolymer

The polymer blend may comprise from about 99 to about 1 wt % of second polyethylene copolymer. The second polyethylene copolymer is a linear low density polyethylene (LLDPE). The second polyethylene copolymer may be a different polymer than the first polyethylene copolymer. The second polyethylene copolymer can be distinguished from the first polyethylene copolymer by differing in at least one property or characteristic. By way of non-limiting example, the second polyethylene copolymer can be distinguished from the first polyethylene copolymer by not satisfying the following relationship: $(M_w/M_n) \geq 72 \ [(I_{21}/I_2)^{-1} + 10^{-6} \ (M_n)]$. Alternatively, and also by way of non-limiting example, the second polyethylene copolymer can be distinguished from the first polyethylene copolymer by having a lower melt flow ratio $(I_{21}/I_2)$ than the first polyethylene copolymer.

In an embodiment of the invention, the second polyethylene copolymer has a density of from about 0.910 g/cm³ to about 0.940 g/cm³. In an embodiments of the invention, the second polyethylene copolymer will have a density ranging from a low of about 0.910 g/cm³, or about 0.912 g/cm³, or about 0.915 g/cm³, or about 0.916 g/cm³, or about 0.917 g/cm³ to a high of about 0.927 g/cm³, or about 0.930 g/cm³, or about 0.935 g/cm³, or about 0.940 g/cm³. In an embodiments of the invention, the second polyethylene copolymer will have a density of from about 0.912 g/cm³ to about 0.940 g/cm³, or from about 0.915 g/cm³ to about 0.935 g/cm³, or from about 0.915 to about 0.930 g/cm³, or from about 0.916 to about 0.930 g/cm³, or from about 0.915 to about 0.925 g/cm³, or from about 0.916 to about 0.924 g/cm³, or from about 0.917 to about 0.923 g/cm³, or from about 0.918 to about 0.922 g/cm³.

In an embodiment of the invention, the second polyethylene copolymer will have a molecular weight distribution (Mw/Mn) of from about 1.5 to about 6.0. In embodiments of the invention, the second polyethylene copolymer will have a molecular weight distribution (Mw/Mn) ranging from a low of about 1.5, or about 1.7, or about 2.0, or about 2.5, or about 3.0, or about 3.5, or about 3.7, or about 4.0 to a high of about 5, or about 5.25, or about 5.5, or about 6.0. In embodiments of the invention, the second polyethylene copolymer will have a molecular weight distribution (Mw/Mn) of from about 1.7 to about 5.0, or from about 1.5 to about 4.0, or from about 1.8 to about 3.5, or from about 2.0 to about 3.0. Alternatively, in embodiments of the invention, the second polyethylene copolymer will have a molecular weight distribution (Mw/Mn) of from about 3.6 to about 5.4, or from about 3.8 to about 5.1, or from about 3.9 to about 4.9.

In an embodiment of the invention, the second polyethylene copolymer will have a melt index ($I_2$) of from about 0.1 g/10 min to about 20 g/10 min. In embodiments of the invention, the second polyethylene copolymer will have a melt index ($I_2$) ranging from about 0.75 g/10 min to about 15 g/10 min, or from about 0.85 g/10 min to about 10 g/10 min, or from about 0.9 g/10 min to about 8 g/10 min. In embodiments of the invention, the second polyethylene copolymer will have a melt index ($I_2$) ranging from a low of about 0.20 g/10 min, or about 0.25 g/10 min, or about 0.5 g/10 min, or about 0.75 g/10 min, or about 1 g/10 min, or about 2 g/10 min to a high of about 3 g/10 min, or about 4 g/10 min, or about 5 g/10 min.

In embodiments of the invention the second polyethylene copolymer will have a melt index ($I_2$) of from about 0.75 g/10 min to about 6 g/10 min, or from about 1 g/10 min to about 8 g/10 min, or from about 0.8 g/10 min to about 6 g/10 min, or from about 1 g/10 min to about 4.5 g/10 min, or from about 0.20 g/10 min to about 5.0 g/10 min, or from about 0.30 g/10 min to about 5.0 g/10 min, or from about 0.40 g/10 min to about 5.0 g/10 min, or from about 0.50 g/10 min to about 5.0 g/10 min.

In embodiments of the invention, the second polyethylene copolymer will have a melt flow ratio ($I_{21}/I_2$) of less than about 36, or less than about 35, or less than about 32, or less than about 30. In embodiments of the invention, the second polyethylene copolymer will have a melt flow ratio ($I_{21}/I_2$) of from about 10 to about 36, or from about 10 to about 35, or from about 10 to about 32, or from about 10 to about 30, or from about 12 to about 35 or from about 12 to about 32, or from about 12 to about 30, or from about 14 to about 27, or from about 14 to about 25, or from about 14 to about 22, or from about 15 to about 20.

In an embodiment of the invention, the second polyethylene copolymer will have a $CBDI_{50}$ of ≥about 50 weight percent or a $CBDI_{50}$ of ≤about 50 weight percent as determined by TREF analysis.

In embodiments of the invention, the second polyethylene copolymer will have a composition distribution breadth index $CDBI_{50}$, as determined by temperature elution fractionation (TREF), of from about 25% to about 95% by weight, or from about 35 to about 90% by weight, or from about 40% to about 85% by weight, or from about 40% to about 80% by weight.

Catalysts and Process

The first and second polyethylene copolymers can be made using any appropriate catalyst, including for example so called single site catalysts, or a traditional Ziegler-Natta catalysts or chromium based catalysts. Processes such as solution phase polymerization, gas phase polymerization or slurry phase polymerization can be employed to make the first and second polyethylene copolymers.

Illustrative Ziegler-Natta catalyst compounds are disclosed in Ziegler Catalysts 363-386 (G. Fink, R. Mulhaupt and H. H. Brintzinger, eds., Springer-Verlag 1995); European Patent Nos. EP 103120; EP 102503; EP 231102; EP 703246; U.S. Pat. Nos. 4,115,639; 4,077,904; 4,302,565; 4,302,566; 4,482,687; 4,564,605; 4,721,763; 4,879,359; 4,960,741; 5,518,973; 5,525,678; 5,288,933; 5,290,745; 5,093,415; and 6,562,905; and U.S. Patent Application Publication No. 2008/0194780. Examples of such catalysts include those comprising Group 4, 5 or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

Illustrative examples of chromium based polymerization catalysts include Phillips polymerization catalysts, chromium oxide catalysts, silyl chromate catalysts, and chromocene catalysts, examples of which are described in for example U.S. Pat. Nos. 4,077,904, 4,115,639, 2,825,721, 3,023,203, 3,622,251, 4,011,382, 3,704,287, 4,100,105 and US Pat. App. Pub. No US20120302707 and the references therein.

Single site catalysts include, for example, phosphinimine catalysts (which have at least one phosphinimine ligand), metallocene catalysts (which have two cyclopentadienyl type ligands), and constrained geometry catalysts (which have an amido type ligand and a cyclopentadienyl type ligand).

Some non-limiting examples of phosphinimine catalysts can be found in U.S. Pat. Nos. 6,342,463; 6,235,672; 6,372,864; 6,984,695; 6,063,879; 6,777,509 and 6,277,931 all of which are incorporated by reference herein.

Some non-limiting examples of metallocene catalysts, which may or may not be useful, can be found in U.S. Pat. Nos. 4,808,561; 4,701,432; 4,937,301; 5,324,800; 5,633,394; 4,935,397; 6,002,033 and 6,489,413, which are incorporated herein by reference.

Some non-limiting examples of constrained geometry catalysts, which may or may not be useful, can be found in U.S. Pat. Nos. 5,057,475; 5,096,867; 5,064,802; 5,132,380; 5,703,187 and 6,034,021, all of which are incorporated by reference herein in their entirety.

In some embodiments, an activator may be used with the catalyst compound. As used herein, the term "activator" refers to any compound or combination of compounds, supported or unsupported, which can activate a catalyst compound or component, such as by creating a cationic species of the catalyst component. Illustrative activators include, but are not limited to, aluminoxane (e.g., methylaluminoxane "MAO"), modified aluminoxane (e.g., modified methylaluminoxane "MMAO" and/or tetraisobutyldialuminoxane "TIBAO"), alkylaluminum compounds, ionizing activators (neutral or ionic) such as tri(n-butyl) ammonium tetrakis(pentafluorophenyl)boron and combinations thereof.

The catalyst compositions can include a support material or carrier. As used herein, the terms "support" and "carrier" are used interchangeably and are any support material, including a porous support material, for example, talc, inorganic oxides, and inorganic chlorides. The catalyst component(s) and/or activator(s) can be deposited on, contacted with, vaporized with, bonded to, or incorporated within, adsorbed or absorbed in, or on, one or more supports or carriers. Other support materials can include resinous support materials such as polystyrene, functionalized or cross-linked organic supports, such as polystyrene divinyl benzene polyolefins or polymeric compounds, zeolites, clays, or any other organic or inorganic support material and the like, or mixtures thereof. Suitable catalyst supports are discussed and described in, for example, Hlatky, Chem. Rev. (2000), 100, 1347 1376 and Fink et al, Chem. Rev. (2000), 100, 1377 1390, U.S. Pat. Nos. 4,701,432; 4,808,561; 4,912,075; 4,925,821; 4,937,217; 5,008,228; 5,238,892; 5,240,894; 5,332,706; 5,346,925; 5,422,325; 5,466,649; 5,466,766; 5,468,702; 5,529,965; 5,554,704; 5,629,253; 5,639,835; 5,625,015; 5,643,847; 5,665,665; 5,698,487; 5,714,424; 5,723,400; 5,723,402; 5,731,261; 5,759,940; 5,767,032;

5,770,664; and 5,972,510; and PCT Publication Nos. WO 95/32995; WO 95/14044; WO 96/06187; WO 97/02297; WO 99/47598; WO 99/48605; and WO 99/50311.

In an embodiment of the invention, the first polyethylene copolymer is made with a polymerization catalyst system comprising a phosphinimine catalyst.

In an embodiment of the invention, the first polyethylene copolymer is made using a catalyst system comprising a phosphinimine catalyst, a support, and a catalyst activator.

In an embodiment of the invention, the first polyethylene copolymer is made in the gas phase using a catalyst system comprising a phosphinimine catalyst, a support, and a catalyst activator.

In an embodiment of the invention, the first polyethylene copolymer is made in a single gas phase reactor using a catalyst system comprising a phosphinimine catalyst, a support, and a catalyst activator.

The phosphinimine catalyst is based on metals from group 4, which includes titanium, hafnium and zirconium. In one embodiment, the phosphinimine catalysts are group 4 metal complexes in their highest oxidation state.

The phosphinimine catalysts described herein, usually require activation by one or more cocatalytic or activator species in order to provide polymer from olefins.

A phosphinimine catalyst is a compound (typically an organometallic compound) based on a group 3, 4 or 5 metal and which is characterized as having at least one phosphinimine ligand. Any compounds/complexes having a phosphinimine ligand and which display catalytic activity for ethylene (co)polymerization may be called "phosphinimine catalysts".

In an embodiment of the invention, a phosphinimine catalyst is defined by the formula: $(L)_n(PI)_nMX_p$ where M is a transition metal selected from Ti, Hf, Zr; PI is a phosphinimine ligand; L is a cyclopentadienyl type ligand; X is an activatable ligand; m is 1 or 2; n is 0 or 1; and p is determined by the valency of the metal M. In one embodiment m is 1, n is 1 and p is 2.

In an embodiment of the invention, a phosphinimine catalyst is defined by the formula: $(L)(PI)MX_2$ where M is a transition metal selected from Ti, Hf, Zr; PI is a phosphinimine ligand; L is a cyclopentadienyl type ligand; and X is an activatable ligand.

In an embodiment of the invention, the phosphinimine catalyst will have a phosphinimine ligand which is not bridged to, or does not make a bridge with another ligand within the metal coordination sphere of the phosphinimine catalyst, such as for example a cyclopentadienyl type ligand.

In an embodiment of the invention, the phosphinimine catalyst will have a cyclopentadienyl type ligand which is not bridged to, or does not make a bridge with another ligand within the metal coordination sphere of the phosphinimine catalyst, such as for example a phosphinimine ligand.

The phosphinimine ligand is defined by the formula: $R^1_3P=N-$ wherein each $R^1$ is independently selected from a hydrogen atom; a halogen atom; a $C_{1-30}$ hydrocarbyl radical which is unsubstituted or further substituted by one or more halogen atom; a $C_{1-20}$ alkyl radical; a $C_{1-8}$ alkoxy radical; a $C_{6-10}$ aryl or aryloxy radical; an amido radical; a silyl radical; and a germanyl radical; P is phosphorus and N is nitrogen (and bonds to the metal M).

In an embodiment of the invention, the phosphinimine ligand is chosen so that each $R^1$ is a hydrocarbyl radical. In a particular embodiment of the invention, the phosphinimine ligand is tri-(tertiarybutyl)phosphinimine (i.e., where each $R^1$ is a tertiary butyl group).

As used herein, the term "cyclopentadienyl-type" ligand is meant to include ligands which contain at least one five carbon ring which is bonded to the metal via eta-5 (or in some cases eta-3) bonding. Thus, the term "cyclopentadienyl-type" includes, for example, unsubstituted cyclopentadienyl, singly or multiply substituted cyclopentadienyl, unsubstituted indenyl, singly or multiply substituted indenyl, unsubstituted fluorenyl and singly or multiply substituted fluorenyl. Hydrogenated versions of indenyl and fluorenyl ligands are also contemplated for use in the current invention, so long as the five carbon ring which bonds to the metal via eta-5 (or in some cases eta-3) bonding remains intact. Substituents for a cyclopentadienyl ligand, an indenyl ligand (or hydrogenated version thereof) and a fluorenyl ligand (or hydrogenated version thereof) can be selected from a $C_{1-30}$ hydrocarbyl radical (which hydrocarbyl radical may be unsubstituted or further substituted by for example a halide and/or a hydrocarbyl group; for example a suitable substituted $C_{1-30}$ hydrocarbyl radical is a pentafluorobenzyl group such as $-CH_2C_6F_5$); a halogen atom; a $C_{1-8}$ alkoxy radical; a $C_{6-10}$ aryl or aryloxy radical (each of which may be further substituted by for example a halide and/or a hydrocarbyl group); an amido radical which is unsubstituted or substituted by up to two $C_{1-8}$ alkyl radicals; a phosphido radical which is unsubstituted or substituted by up to two $C_{1-8}$ alkyl radicals; a silyl radical of the formula $-Si(R')_3$ wherein each R' is independently selected from hydrogen, a $C_{1-8}$ alkyl or alkoxy radical, $C_{6-10}$ aryl and $C_{6-10}$ aryloxy radicals; and a germanyl radical of the formula $-Ge(R)_3$ wherein R' is as defined directly above.

The term "perfluorinated aryl group" means that each hydrogen atom attached to a carbon atom in an aryl group has been replaced with a fluorine atom as is well understood in the art (e.g., a perfluorinated phenyl group or substituent has the formula $-C_6F_5$).

In an embodiment of the invention, the phosphinimine catalyst will have a single or multiply substituted indenyl ligand and a phosphinimine ligand which is substituted by three tertiary butyl substituents.

An indenyl ligand (or "Ind" for short) as defined herein will have framework carbon atoms with the numbering scheme provided below, so the location of a substituent by can be readily identified.

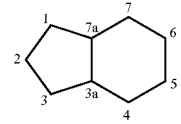

In an embodiment of the invention, the phosphinimine catalyst will have a singly substituted indenyl ligand and a phosphinimine ligand which is substituted by three tertiary butyl substituents.

In an embodiment of the invention, the phosphinimine catalyst will have a singly or multiply substituted indenyl ligand where the substituent is selected from a substituted or unsubstituted alkyl group, a substituted or an unsubstituted aryl group, and a substituted or unsubstituted benzyl (i.e., $C_6H_5CH_2-$) group. Suitable substituents for the alkyl, aryl or benzyl group may be selected from alkyl groups, aryl groups, alkoxy groups, aryloxy groups, alkylaryl groups (e.g., a benzyl group), arylalkyl groups and halide groups.

In an embodiment of the invention, the phosphinimine catalyst will have a singly substituted indenyl ligand, $R^2$-Indenyl, where the $R^2$ substituent is a substituted or unsubstituted alkyl group, a substituted or an unsubstituted aryl group, or a substituted or unsubstituted benzyl group. Suitable substituents for an $R^2$ alkyl, $R^2$ aryl or $R^2$ benzyl group may be selected from alkyl groups, aryl groups, alkoxy groups, aryloxy groups, alkylaryl groups (e.g., a benzyl group), arylalkyl groups and halide groups.

In an embodiment of the invention, the phosphinimine catalyst will have an indenyl ligand having at least a 1-position substituent (1-$R^2$) where the substituent $R^2$ is a substituted or unsubstituted alkyl group, a substituted or an unsubstituted aryl group, or a substituted or unsubstituted benzyl group. Suitable substituents for an $R^2$ alkyl, $R^2$ aryl or $R^2$ benzyl group may be selected from alkyl groups, aryl groups, alkoxy groups, aryloxy groups, alkylaryl groups (e.g., a benzyl group), arylalkyl groups and halide groups.

In an embodiment of the invention, the phosphinimine catalyst will have a singly substituted indenyl ligand, 1-$R^2$-Indenyl where the substituent $R^2$ is in the 1-position of the indenyl ligand and is a substituted or unsubstituted alkyl group, a substituted or unsubstituted aryl group, or a substituted or an unsubstituted benzyl group. Suitable substituents for an $R^2$ alkyl, $R^2$ aryl or $R^2$ benzyl group may be selected from alkyl groups, aryl groups, alkoxy groups, aryloxy groups, alkylaryl groups (e.g., a benzyl group), arylalkyl groups and halide groups.

In an embodiment of the invention, the phosphinimine catalyst will have a singly substituted indenyl ligand, 1-$R^2$-Indenyl, where the substituent $R^2$ is a (partially/fully) halide substituted alkyl group, a (partially/fully) halide substituted benzyl group, or a (partially/fully) halide substituted aryl group.

In an embodiment of the invention, the phosphinimine catalyst will have a singly substituted indenyl ligand, 1-$R^2$-Indenyl, where the substituent $R^2$ is a (partially/fully) halide substituted benzyl group.

When present on an indenyl ligand, a benzyl group can be partially or fully substituted by halide atoms, for example, fluoride atoms. The aryl group of the benzyl group may be a perfluorinated aryl group, a 2,6 (i.e., ortho) fluoro substituted phenyl group, 2,4,6 (i.e., ortho/para) fluoro substituted phenyl group or a 2,3,5,6 (i.e., ortho/meta) fluoro substituted phenyl group respectively. The benzyl group is, in an embodiment of the invention, located at the 1 position of the indenyl ligand.

In an embodiment of the invention, the phosphinimine catalyst will have a singly substituted indenyl ligand, 1-$R^2$-Indenyl, where the substituent $R^2$ is a pentafluorobenzyl ($C_6F_5CH_2$—) group.

In an embodiment of the invention, the phosphinimine catalyst has the formula: $(1\text{-}R^2\text{-}(Ind))M(N=P(t\text{-}Bu)_3)X_2$ where $R^2$ is a substituted or unsubstituted alkyl group, a substituted or an unsubstituted aryl group, or a substituted or unsubstituted benzyl group, wherein substituents for the alkyl, aryl or benzyl group are selected from alkyl, aryl, alkoxy, aryloxy, alkylaryl, arylalkyl and halide substituents; M is Ti, Zr or Hf; and X is an activatable ligand.

In an embodiment of the invention, the phosphinimine catalyst has the formula: $(1\text{-}R^2\text{-}(Ind))M(N=P(t\text{-}Bu)_3)X_2$ where $R^2$ is an alkyl group, an aryl group or a benzyl group and wherein each of the alkyl group, the aryl group, and the benzyl group may be unsubstituted or substituted by at least one fluoride atom; M is Ti, Zr or Hf; and X is an activatable ligand.

In an embodiment of the invention, the phosphinimine catalyst has the formula: $(1\text{-}R^2\text{-}(Ind))M(N=P(t\text{-}Bu)_3)X_2$ where $R^2$ is an alkyl group, an aryl group or a benzyl group and wherein each of the alkyl group, the aryl group, and the benzyl group may be unsubstituted or substituted by at least one halide atom; M is Ti, Zr or Hf; and X is an activatable ligand.

In an embodiment of the invention, the phosphinimine catalyst has the formula: $(1\text{-}R^2\text{-}(Ind))Ti(N=P(t\text{-}Bu)_3)X_2$ where $R^2$ is an alkyl group, an aryl group or a benzyl group and wherein each of the alkyl group, the aryl group, and the benzyl group may be unsubstituted or substituted by at least one fluoride atom; and X is an activatable ligand.

In an embodiment of the invention, the phosphinimine catalyst has the formula: $(1\text{-}C_6F_5CH_2\text{—Ind})M(N=P(t\text{-}Bu)_3)X_2$, where M is Ti, Zr or Hf; and X is an activatable ligand.

In an embodiment of the invention, the phosphinimine catalyst has the formula: $(1\text{-}C_6F_5CH_2\text{—Ind})Ti(N=P(t\text{-}Bu)_3)X_2$, where X is an activatable ligand.

In the current invention, the term "activatable", means that the ligand X may be cleaved from the metal center M via a protonolysis reaction or abstracted from the metal center M by suitable acidic or electrophilic catalyst activator compounds (also known as "co-catalyst" compounds) respectively, examples of which are described below. The activatable ligand X may also be transformed into another ligand which is cleaved or abstracted from the metal center M (e.g., a halide may be converted to an alkyl group). Without wishing to be bound by any single theory, protonolysis or abstraction reactions generate an active "cationic" metal center which can polymerize olefins.

In embodiments of the present invention, the activatable ligand, X is independently selected from a hydrogen atom; a halogen atom, a $C_{1-10}$ hydrocarbyl radical; a $C_{1-10}$ alkoxy radical; and a $C_{6-10}$ aryl or $C_{6-10}$ aryloxy radical, (where each of the hydrocarbyl, alkoxy, aryl, or aryl oxide radicals may be un-substituted or further substituted by one or more halogen or other group such as for example, a $C_{1-8}$ alkyl; a $C_{1-8}$ alkoxy, a $C_{6-10}$ aryl or $C_{6-10}$ aryloxy); an amido and a phosphido radical, but where X is not a cyclopentadienyl. Two X ligands may also be joined to one another and form for example, a substituted or unsubstituted diene ligand (e.g., 1,3-butadiene); or a delocalized heteroatom containing group such as an acetate or acetamidinate group. In one embodiment of the invention, each X is independently selected from a halide atom, a $C_{1-4}$ alkyl radical and a benzyl radical.

Particularly suitable activatable ligands are monoanionic such as a halide (e.g. chloride) or a hydrocarbyl (e.g., methyl, benzyl).

The catalyst activator used to activate the phosphinimine polymerization catalyst can be any suitable activator including one or more activators selected from alkylaluminoxanes and ionic activators, optionally together with an alkylating agent.

Without wishing to be bound by theory, alkylaluminoxanes are thought to be complex aluminum compounds of the formula:

$R^3_2Al^1O(R^3Al^1O)_mAl^1R^3_2$, wherein each $R^3$ is independently selected from $C_{1-20}$ hydrocarbyl radicals and m is from 3 to 50. Optionally, a hindered phenol can be added to the alkylaluminoxane to provide a molar ratio of $Al^1$:hindered phenol of from about 2:1 to about 5:1 when the hindered phenol is present.

In an embodiment of the invention, $R^3$ of the alkylaluminoxane, is a methyl radical and m is from about 10 to about 40.

In an embodiment of the invention, the cocatalyst is methylaluminoxane (MAO).

In an embodiment of the invention, the cocatalyst is modified methylaluminoxane (MMAO).

The alkylaluminoxanes are typically used in substantial molar excess compared to the amount of group 4 transition metal in the phosphinimine catalyst. The $Al^1$:group 4 transition metal molar ratios may be from about 10:1 to about 10,000:1, or from about 30:1 to about 500:1.

It is well known in the art, that the alkylaluminoxane can serve dual roles as both an alkylator and an activator. Hence, an alkylaluminoxane activator is often used in combination with activatable ligands such as halogens.

Alternatively, the catalyst activator may be a combination of an alkylating agent (which may also serve as a scavenger) with an activator capable of ionizing the group 4 of the phosphinimine catalyst metal catalyst (i.e., an ionic activator). In this context, the activator can be chosen from one or more alkylaluminoxane and/or an ionic activator, since an alkylaluminoxane may serve as both an activator and an alkylating agent.

When present, the alkylating agent may be selected from $(R^4)_p$ $MgX^2_{2-p}$ wherein $X^2$ is a halide and each $R^4$ is independently selected from $C_{1-10}$ alkyl radicals and p is 1 or 2; $R^4Li$ wherein in $R^4$ is as defined above, $(R^4)_q ZnX^2_{2-q}$ wherein $R^4$ is as defined above, $X^2$ is halogen and q is 1 or 2; $(R^4)_s Al^2X^2_{3-s}$ wherein $R^4$ is as defined above, $X^2$ is halogen and s is an integer from 1 to 3. In one embodiment, in the above compounds $R^4$ is a $C_{1-4}$ alkyl radical, and $X^2$ is chlorine. Commercially available compounds include triethyl aluminum (TEAL), diethyl aluminum chloride (DEAC), dibutyl magnesium ($(Bu)_2Mg$), and butyl ethyl magnesium (BuEtMg or BuMgEt). Alkylaluminoxanes can also be used as alkylators.

The ionic activator may be selected from: (i) compounds of the formula $[R^5]^+[B(R^6)_4]^+$ wherein B is a boron atom, $R^5$ is a cyclic $C_{5-7}$ aromatic cation or a triphenyl methyl cation and each $R^6$ is independently selected from phenyl radicals which are unsubstituted or substituted with from 3 to 5 substituents selected from a fluorine atom, a $C_{1-4}$ alkyl and $C_{1-4}$ alkoxy radical which is unsubstituted or substituted by a fluorine atom; and a silyl radical of the formula —Si—$(R^7)_3$; wherein each $R^7$ is independently selected from a hydrogen atom and a $C_{1-4}$ alkyl radical; and (ii) compounds of the formula $[(R)_t ZH]^+[B(R^6)_4]^-$ wherein B is a boron atom, H is a hydrogen atom, Z is a nitrogen atom or phosphorus atom, t is 2 or 3 and $R^8$ is selected from $C_{1-8}$ alkyl radicals and a phenyl radical which is unsubstituted or substituted by up to three $C_{1-4}$ alkyl radicals; or one $R^8$ taken together with the nitrogen atom may form an anilinium radical and $R^6$ is as defined above; and (iii) compounds of the formula $B(R^6)_3$ wherein $R^6$ is as defined above.

In the above compounds $R^6$ may be a pentafluorophenyl radical, and $R^5$ is a triphenylmethyl cation, Z is a nitrogen atom and $R^8$ is a $C_{1-4}$ alkyl radical or $R^8$ taken together with the nitrogen atom forms an anilinium radical which is substituted by two $C_{1-4}$ alkyl radicals.

Examples of compounds capable of ionizing the phosphinimine catalyst include the following compounds: triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra (pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra(phenyl)boron, triphenylphosphonium tetra)phenyl)boron, tri(methylphenyl)phosphonium tetra(phenyl)boron, tri(dimethylphenyl)phosphonium tetra(phenyl)boron, tropillium tetrakispentafluorophenyl borate, triphenylmethylium tetrakispentafluorophenyl borate, benzene (diazonium)tetrakispentafluorophenyl borate, tropillium phenyltrispentafluorophenyl borate, triphenylmethylium phenyl-trispentafluorophenyl borate, benzene (diazonium) phenyltrispentafluorophenyl borate, tropillium tetrakis(2,3,5,6-tetrafluorophenyl)borate, triphenylmethylium tetrakis(2,3,5,6-tetrafluorophenyl)borate, benzene (diazonium)tetrakis (3,4,5-trifluorophenyl)borate, tropillium tetrakis(3,4,5-trifluorophenyl)borate, benzene (diazonium)tetrakis(3,4,5-trifluorophenyl)borate, tropillium tetrakis(1,2,2-trifluoroethenyl)borate, trophenylmethylium tetrakis(1,2,2-trifluoroethenyl)borate, benzene (diazonium)tetrakis(1,2,2-trifluoroethenyl)borate, tropillium tetrakis(2,3,4,5-tetrafluorophenyl)borate, triphenylmethylium tetrakis(2,3,4,5-tetrafluorophenyl)borate, and benzene (diazonium)tetrakis (2,3,4,5-tetrafluorophenyl)borate.

Commercially available activators which are capable of ionizing the phosphinimine catalyst include:

N,N-dimethylaniliniumtetrakispentafluorophenyl borate ("$[Me_2NHPh][B(C_6F_5)_4]$"); triphenylmethylium tetrakispentafluorophenyl borate ("$[Ph_3C][B(C_6F_5)_4]$"); and tris-pentafluorophenyl boron.

In an embodiment of the invention, the ionic activator compounds may be used in amounts which provide a molar ratio of group 4 transition metal to boron that will be from about 1:1 to about 1:6.

Optionally, mixtures of alkylaluminoxanes and ionic activators can be used as activators for the phosphinimine catalyst.

In one embodiment, the polymerization catalyst system will comprise an inert support (note: the terms "support" and "inert support" are used interchangeably in the present invention). In a particular embodiment of the invention, the polymerization catalyst system comprises a phosphinimine catalyst which is supported on an inert support.

The inert support can be any support known in the art to be suitable for use with polymerization catalysts. For example the support can be any porous or non-porous support material, such as talc, inorganic oxides, inorganic chlorides, aluminophosphates (i.e., $AlPO_4$) and polymer supports (e.g., polystyrene, etc). Hence, supports include Group 2, 3, 4, 5, 13 and 14 metal oxides generally, such as silica, alumina, silica-alumina, magnesium oxide, magnesium chloride, zirconia, titania, clay (e.g., montmorillonite) and mixtures thereof.

Agglomerate supports such as agglomerates of silica and clay may also be used as a support in the current invention.

Supports are generally used in calcined form. An inorganic oxide support, for example, will contain acidic surface hydroxyl groups which will react with a polymerization catalyst. Prior to use, the inorganic oxide may be dehydrated to remove water and to reduce the concentration of surface hydroxyl groups. Calcination or dehydration of a support is well known in the art. In some embodiments of the invention, the support is calcined at temperatures above about 200° C., or above about 300° C., or above about 400° C., or above about 500° C. In other embodiments, the support is calcined at from about 500° C. to about 1000° C., or from about 600° C. to about 900° C. The resulting support may be free of adsorbed water and may have a surface hydroxyl content from about 0.1 to about 5 mmol/g of support, or from about 0.5 to about 3 mmol/g. The amount of hydroxyl groups in a silica support may be determined according to the method disclosed by J. B. Peri and A. L. Hensley Jr., in *J. Phys. Chem.*, 72 (8), 1968, pg 2926.

The support material, especially an inorganic oxide, typically has a surface area of from about 10 to about 700 m$^2$/g, a pore volume in the range from about 0.1 to about 4.0 cc/g, and an average particle size of from about 5 to about 500 μm. In one embodiment, the support material has a surface area of from about 50 to about 500 m$^2$/g, a pore volume in the range from about 0.5 to about 3.5 cc/g and an average particle size of from about 10 to about 200 μm. In another embodiment the support material has a surface area of from about 100 to about 400 m$^2$/g, a pore volume in the range from about 0.8 to about 3.0 cc/g and an average particle size of from about 5 to about 100 μm.

The support material, especially an inorganic oxide, typically has an average pore size (i.e., pore diameter) of from about 10 to about 1000 Angstroms(Å). In another embodiment, the support material has an average pore size of from about 50 to about 500 Å. In another embodiment, the support material has an average pore size of from about 75 to about 350 Å.

The surface area and pore volume of a support may be determined by nitrogen adsorption according to B.E.T. techniques, which are well known in the art and are described in the *Journal of the American Chemical Society*, 1938, v 60, pg 309-319.

A silica support which is suitable for use has a high surface area and is amorphous. By way of example only, useful silicas are commercially available under the trademark of Sylopol® 958, 955 and 2408 by the Davison Catalysts, a Division of W. R. Grace and Company and ES-70W by Ineos Silica.

Agglomerate supports comprising a clay mineral and an inorganic oxide, may be prepared using a number techniques well known in the art including pelletizing, extrusion, drying or precipitation, spray-drying, shaping into beads in a rotating coating drum, and the like. A nodulization technique may also be used. Methods to make agglomerate supports comprising a clay mineral and an inorganic oxide include spray-drying a slurry of a clay mineral and an inorganic oxide. Methods to make agglomerate supports comprising a clay mineral and an inorganic oxide are disclosed in U.S. Pat. Nos. 6,686,306; 6,399,535; 6,734,131; 6,559,090 and 6,958,375.

A useful agglomerate of clay and inorganic oxide may have the following properties: a surface area of from about 20 to about 800 m$^2$/g, or from about 50 to about 600 m$^2$/g; particles with a bulk density of from about 0.15 to about 1 g/ml, or from about 0.20 to about 0.75 g/ml; an average pore diameter of from about 30 to about 300 Angstroms (Å), or from about 60 to about 150 Å; a total pore volume of from about 0.10 to about 2.0 cc/g, or from about 0.5 to about 1.8 cc/g; and an average particle size of from about 4 to about 250 microns (μm), or from about 8 to about 100 microns.

Alternatively, a support, for example a silica support, may be treated with one or more salts of the type: Zr(SO$_4$)$_2$. 4H$_2$O, ZrO(NO$_3$)$_2$, and Fe(NO$_3$)$_3$ as taught in co-pending Canadian Patent Application No. 2,716,772. Supports that have been otherwise chemically treated are also contemplated for use with the catalysts and processes of the present invention.

The present invention is not limited to any particular procedure for supporting a phosphinimine catalyst or other catalyst system components. Processes for depositing such catalysts as well as an activator on a support are well known in the art (for some non-limiting examples of catalyst supporting methods, see "Supported Catalysts" by James H. Clark and Duncan J. Macquarrie, published online Nov. 15, 2002 in the Kirk-Othmer Encyclopedia of Chemical Technology Copyright© 2001 by John Wiley & Sons, Inc.; for some non-limiting methods to support an single site catalysts see U.S. Pat. No. 5,965,677). For example, a phosphinimine catalyst may be added to a support by co-precipitation with the support material. The activator can be added to the support before and/or after the phosphinimine catalyst or together with the phosphinimine catalyst. Optionally, the activator can be added to a supported phosphinimine catalyst in situ or a phosphinimine catalyst may be added to the support in situ or a phosphinimine catalyst can be added to a supported activator in situ. A phosphinimine catalyst may be slurried or dissolved in a suitable diluent or solvent and then added to the support. Suitable solvents or diluents include but are not limited to hydrocarbons and mineral oil. A phosphinimine catalyst for example, may be added to the solid support, in the form or a solid, solution or slurry, followed by the addition of the activator in solid form or as a solution or slurry. Phosphinimine catalyst, activator, and support can be mixed together in the presence or absence of a solvent.

A "catalyst modifier" made also be added to the phosphinimine based catalyst system and is a compound which, when added to a polymerization catalyst system or used in the presence of the same in appropriate amounts, can reduce, prevent or mitigate at least one: of fouling, sheeting, temperature excursions, and static level of a material in polymerization reactor; can alter catalyst kinetics; and/or can alter the properties of copolymer product obtained in a polymerization process.

Non limiting examples of catalyst modifiers which can be used are Kemamine AS990™, Kemamine AS650™, Armostat-1800™, bis-hydroxy-cocoamine, 2,2'-octadecyl-amino-bisethanol, and Atmer-163™.

Other catalyst modifiers may be used and include compounds such as carboxylate metal salts (see U.S. Pat. Nos. 7,354,880; 6,300,436; 6,306,984; 6,391,819; 6,472,342 and 6,608,153 for examples), polysulfones, polymeric polyamines and sulfonic acids (see U.S. Pat. Nos. 6,562,924; 6,022,935 and 5,283,278 for examples). Polyoxyethylene-alkylamines, which are described in for example in European Pat. Appl. No. 107,127, may also be used. Further catalyst modifiers include aluminum stearate and aluminum oleate. Catalyst modifiers are supplied commercially under the trademarks OCTASTAT™ and STADIS™. The catalyst modifier STADIS is described in U.S. Pat. Nos. 7,476,715; 6,562,924 and 5,026,795 and is available from Octel Starreon. STADIS generally comprises a polysulfone copolymer, a polymeric amine and an oil soluble sulfonic acid.

A long chain amine type catalyst modifier may be added to a reactor zone (or associated process equipment) separately from the polymerization catalyst system, as part of the polymerization catalyst system, or both as described in co-pending CA Pat. Appl. No. 2,742,461. The long chain amine can be a long chain substituted monoalkanolamine, or a long chain substituted dialkanolamine as described in co-pending CA Pat. Appl. No. 2,742,461, which is incorporated herein in full.

Detailed descriptions of slurry polymerization processes are widely reported in the patent literature. For example, particle form polymerization, or a slurry process where the temperature is kept below the temperature at which the polymer goes into solution is described in U.S. Pat. No. 3,248,179. Other slurry processes include those employing a loop reactor and those utilizing a plurality of stirred reactors in series, parallel, or combinations thereof. Non-limiting examples of slurry processes include continuous loop or stirred tank processes. Further examples of slurry processes are described in U.S. Pat. No. 4,613,484.

Slurry phase polymerization processes are conducted in the presence of a hydrocarbon diluent such as an alkane (including isoalkanes), an aromatic or a cycloalkane. The diluent may also be the alpha olefin comonomer used in copolymerizations. Alkane diluents include propane, butanes, (i.e., normal butane and/or isobutane), pentanes, hexanes, heptanes and octanes. The monomers may be soluble in (or miscible with) the diluent, but the polymer is not (under polymerization conditions). The polymerization temperature may be from about 5° C. to about 200° C., or less than about 120° C. typically from about 10° C. to about 100° C. The reaction temperature is selected so that the ethylene copolymer is produced in the form of solid particles. The reaction pressure is influenced by the choice of diluent and reaction temperature. For example, pressures may range from about 15 to about 45 atmospheres (about 220 to about 660 psi or about 1500 to about 4600 kPa) when isobutane is used as diluent (see, for example, U.S. Pat. No. 4,325,849) to approximately twice that (i.e., from about 30 to about 90 atmospheres—about 440 to about 1300 psi or about 3000 to about 9100 kPa) when propane is used (see U.S. Pat. No. 5,684,097). The pressure in a slurry process is kept sufficiently high to keep at least part of the ethylene monomer in the liquid phase. The reaction typically takes place in a jacketed closed loop reactor having an internal stirrer (e.g., an impeller) and at least one settling leg. Catalyst, monomers and diluents are fed to the reactor as liquids or suspensions. The slurry circulates through the reactor and the jacket is used to control the temperature of the reactor. Through a series of let-down valves the slurry enters a settling leg and then is let down in pressure to flash the diluent and unreacted monomers and recover the polymer generally in a cyclone. The diluent and unreacted monomers are recovered and recycled back to the reactor.

Solution processes for the homopolymerization or copolymerization of ethylene are well known in the art. These processes are conducted in the presence of an inert hydrocarbon solvent typically a $C_{5-12}$ hydrocarbon which may be unsubstituted or substituted by a $C_{1-4}$ alkyl group, such as pentane, methyl pentane, hexane, heptane, octane, cyclohexane, methylcyclohexane and hydrogenated naphtha. An example of a suitable solvent which is commercially available is "Isopar E" ($C_{8-12}$ aliphatic solvent, Exxon Chemical Co.).

The polymerization temperature in a conventional solution process is from about 80 to about 300° C. (or from about 120 to about 250° C.). However, as is illustrated in the Examples, the polymerization temperature for the process of this invention can be above 160° C. The upper temperature limit will be influenced by considerations which are well known to those skilled in the art, such as a desire to maximize operating temperature (so as to reduce solution viscosity) while still maintaining good polymer properties (as increased polymerization temperatures generally reduce the molecular weight of the polymer). In general, the upper polymerization temperature may be between about 200 and about 300° C. (or about 220 to about 250° C.). One reaction process is a "medium pressure process", meaning that the pressure in the reactor is less than about 6,000 psi (about 42,000 kiloPascals or kPa). Pressures may range from about 10,000 to about 40,000 kPa, or from about 2,000 to about 3,000 psi (about 14,000 to about 22,000 kPa).

A gas phase polymerization process is commonly carried out in a fluidized bed reactor. Such gas phase processes are widely described in the literature (see for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228). In general, a fluidized bed gas phase polymerization reactor employs a "bed" of polymer and catalyst which is fluidized by a flow of monomer, comonomer and other optional components which are at least partially gaseous. Heat is generated by the enthalpy of polymerization of the monomer (and comonomers) flowing through the bed. Un-reacted monomer, comonomer and other optional gaseous components exit the fluidized bed and are contacted with a cooling system to remove this heat. The cooled gas stream, including monomer, comonomer and optional other components (such as condensable liquids), is then re-circulated through the polymerization zone, together with "make-up" monomer (and comonomer) to replace that which was polymerized on the previous pass. Simultaneously, polymer product is withdrawn from the reactor. As will be appreciated by those skilled in the art, the "fluidized" nature of the polymerization bed helps to evenly distribute/mix the heat of reaction and thereby minimize the formation of localized temperature gradients.

The reactor pressure in a gas phase process may vary from about atmospheric to about 600 psig. In another embodiment, the pressure can range from about 100 psig (about 690 kPa) to about 500 psig (about 3448 kPa). In another embodiment, the pressure can range from about 200 psig (about 1379 kPa) to about 400 psig (about 2759 kPa). In another embodiment, the pressure can range from about 250 psig (about 1724 kPa) to about 350 psig (about 2414 kPa).

The reactor temperature in a gas phase process may vary according to the heat of polymerization as described above. In a one embodiment, the reactor temperature can be from about 30° C. to about 130° C. In another embodiment, the reactor temperature can be from about 60° C. to about 120° C. In yet another embodiment, the reactor temperature can be from about 70° C. to about 110° C. In still yet another embodiment, the temperature of a gas phase process can be from about 70° C. to about 100° C.

The fluidized bed process described above is well adapted for the preparation of polyethylene but other monomers (i.e., comonomers) may also be employed. Monomers and comonomers include ethylene and $C_{3-12}$ alpha olefins respectively, where $C_{3-12}$ alpha olefins are unsubstituted or substituted by up to two $C_{1-6}$ alkyl radicals, $C_{8-12}$ vinyl aromatic monomers which are unsubstituted or substituted by up to two substituents selected from $C_{1-4}$ alkyl radicals, $C_{4-12}$ straight chained diolefins, and $C_{4-12}$ cyclic diolefins, each of which are unsubstituted or substituted by a $C_{1-4}$ alkyl radical. Illustrative non-limiting examples of such alpha-olefins are one or more of propylene, 1-butene, 1-pentene, 1-hexene, 1-octene, and 1-decene, styrene, alpha methyl styrene, p-tert-butyl styrene, and the constrained-ring cyclic olefins such as cyclobutene, cyclopentene, dicyclopentadiene norbornene, alkyl-substituted norbornenes, alkenyl-substituted norbornenes and the like (e.g., 5-methylene-2-norbornene and 5-ethylidene-2-norbornene, bicyclo-(2,2,1)-hepta-2,5-diene).

In one embodiment, the invention is directed toward a polymerization process involving the polymerization of ethylene with one or more of comonomer(s) including linear or branched comonomer(s) having from 3 to 30 carbon atoms, for example, 3-12 carbon atoms, or 3 to 8 carbon atoms.

The process is particularly well suited to the copolymerization reactions involving the polymerization of ethylene in combination with one or more of the comonomers, for example alpha-olefin comonomers such as propylene, butene-1, pentene-1,4-methylpentene-1, hexene-1, octene-1, decene-1, styrene and cyclic and polycyclic olefins such as cyclopentene, norbornene and cyclohexene or a combination thereof. Other comonomers for use with ethylene can include polar vinyl monomers, diolefins such as 1,3-butadiene, 1,4-pentadiene, 1,4-hexadiene, 1,5-hexadiene, norbornadiene, and other unsaturated monomers including acetylene and aldehyde monomers. Higher alpha-olefins and polyenes or macromers can be used also.

In one embodiment, the first polyethylene copolymer comprises ethylene and an alpha-olefin having from 3 to 15 carbon atoms, or 4 to 12 carbon atoms, or 4 to 10 carbon atoms.

In an embodiment of the invention, ethylene comprises at least about 75 wt % of the total weight of monomer (i.e., ethylene) and comonomer (i.e., alpha olefin) that is fed to a polymerization reactor.

In an embodiment of the invention, ethylene comprises at least about 85 wt % of the total weight of monomer (i.e., ethylene) and comonomer (i.e., alpha olefin) that is fed to a polymerization reactor.

In an embodiment of the invention, the first polyethylene copolymer is a copolymer of ethylene and an alpha-olefin having from 3-8 carbon atoms and is made in a single reactor in the presence of a polymerization catalyst system comprising a phosphinimine catalyst, a support and a catalyst activator.

In an embodiment of the invention, the first polyethylene copolymer is a copolymer of ethylene and an alpha-olefin having from 3-8 carbon atoms and is made in a single gas phase reactor in the presence of a polymerization catalyst system comprising a phosphinimine catalyst, a support and a catalyst activator.

In an embodiment of the invention, the first polyethylene copolymer is a copolymer of ethylene and an alpha-olefin having from 3-8 carbon atoms and is made in a single gas phase reactor in the presence of a polymerization catalyst system comprising a phosphinimine catalyst, a support and a catalyst activator, wherein the phosphinimine catalyst has the formula:

$(1\text{-}R^2\text{-Indenyl})Ti(N\!\!=\!\!P(t\text{-}Bu)_3)X_2;$ wherein $R^2$ is a substituted or unsubstituted alkyl group, a substituted or an unsubstituted aryl group, or a substituted or unsubstituted benzyl group, wherein substituents for the alkyl, aryl or benzyl group are selected from alkyl, aryl, alkoxy, aryloxy, alkylaryl, arylalkyl and halide substituents; and wherein X is an activatable ligand.

In an embodiment of the invention, the first polyethylene copolymer is a copolymer of ethylene and an alpha-olefin having from 3-8 carbon atoms and is made in a single gas phase reactor with a polymerization catalyst system comprising: a phosphinimine catalyst; an alkylaluminoxane cocatalyst; and a support.

In an embodiment of the invention, the first polyethylene copolymer is a copolymer of ethylene and an alpha-olefin having from 3-8 carbon atoms and is made in a single gas phase reactor with a polymerization catalyst system comprising: a phosphinimine catalyst; an alkylaluminoxane cocatalyst; a support; and a catalyst modifier.

In an embodiment of the invention, the first polyethylene copolymer is a copolymer of ethylene and an alpha-olefin having from 3-8 carbon atoms and is made in a single gas phase reactor with a polymerization catalyst system comprising: a phosphinimine catalyst having the formula $(1\text{-}R^2\text{-Ind})Ti(N\!\!=\!\!P(t\text{-}Bu)_3)X_2$ where $R^2$ is an alkyl group, an aryl group or a benzyl group wherein each of the alkyl group, the aryl group, or the benzyl group may be unsubstituted or substituted by at least one halide atom, and where X is an activatable ligand; and an activator.

In an embodiment of the invention, the first polyethylene copolymer is a copolymer of ethylene and an alpha-olefin having from 3-8 carbon atoms and is made in a single gas phase reactor with a polymerization catalyst system comprising: a phosphinimine catalyst having the formula $(1\text{-}R^2\text{-Ind})Ti(N\!\!=\!\!P(t\text{-}Bu)_3)X_2$ where $R^2$ is an alkyl group, an aryl group or a benzyl group wherein each of the alkyl group, the aryl group, or the benzyl group may be unsubstituted or substituted by at least one halide atom, where X is an activatable ligand; an activator; and an inert support.

In an embodiment of the invention, the first polyethylene copolymer is a copolymer of ethylene and an alpha-olefin having from 3-8 carbon atoms and is made in a single gas phase reactor with a polymerization catalyst system comprising: a phosphinimine catalyst having the formula $(1\text{-}R^2\text{-Ind})Ti(N\!\!=\!\!P(t\text{-}Bu)_3)X_2$ where $R^2$ is an alkyl group, an aryl group or a benzyl group wherein each of the alkyl group, the aryl group, or the benzyl group may be unsubstituted or substituted by at least one halide atom, where X is an activatable ligand; an activator; an inert support; and a catalyst modifier.

In an embodiment of the invention, the first polyethylene copolymer is a copolymer is a copolymer of ethylene and an alpha-olefin having from 3-8 carbon atoms and is made in a single gas phase reactor with a polymerization catalyst system comprising: a phosphinimine catalyst having the formula $(1\text{-}C_6F_5CH_2\text{—Ind})Ti(N\!\!=\!\!P(t\text{-}Bu)_3)X_2$ where X is an activatable ligand; an activator; and an inert support.

In an embodiment of the invention, the first polyethylene copolymer is a copolymer is a copolymer of ethylene and an alpha-olefin having from 3-8 carbon atoms and is made in a single gas phase reactor with a polymerization catalyst system comprising: a phosphinimine catalyst having the formula $(1\text{-}C_6F_5CH_2\text{—Ind})Ti(N\!\!=\!\!P(t\text{-}Bu)_3)X_2$ where X is an activatable ligand; an activator; an inert support; and a catalyst modifier.

The polymerization catalyst system may be fed to a reactor system in a number of ways. If the phosphinimine catalyst is supported on a suitable support, the catalyst may be fed to a reactor in dry mode using a dry catalyst feeder, examples of which are well known in the art. Alternatively, a supported phosphinimine catalyst may be fed to a reactor as a slurry in a suitable diluent. If the phosphinimine catalyst is unsupported, the catalyst can be fed to a reactor as a solution or as a slurry in a suitable solvent or diluents. Polymerization catalyst system components, which may include a phosphinimine catalyst, an activator, a scavenger, an inert support, and a catalyst modifier, may be combined prior to their addition to a polymerization zone, or they may be combined on route to a polymerization zone. To combine polymerization catalyst system components on route to a polymerization zone they can be fed as solutions or slurries (in suitable solvents or diluents) using various feed line configurations which may become coterminous before reaching the reactor. Such configurations can be designed to provide areas in which catalyst system components flowing to a reactor can mix and react with one another over various "hold up" times which can be moderated by changing the solution or slurry flow rates of the catalyst system components.

Optionally, scavengers are added to a polymerization process. Scavengers are well known in the art.

In an embodiment of the invention, scavengers are organoaluminum compounds having the formula: $Al^3(X^3)_n(X^4)_{3-n}$, where $(X^3)$ is a hydrocarbyl having from 1 to about 20 carbon atoms; $(X^4)$ is selected from alkoxide or aryloxide, any one of which having from 1 to about 20 carbon atoms; halide; or hydride; and n is a number from 1 to 3, inclusive; or alkylaluminoxanes having the formula: $R^3{}_2Al^1O\,(R^3Al^1O)_mAl^1R^3{}_2$ wherein each $R^3$ is independently selected from $C_{1-20}$ hydrocarbyl radicals and m is from 3 to 50. Some non-limiting examples of useful scavengers include triisobutylaluminum, triethylaluminum, trimethylaluminum or other trialkylaluminum compounds.

The scavenger may be used in any suitable amount but by way of non-limiting examples only, can be present in an amount to provide a molar ratio of Al:M (where M is the metal of the organometallic compound) of from about 20 to about 2000, or from about 50 to about 1000, or from about 100 to about 500. Generally the scavenger is added to the reactor prior to the catalyst and in the absence of additional poisons and over time declines to about 0, or is added continuously.

Optionally, the scavengers may be independently supported. For example, an inorganic oxide that has been treated with an organoaluminum compound or alkylaluminoxane may be added to the polymerization reactor. The method of addition of the organoaluminum or alkylaluminoxane compounds to the support is not specifically defined and is carried out by procedures well known in the art.

Preparation of the Polymer Blend

The polymer blend can be formed using conventional equipment and methods, such as by dry blending the individual components and subsequently melt mixing in a mixer or by mixing the components together directly in a mixer, such as, for example, a Banbury mixer, a Haake mixer, a Brabender internal mixer, or a single or twin-screw extruder, which can include a compounding extruder and a side-arm extruder used directly downstream of a polymerization process. A mixture or blend of the first and second polyethylene copolymers can be indicated by the uniformity of the morphology of the composition. In another example, the polymer blend can be produced in situ using a multistage polymerization reactor arrangement and process. In a multistage reactor arrangement two or more reactors can be connected in series where a mixture of a first polymer and catalyst can be transferred from a first reactor to a second reactor where a second polymer can be produced and blended in situ with the first polymer. A multi-stage polymerization reactor and methods for using the same can be similar to that discussed and described in for example, U.S. Pat. No. 5,677,375. Blending of polymer components while in solution is also contemplated for use in the present invention.

The polymer blend can include at least about 1 percent by weight (wt %) and up to about 99 wt % of the first polyethylene copolymer and at least about 1 wt % and up to about 99 wt % of the second polyethylene copolymer, based on the total weight of the first and second polyethylene copolymers.

In embodiments of the invention, the amount of the first polyethylene copolymer in the polymer blend will be in the range from a low of about 5 wt %, or about 10 wt %, or about 15 wt %, or about 20 wt %, or about 30 wt %, or about 40 wt % to a high of about 60 wt %, or about 70 wt %, or about 80 wt %, or about 90 wt %, or about 95 wt %, based on the total weight of the first and second polyethylene copolymers.

In embodiments of the invention, the amount of the first polyethylene copolymer in the polymer blend will be in the range of from about 1 wt % to about 50 wt %, or from about 5 wt % to about 50 wt %, or from about 7.5 wt % to about 50 wt %, or from about 10 wt % to about 50 wt %, or from about 12.5 wt % to about 50 wt %, or from about 12.5 wt % to about 40 wt %, or from about 15 wt % to about 40 wt %, or from about 10 wt % to about 35 wt %, or from about 10 wt % to about 45 wt %, or from about 10 wt % to about 30 wt %, or from about 7.5 wt % to about 30 wt %, or from about 5 wt % to about 35 wt %, or from about 5 wt % to about 30 wt %, or from about 5 wt % to about 25 wt %, or from about 1 wt % to about 25 wt %, based on the total weight of the first and second polyethylene copolymers. In further embodiments of the invention, the amount of the first polyethylene copolymer in the polymer blend can be at least about 5 wt %, or at least about 10 wt %, at least about 15 wt %, or at least about 20 wt %, or at least about 25 wt %, or at least about 30 wt %, or at least about 35 wt %, but less than about 50 wt %, based on the total weight of the first and second polyethylene copolymers.

In an embodiments of the invention, the amount of the first polyethylene copolymer in the polymer blend can be at least about 50 wt %, or at least about 60 wt %, at least about 70 wt %, or at least about 80 wt %, or at least about 90 wt % but less than about 100 wt %, based on the total weight of the first and second polyethylene copolymers.

In an embodiment of the invention, the polymer blend comprises from about 1 to about 99 wt % of a first polyethylene copolymer and 99 to 1 wt % of a second polyethylene copolymer, based on the total weight of the first and second polyethylene copolymers.

In an embodiment of the invention, the polymer blend comprises from about 5 to about 95 wt % of a first polyethylene copolymer and from about 95 to about 5 wt % of a second polyethylene copolymer, based on the total weight of the first and second polyethylene copolymers.

In an embodiment of the invention, the polymer blend comprises from about 1 to about 50 wt % of a first polyethylene copolymer and from about 99 to about 50 wt % of a second polyethylene copolymer, based on the total weight of the first and second polyethylene copolymers.

In an embodiment of the invention, the polymer blend comprises from about 5 to about 50 wt % of a first polyethylene copolymer and from about 95 to about 50 wt % of a second polyethylene copolymer, based on the total weight of the first and second polyethylene copolymers.

In an embodiment of the invention, the polymer blend comprises from about 95 to about 50 wt % of a first polyethylene copolymer and from about 5 to about 50 wt % of a second polyethylene copolymer, based on the total weight of the first and second polyethylene copolymers.

In an embodiment of the invention, the polymer blend comprises from about 95 to about 60 wt % of a first polyethylene copolymer and from about 5 to about 40 wt % of a second polyethylene copolymer, based on the total weight of the first and second polyethylene copolymers.

In an embodiment of the invention, the polymer blend comprises from about 90 to about 50 wt % of a first polyethylene copolymer and from about 10 to about 50 wt % of a second polyethylene copolymer, based on the total weight of the first and second polyethylene copolymers.

Additives

The polymer blend or the polymer blend components (i.e., the first and/or second polyethylene copolymers) of the current invention, may also contain additives, such as for example, primary antioxidants (such as hindered phenols, including vitamin E); secondary antioxidants (such as phosphites and phosphonites); nucleating agents, plasticizers or process aids (such as fluoroelastomer and/or polyethylene glycol bound process aid), acid scavengers, stabilizers, anticorrosion agents, blowing agents, other ultraviolet light absorbers such as chain-breaking antioxidants, etc., quenchers, antistatic agents, slip agents, anti-blocking agent, pigments, dyes and fillers and cure agents such as peroxide.

These and other common additives in the polyolefin industry may be present in polymer blend (and/or the first and/or second polyethylene copolymers) at from about 0.01 to about 50 wt % in one embodiment, and from about 0.1 to about 20 wt % in another embodiment, and from about 1 to about 5 wt % in yet another embodiment, wherein a desirable range may comprise any combination of any upper wt % limit with any lower wt % limit.

In an embodiment of the invention, antioxidants and stabilizers such as organic phosphites and phenolic antioxidants may be present in the polymer blend (and/or the first and/or second polyethylene copolymers) in from about 0.001 to about 5 wt % in one embodiment, and from about 0.01 to about 0.8 wt % in another embodiment, and from about 0.02 to about 0.5 wt % in yet another embodiment. Non-limiting examples of organic phosphites that are suitable are tris(2,4-di-tert-butylphenyl)phosphite (IRGAFOS 168) and tris(nonyl phenyl)phosphite (WESTON 399). Non-limiting examples of phenolic antioxidants include octadecyl 3,5 di-t-butyl-4-hydroxyhydrocinnamate (IRGANOX 1076) and pentaerythrityl tetrakis(3,5-di-tert-butyl-4-hydroxyphenyl) propionate (IRGANOX 1010); and 1,3,5-Tri (3,5-di-tert-butyl-4-hydroxybenzyl-isocyanurate (IRGANOX 3114).

Fillers may be present in the polymer blend (and/or the first and/or second polyethylene copolymers) in from about 0.1 to about 50 wt % in one embodiment, and from about 0.1 to about 25 wt % of the composition in another embodiment, and from about 0.2 to about 10 wt % in yet another embodiment. Fillers include but are not limited to titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, clays, alumina, and other metal oxides and carbonates, metal hydroxides, chrome, phosphorous and brominated flame retardants, antimony trioxide, silica, silicone, and blends thereof. These fillers may particularly include any other fillers and porous fillers and supports which are known in the art.

Fatty acid salts may also be present in the polymer blends (and/or the first and/or second polyethylene copolymers). Such salts may be present from about 0.001 to about 2 wt % in the polymer blend or in the polymer blend components in one embodiment, and from about 0.01 to about 1 wt % in another embodiment. Examples of fatty acid metal salts include lauric acid, stearic acid, succinic acid, stearyl lactic acid, lactic acid, phthalic acid, benzoic acid, hydroxystearic acid, ricinoleic acid, naphthenic acid, oleic acid, palmitic acid, and erucic acid, suitable metals including Li, Na, Mg, Ca, Sr, Ba, Zn, Cd, Al, Sn, Pb and so forth. Desirable fatty acid salts are selected from magnesium stearate, calcium stearate, sodium stearate, zinc stearate, calcium oleate, zinc oleate, and magnesium oleate.

With respect to the physical process of introducing to the polymer blend (and/or the first and/or second polyethylene copolymers) one or more additives, sufficient mixing should take place to assure that a uniform blend will be produced prior to conversion into a finished product. The polymer blend (and/or the first and/or second polyethylene copolymers) can be in any physical form when used to blend with the one or more additives. In one embodiment, reactor granules, defined as the granules of the polymer blend (and/or the first and/or second polyethylene copolymers) that are isolated and used to blend with the additives. The reactor granules have an average diameter of from about 10 µm to about 5 mm, and from about 50 µm to about 10 mm in another embodiment. Alternately, the polymer blend or its components may be in the form of pellets, such as, for example, having an average diameter of from about 1 mm to about 6 mm that are formed from melt extrusion of the reactor granules.

One method of blending the additives with the polymer blend (and/or the first and/or second polyethylene copolymers) is to contact the components in a tumbler or other physical blending means, the copolymer being in the form of reactor granules. This can then be followed, if desired, by melt blending in an extruder. Another method of blending the components is to melt blend the polymer blend or polymer blend component pellets with the additives directly in an extruder, or any other melt blending means.

Film Production

The extrusion-blown film process is a well-known process for the preparation of plastic film. The process employs an extruder which heats, melts and conveys the molten plastic (e.g., the polymer blend) and forces it through an annular die. Typical extrusion temperatures are from about 330 to about 500° F., especially about 350 to about 460° F.

The polyethylene film is drawn from the die and formed into a tube shape and eventually passed through a pair of draw or nip rollers. Internal compressed air is then introduced from a mandrel causing the tube to increase in diameter forming a "bubble" of the desired size. Thus, the blown film is stretched in two directions, namely in the axial direction (by the use of forced air which "blows out" the diameter of the bubble) and in the lengthwise direction of the bubble (by the action of a winding element which pulls the bubble through the machinery). External air is also introduced around the bubble circumference to cool the melt as it exits the die. Film width is varied by introducing more or less internal air into the bubble thus increasing or decreasing the bubble size. Film thickness is controlled primarily by increasing or decreasing the speed of the draw roll or nip roll to control the draw-down rate.

The bubble is then collapsed into two doubled layers of film immediately after passing through the draw or nip rolls. The cooled film can then be processed further by cutting or sealing to produce a variety of consumer products. While not wishing to be bound by theory, it is generally believed by those skilled in the art of manufacturing blown films that the physical properties of the finished films are influenced by both the molecular structure of a polyethylene copolymer and by the processing conditions. For example, the processing conditions are thought to influence the degree of molecular orientation (in both the machine direction and the axial or cross direction).

A balance of "machine direction" ("MD") and "transverse direction" ("TD"—which is perpendicular to MD) molecular orientation is generally considered desirable for the films associated with the invention (for example, Dart Impact strength, Machine Direction and Transverse Direction tear properties).

Thus, it is recognized that these stretching forces on the "bubble" can affect the physical properties of the finished film. In particular, it is known that the "blow up ratio" (i.e. the ratio of the diameter of the blown bubble to the diameter of the annular die) can have a significant effect upon the dart impact strength and tear strength of the finished film.

The above description relates to the preparation of monolayer films. Multilayer films may be prepared by 1) a "co-extrusion" process that allows more than one stream of molten polymer to be introduced to an annular die resulting in a multi-layered film membrane or 2) a lamination process in which film layers are laminated together.

In an embodiment of the invention, the films of this invention are prepared using the above described blown film process.

An alternative process is the so-called cast film process, wherein a polyethylene copolymer (or polymer blend) is melted in an extruder, then forced through a linear slit die, thereby "casting" a thin flat film. The extrusion temperature for cast film is typically somewhat hotter than that used in the blown film process (with typically operating temperatures of from about 450 to about 550° F.). In general, cast film is cooled (quenched) more rapidly than blown film.

In an embodiment of the invention, the films of this invention are prepared using a cast film process.

The films of the invention may be single layer or multiple layer films. The multiple layer films may comprise one or more layers formed from the polymer blend. The films may also have one or more additional layers formed from other materials such as other polymers, linear low density polyethylene (LLDPE), medium density polyethylene, polypropylene, polyester, low density polyethylene (HPLDPE), high density polyethylene (HDPE), ethylene vinyl acetate, ethylene vinyl alcohol and the like.

Multiple layer films may be formed by methods well known in the art. If all layers are polymer, the polymers may be coextruded through a coextrusion feed block and die assembly to yield a film with two or more layers adhered together but differing in composition. Multiple layer films may also be formed by extrusion coating whereby a substrate material is contacted with the hot molten polymer as it exits the die.

Polymer Blend Film Properties.

Films can be made from the polymer blends as defined above. Generally, an additive as described above is mixed with the polymer blends prior to film production. The polymer blends and films have a balance of processing and mechanical properties as well as good optical properties. Accordingly, in an embodiment of the invention, a ~1 mil monolayer film will have a dart impact strength of ≥about 250 g/mil, and a about 1% MD secant modulus of greater than about 140 MPa in combination with good film optical properties.

In embodiments of the invention, the film will have a dart impact of ≥about 220 g/mil, or ≥about 230 g/mil, or ≥about 240 g/mil, or ≥about 250 g/mil, or ≥about 350 g/mil, or ≥about 400 g/mil, or ≥about 450 g/mil, or ≥about 500 g/mil, or ≥about 550 g/mil, or ≥about 600 g/mil, or ≥about 650 g/mil, or ≥about 700 g/mil. In another embodiment of the invention, the film will have a dart impact of from about 230 g/mil to about 900 g/mil. In another embodiment of the invention, the film will have a dart impact of from about 230 g/mil to about 800 g/mil. In another embodiment of the invention, the film will have a dart impact of from about 250 g/mil to about 750 g/mil. In a further embodiment of the invention, the film will have dart impact of from about 300 g/mil to about 750 g/mil. In a further embodiment of the invention, the film will have dart impact of from about 350 g/mil to about 750 g/mil. In a further embodiment of the invention, the film will have dart impact of from about 400 g/mil to about 750 g/mil. In a further embodiment of the invention, the film will have dart impact of from about 450 g/mil to about 750 g/mil. In yet another embodiment of the invention, the film will have dart impact of from about 500 g/mil to about 750 g/mil. In yet another embodiment of the invention, the film will have dart impact of from about 550 g/mil to about 750 g/mil. In still yet another embodiment of the invention, the film will have dart impact of from about 600 g/mil to about 750 g/mil. In a further embodiment of the invention, the film will have dart impact of from about 650 g/mil to about 750 g/mil. In a further embodiment of the invention, the film will have dart impact of from about 650 g/mil to about 800 g/mil.

In embodiments of the invention, the film will have a ratio of MD tear to TD tear (MD tear/TD tear) of less than about 0.95, but greater than about 0.10, or less than about 0.80, but greater than about 0.10. In another embodiment of the invention, the film will have a ratio of MD tear to TD tear of from about 0.10 to about 0.95. In another embodiment of the invention, the film will have a ratio of MD tear to TD tear of from about 0.10 to about 0.80. In another embodiment of the invention, the film will have a ratio of MD tear to TD tear of from about 0.10 to about 0.75. In yet another embodiment of the invention, the film will have a ratio of MD tear to TD tear of from about 0.1 to about 0.70. In still another embodiment of the invention, the film will have a ratio of MD tear to TD tear of from about 0.2 to about 0.70. In another embodiment of the invention, the film will have a ratio of MD tear to TD tear of from 0.25 to 0.65.

In embodiments of the invention, a ~1 mil film will have a machine direction (MD) secant modulus at about 1% strain of ≥about 120 MPa, or ≥about 130 MPa, or ≥about 140 MPa, or ≥about 150 MPa, or ≥about 160 MPa. In an embodiment of the invention, a ~1 mil film will have a machine direction (MD) secant modulus at about 1% strain of from about 120 MPa to about 260 MPa. In an embodiment of the invention, a ~1 mil film will have a machine direction (MD) secant modulus at about 1% strain of from about 130 MPa to about 230 MPa. In another embodiment of the invention, a ~1 mil film will have a machine direction (MD) secant modulus at about 1% strain of from about 130 MPa to about 210 MPa. In another embodiment of the invention, a ~1 mil film will have a machine direction (MD) secant modulus at about 1% strain of from about 120 MPa to about 200 MPa. In another embodiment of the invention, a ~1 mil film will have a machine direction (MD) secant modulus at about 1% strain of from about 120 MPa to about 190 MPa. In another embodiment of the invention, a ~1 mil film will have a machine direction (MD) secant modulus at about 1% strain of from about 130 MPa to about 180 MPa.

In an embodiment of the invention, a ~1 mil film will have a transverse direction (TD) secant modulus at about 1% strain of ≥about 130 MPa, or ≥about 140 MPa, or ≥about 150 MPa, or ≥about 160 MPa, or ≥about 170 MPa, or ≥about 180 MPa, or ≥about 190 MPa. In an embodiment of the invention, a ~1 mil film will have a transverse direction (TD) secant modulus at about 1% strain of from about 120 MPa to about 280 MPa. In an embodiment of the invention, a ~1 mil film will have a transverse direction (TD) secant modulus at about 1% strain of from about 120 MPa to about 270 MPa. In another embodiment of the invention, a ~1 mil film will have a transverse direction (TD) secant modulus at about 1% strain of from about 120 MPa to about 260 MPa. In another embodiment of the invention, a ~1 mil film will have a transverse direction (TD) secant modulus at about 1% strain of from about 130 MPa to about 240 MPa. In another embodiment of the invention, a ~1 mil film will have a transverse direction (TD) secant modulus at about 1% strain of from about 130 MPa to about 220 MPa. In another embodiment of the invention, a ~1 mil film will have a transverse direction (TD) secant modulus at about 1% strain of from about 120 MPa to about 220 MPa. In yet another embodiment of the invention, a ~1 mil film will have a transverse direction (TD) secant modulus at about 1% strain of from about 130 MPa to about 210 MPa. In yet another embodiment of the invention, a ~1 mil film will have a transverse direction (TD) secant modulus at about 1% strain of from about 130 MPa to about 200 MPa. In yet another embodiment of the invention, a ~1 mil film will have a transverse direction (TD) secant modulus at about 1% strain of from about 130 MPa to about 190 MPa.

In an embodiment of the invention, a ~1 mil film will have a haze of less than about 15% and a gloss at about 45° of at least about 40. In an embodiment of the invention, a ~1 mil film will have a haze of less than about 15% and a gloss at about 45° of at least about 45. In an embodiment of the invention, a ~1 mil film will have a haze of less than about 12% and a gloss at about 45° of at least about 50. In an embodiment of the invention, a ~1 mil film will have a haze of less than about 12% and a gloss at about 45° of at least about 55. In an embodiment of the invention, a ~1 mil film will have a haze of less than about 10% and a gloss at about 45° of at least about 50. In an embodiment of the invention, a ~1 mil film will have a haze of less than about 10% and a gloss at about 45° of at least about 55. In an embodiment of the invention, a ~1 mil film will have a haze of less than about 10% and a gloss at about 45° of at least about 60. In another embodiment of the invention, a ~1 mil film will have a haze of less than about 7% and a gloss at about 45° of at least about 55. In another embodiment of the invention, a ~1 mil film will have a haze of less than about 7% and a gloss at about 45° of at least about 60. In another embodiment of the invention, a ~1 mil film will have a haze of less than about 7% and a gloss at about 45° of at least about 65. In another embodiment of the invention, a ~1 mil film will have a haze of less than about 7% and a gloss at about 45° of at least about 70.

The film may, by way of non-limiting example, have a total thickness ranging from about 0.5 mils to about 4 mils (note: 1 mil=0.0254 mm), which will depend on for example the die gap employed during film casting or film blowing.

The above description applies to monolayer films. However, the films disclosed and claimed herein may be used in a multilayer film. Multilayer films can be made using a co-extrusion process or a lamination process. In co-extrusion, a plurality of molten polymer streams are fed to an annular die (or flat cast) resulting in a multi-layered film on cooling. In lamination, a plurality of films are bonded together using, for example, adhesives, joining with heat and pressure and the like. A multilayer film structure may, for example, contain tie layers and/or sealant layers.

The films disclosed and claimed herein may be a skin layer or a core layer and can be used in at least one or a plurality of layers in a multilayer film. The term "core" or the phrase "core layer", refers to any internal film layer in a multilayer film. The phrase "skin layer" refers to an outermost layer of a multilayer film (for example, as used in the production of produce packaging). The phrase "sealant layer" refers to a film that is involved in the sealing of the film to itself or to another layer in a multilayer film. A "tie layer" refers to any internal layer that adheres two layers to one another.

By way of non-limiting example only, the thickness of the multilayer films can be from about 0.5 mil to about 10 mil total thickness.

In an embodiment of the invention, a monolayer or multilayer film structure comprises at least one layer comprising a polymer blend comprising the first and second polyethylene copolymers described above.

By way of non-limiting examples, the films can be used for heavy duty bags, shrink film, stretch film, agricultural film, garbage bags and shopping bags. The films can be produced by blow extrusion, cast extrusion, co-extrusion and be incorporated also in laminated structures.

In an embodiment of the invention, a blown film is provided which comprises the polymer blend described above.

In an embodiment of the invention, a cast film is provided which comprises the polymer blend described above.

In embodiments of the invention, a stretch film, or a shrink film is provided which comprises the polymer blend described above.

In embodiments of the invention, a blown film, or a cast film having a haze of less than about 10% and a gloss at about 45° of greater than about 55 is provided which comprises the polymer blend described above.

In an embodiment of the invention, a stretch film or a cast film having a haze of less than about 10% and a gloss at about 45° of greater than about 55 is provided which comprises the polymer blend described above.

The present invention will further be described by reference to the following examples. The following examples are merely illustrative of the invention and are not intended to be limiting. Unless otherwise indicated, all percentages are by weight unless otherwise specified.

EXAMPLES

General

All reactions involving air and or moisture sensitive compounds were conducted under nitrogen using standard Schlenk and cannula techniques, or in a glovebox. Reaction solvents were purified either using the system described by Pangborn et. al. in *Organometallics* 1996, v 15, p. 1518 or used directly after being stored over activated 4 Å molecular sieves. The methylaluminoxane used was a 10% MAO solution in toluene supplied by Albemarle which was used as received. The support used was silica Sylopol 2408 obtained from W.R. Grace. & Co. The support was calcined by fluidizing with air at 200° C. for 2 hours followed by nitrogen at 600° C. for 6 hours and stored under nitrogen.

Melt index, $I_2$, in g/10 min was determined on a Tinius Olsen Plastomer (Model MP993) in accordance with ASTM D1238 condition F at 190° C. with a 2.16 kilogram weight. Melt index, $I_{10}$, was determined in accordance with ASTM D1238 condition F at 190° C. with a 10 kilogram weight. High load melt index, $I_{21}$, in g/10 min was determined in accordance with ASTM D1238 condition E at 190° C. with a 21.6 kilogram weight. Melt flow ratio or "MFR" for short (also sometimes called melt index ratio) is $I_{21}/I_2$.

Polymer density was determined in grams per cubic centimeter (g/cc) according to ASTM D792.

Molecular weight information ($M_w$, $M_n$ and $M_z$ in g/mol) and molecular weight distribution ($M_w/M_n$), and z-average molecular weight distribution ($M_z/M_w$) were analyzed by gel permeation chromatography (GPC), using an instrument sold under the trade name "Waters 150c", with 1,2,4-trichlorobenzene as the mobile phase at 140° C. The samples were prepared by dissolving the polymer in this solvent and were run without filtration. Molecular weights are expressed as polyethylene equivalents with a relative standard deviation of 2.9% for the number average molecular weight ("Mn") and 5.0% for the weight average molecular weight ("Mw"). Polymer sample solutions (1 to 2 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect the columns from oxidative degradation. The sample injection volume was 200 mL. The raw data were processed with Cirrus GPC software. The columns were calibrated with narrow distribution polystyrene standards. The polystyrene molecular weights were converted to polyethylene molecular weights using the Mark-Houwink equation, as described in the ASTM standard test method D6474.

The branch frequency of copolymer samples (i.e. the short chain branching, SCB per 1000 carbons) and the $C_6$ comonomer content (in wt %) was determined by Fourier Transform Infrared Spectroscopy (FTIR) as per the ASTM D6645-01 method. A Thermo-Nicolet 750 Magna-IR Spectrophotometer equipped with OMNIC version 7.2a software was used for the measurements.

The determination of branch frequency as a function of molecular weight (and hence the comonomer distribution) was carried out using high temperature Gel Permeation Chromatography (GPC) and FT-IR of the eluent. Polyethylene standards with a known branch content, polystyrene and hydrocarbons with a known molecular weight were used for calibration.

Hexane extractables compression molded plaques were determined according to ASTM D5227.

To determine the composition distribution breadth index $CDBI_{50}$, which is also designated CDBI(50) in the present invention, a solubility distribution curve is first generated for the copolymer. This is accomplished using data acquired from the TREF technique. This solubility distribution curve is a plot of the weight fraction of the copolymer that is solubilized as a function of temperature. This is converted to a cumulative distribution curve of weight fraction versus comonomer content, from which the $CDBI_{50}$ is determined by establishing the weight percentage of a copolymer sample that has a comonomer content within 50% of the median comonomer content on each side of the median (see WO 93/03093 for the definition of $CDBI_{50}$). The weight percentage of copolymer eluting at from 90-105° C., is determined by calculating the area under the TREF curve at an elution temperature of from 90 to 105° C. The weight percent of copolymer eluting below at or 40° C. and above 100° C. was determined similarly. For the purpose of simplifying the correlation of composition with elution temperature, all fractions are assumed to have a Mn≥15,000, where Mn is the number average molecular weight of the fraction. Any low weight fractions present generally represent a trivial portion of the polymer. The remainder of this description and the appended claims maintain this convention of assuming all fractions have Mn≥15,000 in the $CDBI_{50}$ measurement.

The specific temperature rising elution fractionation (TREF) method used herein was as follows. Homogeneous polymer samples (pelletized, 50 to 150 mg) were introduced into the reactor vessel of a crystallization-TREF unit (Polymer ChAR™). The reactor vessel was filled with 20 to 40 ml 1,2,4-trichlorobenzene (TCB), and heated to the desired dissolution temperature (e.g. 150° C.) for 1 to 3 hours. The solution (0.5 to 1.5 ml) was then loaded into the TREF column filled with stainless steel beads. After equilibration at a given stabilization temperature (e.g. 110° C.) for 30 to 45 minutes, the polymer solution was allowed to crystallize with a temperature drop from the stabilization temperature to 30° C. (0.1 or 0.2° C./minute). After equilibrating at 30° C. for 30 minutes, the crystallized sample was eluted with TCB (0.5 or 0.75 mL/minute) with a temperature ramp from 30° C. to the stabilization temperature (0.25 or 1.0° C./minute). The TREF column was cleaned at the end of the run for 30 minutes at the dissolution temperature. The data were processed using Polymer ChAR software, Excel spreadsheet and TREF software developed in-house.

The TREF procedures described above are well known to persons skilled in the art and can be used to determine the modality of a TREF profile, a $CDBI_{50}$, a copolymer wt % eluting at or below 40° C., a copolymer wt % eluting at above 100° C., a copolymer wt % eluting at from 90° C. to 105° C., a T(75)-T(25) value, as well as the temperatures or temperature ranges where elution intensity maxima (elution peaks) occur.

The melting points including a peak melting point ($T_m$) and the percent crystallinity of the copolymers are determined by using a TA Instrument DSC Q1000 Thermal Analyzer at 10° C./min. In a DSC measurement, a heating-cooling-heating cycle from room temperature to 200° C. or vice versa is applied to the polymers to minimize the thermo-mechanical history associated with them. The melting point and percent of crystallinity are determined by the primary peak temperature and the total area under the DSC curve respectively from the second heating data. The peak melting temperature $T_m$ is the higher temperature peak, when two peaks are present in a bimodal DSC profile (typically also having the greatest peak height).

The melt strength of a polymer is measured on Rosand RH-7 capillary rheometer (barrel diameter=15 mm) with a flat die of 2-mm Diameter, L/D ratio 10:1 at 190° C. Pressure Transducer: 10,000 psi (68.95 MPa). Piston Speed: 5.33 mm/min. Haul-off Angle: 52°. Haul-off incremental speed: 50-80 m/min² or 65±15 m/min². A polymer melt is extruded through a capillary die under a constant rate and then the polymer strand is drawn at an increasing haul-off speed until it ruptures. The maximum steady value of the force in the plateau region of a force versus time curve is defined as the melt strength for the polymer.

Dynamic Mechanical Analysis (DMA). Rheological measurements (e.g. small-strain (10%) oscillatory shear measurements) were carried out on a dynamic Rheometrics SR5 Stress rotational rheometer with 25 mm diameter parallel plates in a frequency sweep mode under full nitrogen blanketing. The polymer samples are appropriately stabilized with the anti-oxidant additives and then inserted into the test fixture for at least one minute preheating to ensure the normal force decreasing back to zero. All DMA experiments are conducted at 10% strain, 0.05 to 100 rad/s and 190° C. Orchestrator Software is used to determine the viscoelastic parameters including the storage modulus (G'), loss modulus (G"), phase angle (δ), complex modulus (G*) and complex viscosity (η*).

The complex viscosity |η*(ω)| versus frequency (ω) data were then curve fitted using the modified three parameter Carreau-Yasuda (CY) empirical model to obtain the zero shear viscosity $\eta_0$, characteristic viscous relaxation time $t_\eta$, and the breadth of rheology parameter-a. The simplified Carreau-Yasuda (CY) empirical model used is as follows:

$$|\eta^*(\omega)| = \eta_0/[1+(T_\eta\omega)^a]^{(1-n)/a}$$

wherein: |η*(ω)|=magnitude of complex shear viscosity; $\eta_0$=zero shear viscosity; $T_\eta$=characteristic relaxation time; a="breadth" of rheology parameter (which is also called the "Carreau-Yasuda shear exponent" or the "CY a-parameter" or simply the "a-parameter" in the current invention); n=fixes the final power law slope, fixed at 2/11; and ω=angular frequency of oscillatory shearing deformation. Details of the significance and interpretation of the CY model and derived parameters may be found in: C. A. Hieber and H. H. Chiang, *Rheol. Acta*, 28, 321 (1989); C. A. Hieber and H. H. Chiang, *Polym. Eng. Sci.*, 32, 931 (1992); and R. B. Bird, R. C. Armstrong and O. Hasseger, *Dynamics of Polymeric Liquids*, Volume 1, *Fluid Mechanics*, 2nd Edition, John Wiley & Sons (1987); each of which is incorporated herein by reference in its entirety.

The Shear Thinning Index (SHI) was determined according to the method provided in U.S. Pat. Appl. No. 2011/0212315: the SHI is defined as SHI(ω)=η*(ω)/η⁰ for any given frequency (ω) for dynamic viscosity measurement, wherein η0 is zero shear viscosity @190° C. determined via the empiric Cox-Merz-rule. η* is the complex viscosity @190° C. determinable upon dynamic (sinusoidal) shearing or deformation of a copolymer as determined on a Rheometrics SR5 Stress rotational rheometer using parallel-plate geometry. According to the Cox-Merz-Rule, when the frequency (ω) is expressed in Radiant units, at low shear rates, the numerical value of η* is equal to that of conventional, intrinsic viscosity based on low shear capillary measurements. The skilled person in the field of rheology is well versed with determining $\eta^0$ in this way. The shear thinning ratio shear thinning ratio ($\eta^*_{0.1}/\eta^*_{10}$) can be determined similarly using DMA by determining the complex viscosity at frequencies 0.1 and 10 rad/sec.

The films of the current examples were made on a blown film line manufactured by Battenfeld Gloucester Engineering Company of Gloucester, Mass. using a die diameter of 4 inches, and a die gap of 35 or 100 mil. This blown film line has a standard output of more than 100 pounds per hour and is equipped with a 50 horsepower motor. Screw speed was 35 to 50 RPM. The extender screw has a 2.5 mil diameter and a length/diameter (L/D) ratio of 24/1. Melt Temperature and Frost Line Height (FLH) are 420 to 430° F. and 16 to 18 inches respectively. The blown film bubble is air cooled. Typical blow up ratio (BUR) for blown films prepared on this line are from 1.5/1 to 4/1. An annular die having a gap of 35 mils was used for these experiments. The films of this example were prepared using a BUR aiming point of 2.5:1 and a film thickness aiming point of 1.0 mils.

The haze (%) was measured in accordance with the procedures specified in ASTM D 1003-07, using a BYK-Gardner Haze Meter (Model Haze-gard plus).

Dart impact strength was measured on a dart impact tester (Model D2085AB/P) made by Kayeness Inc. in accordance with ASTM D-1709-04 (method A).

Machine (MD) and transverse (TD) direction Elmendorf tear strengths were measured on a ProTear™ Tear Tester made by Thwing-Albert Instrument Co. in accordance with ASTM D-1922.

Puncture resistance was measured on a MTS Systems Universal Tester (Model SMT(HIGH)-500N-192) in accordance with ASTM D-5748

MD or TD secant modulus was measured on an Instrument 5-Head Universal Tester (Model TTC-102) at a crosshead speed of 0.2 in/min up to 10% strain in accordance with ASTM D-882-10. The MD or TD secant modulus was determined by an initial slope of the stress-strain curve from an origin to 1% strain.

Film tensile testing was conducted on an Instrument 5-Head Universal Tester (Model TTC-102) in accordance with ASTM D-882-10.

Gloss was measured on a BYK-Gardner 45° Micro-Gloss unit in accordance with ASTM D2457-03.

A seal was prepared by clamping two 2.0 mil film strips between heated upper and lower seal bars on a SL-5 Sealer made by Lako Tool for 0.5 seconds, 40 psi seal bar clamping pressure for each temperature in the range from onset of seal to melt through. Seal strength or sealability parameter was measured as a function of seal temperature on an Instrument 5-Head Universal Tester (Model TTC-102) in accordance with ASTM F88-09.

Polymer Blend Components

Resins 1A-1F: The First Polyethylene Copolymer.

These resins were made using a supported catalyst having the formula $(1-C_6F_5CH_2-\text{Indenyl})((t-Bu)_3P=N)TiCl_2$ as is further described below.

Synthesis of $(1-C_6F_5CH_2-\text{Indenyl})((t-Bu)_3P=N)TiCl_2$.

To distilled indene (15.0 g, 129 mmol) in heptane (200 mL) was added BuLi (82 mL, 131 mmol, 1.6 M in hexanes) at room temperature. The resulting reaction mixture was stirred overnight. The mixture was filtered and the filter cake washed with heptane (3×30 mL) to give indenyllithium (15.62 g, 99% yield). Indenyllithium (6.387 g, 52.4 mmol) was added as a solid over 5 minutes to a stirred solution of $C_6F_5CH_2$—Br (13.65 g, 52.3 mmol) in toluene (100 mL) at room temperature. The reaction mixture was heated to 50° C. and stirred for 4 h. The product mixture was filtered and washed with toluene (3×20 mL). The combined filtrates were evaporated to dryness to afford $1-C_6F_5CH_2$-indene (13.58 g, 88%). To a stirred slurry of $TiCl_4 \cdot 0.2THF$ (1.72 g, 5.15 mmol) in toluene (15 mL) was added solid $(t-Bu)_3P=N—Li$ (1.12 g, 5 mmol) at room temperature. The resulting reaction mixture was heated at 100° C. for 30 min and then allowed to cool to room temperature. This mixture containing $((t-Bu)_3P=N)TiCl_3$ (1.85 g, 5 mmol) was used in the next reaction. To a THF solution (10 mL) of $1-C_6F_5CH_2$-indene (1.48 g, 5 mmol) cooled at −78° C. was added n-butyllithium (3.28 mL, 5 mmol, 1.6 M in hexanes) over 10 minutes. The resulting dark orange solution was stirred for 20 minutes and then transferred via a double-ended needle to a toluene slurry of $((t-Bu)_3P=N)TiCl_3$ (1.85 g, 5 mmol). The cooling was removed from the reaction mixture which was stirred for a further 30 minutes. The solvents were evaporated to afford a yellow pasty residue. The solid was re-dissolved in toluene (70 mL) at 80° C. and filtered hot. The toluene was evaporated to afford pure $(1-C_6F_5CH_2-\text{Indenyl})((t-Bu)_3P=N)TiCl_2$ (2.35 g, 74%).

Drying of the Catalyst Modifier.

950 g of commercially available Armostat® 1800 (mp 50° C., by >300° C.), which was used as a catalyst modifier, was loaded in a 2 L-round bottom flask and melted in an oil bath at 80° C. The oil bath temperature was then raised to 110° C. and a high vacuum was applied while maintaining stirring. At first, a lot of bubbles were seen due to the release of gas and moisture vapor. Approximately two hours later, gas evolution subsided and heating/evacuation was continued for another hour. The Armostat 1800 material was then cooled down to room temperature and stored under nitrogen atmosphere until use.

To determine the level of moisture in the Armostat 1800, a 15 wt % of an Armostat solution in pre-dried toluene was prepared and the moisture of the solution was determined by Karl-Fischer titration method. The moisture levels in Armostat 1800 as received from the commercial supplier, as well as that dried by traditional methods (i.e. drying the solution over molecular sieves) and by use of low pressure water distillation was determined. The unpurified catalyst modifier was found to make a 15 wt % toluene solution having 138 ppm of $H_2O$. The catalyst modifier which was dried over molecular sieves was found to make a 15 wt % toluene solution having 15-20 ppm of $H_2O$. The catalyst modifier which was dried by vacuum distillation of water was found to make a 15 wt % toluene solution having 14-16 ppm of $H_2O$. It has thus been shown, that simple vacuum distillation to remove water is as effective as drying methods which employ molecular sieves. In fact, the vacuum distillation has an advantage over use of molecular sieves as a drying agent in that it is far less time consuming (molecular sieves took over 2 days to dry the catalyst modifier sufficiently and multiple batches of the sieves were needed), and more cost effective (the use of sieves led to a decrease in the concentration of the catalyst modifier in toluene solution due to catalyst modifier absorption into the sieves, and required large quantities of solvent to sufficiently solubilize the catalyst modifier in order to make efficient contact with the sieves).

Preparation of Supported Catalyst.

Sylopol 2408 silica purchased from Grace Davison was calcined by fluidizing with air at 200° C. for 2 hours and subsequently with nitrogen at 600° C. for 6 hours. 114.273 grams of the calcined silica was added to 620 mL of toluene. 312.993 g of a MAO solution containing 4.5 weight % Al purchased from Albemarle was added to the silica slurry quantitatively. The mixture was stirred for 2 hours at ambient temperature. The stirring rate should be such so as not to break-up the silica particles. 2.742 grams of $(1-C_6F_5CH_2—Indenyl)((t-Bu)_3P=N)TiCl_2$ (prepared as above in Example 1) was weighed into a 500-mL Pyrex bottle and 300 mL of toluene added. The metal complex solution was added to the silica slurry quantitatively. The resulting slurry was stirred for 2 hours at ambient temperature. 21.958 g of 18.55 wt % toluene solution of Armostat® 1800 was weighed into a small vessel and transferred quantitatively to the silica slurry. The resulting mixture was stirred for a further 30 minutes after which the slurry was filtered, yielding a clear filtrate. The solid component was washed with toluene (2×150 mL) and then with pentane (2×150 mL). The final product was dried in vacuo to between 450 and 200 mtorr and stored under nitrogen until used. The finished catalyst had a pale yellow to pale orange color. The catalyst had 2.7 wt % of Armostat present.

Polymerization—TSR

Continuous ethylene/1-hexene gas phase copolymerization experiments were conducted in a 56.4 L Technical Scale Reactor (TSR) in continuous gas phase operation (for an example of a TSR reactor set up, see Eur. Pat. Appl. No. 659,773A1). Ethylene polymerizations were run at 75° C. to 90° C. with a total operating pressure of 300 pounds per square inch gauge (psig). Gas phase compositions for ethylene and 1-hexene were controlled via closed-loop process control to values of 65.0 and 0.5-2.0 mole %, respectively. Hydrogen was metered into the reactor in a molar feed ratio of 0.0008-0.0020 relative to ethylene feed during polymerization. Nitrogen constituted the remainder of the gas phase mixture (approximately 34-64 mole %). A typical production rate for these conditions is 2.0 to 3.0 kg of polyethylene per hour. A seed-bed was used and prior to polymerization start-up was washed with a small amount of triethylaluminum, TEAL to scavenge impurities. Prior to introduction of the catalyst TEAL was flushed from the reactor. The catalyst was fed to the reactor together with small amount of dilute TEAL solution (0.25 wt %) during the start-up phase. The addition of TEAL was discontinued once the desired polymer production rate was reached. Alternatively, the reactor can be started with the catalyst feed line alone during the polymerization start-up phase (that is, without initially feeding the TEAL solution). The polymerization reaction was initiated under conditions of low comonomer concentration, followed by gradual adjustment of the comonomer to ethylene ratio to provide the targeted polymer density.

Pelletization of Granular Resins.

500 ppm of Irganox 1076 and 1000 ppm of Irgafos 168 were dry blended with the granular resin prior to pelletization. The resulting powder blend was extruded on Leistritz twin-screw extruder with a screw diameter of 38 mm and L/D ratio of 33/1 under nitrogen atmosphere to minimize polymer degradation. The pelletization conditions of the extruder were set at a melt temperature of 210° C. an output rate of 20 to 25 lb/hr, a screw speed of 120 rpm and a pelletizer speed of 30 to 40 rpm. The pelleted resin was cooled and then collected for the resin characterization and film evaluation.

Catalyst composition information and steady state polymerization conditions are provided in Table 1 for examples 1A and 1B (C2=ethylene; C6=1-hexene; H2=hydrogen; and C6/C2 for example is the molar feed ratio of each component to the reactor). Polymer data for the resulting resins 1A and 1B are provided in Table 2.

Polymerization-Pilot Plant

Ethylene/1-hexene copolymerization experiments were conducted in a continuous fluidized bed gas phase Pilot Plant scale reactor. An example of a reactor configuration and typical process operational parameters is given in, for example, U.S. Pat. No. 8,338,551 B2 and in Eur. Pat. Appl. No. 1,308,464 A1 (see Examples 10 and 11). Ethylene polymerizations were run at 80° C. to 85° C. with a total operating pressure of 300 pounds per square inch gauge (psig). Gas phase compositions for ethylene and 1-hexene were controlled via closed-loop process control to values of 35-50.0 and 0.5-2.0 mole %, respectively. Hydrogen was metered into the reactor in a molar feed ratio of 0.0008-0.0015 relative to ethylene feed during polymerization. Nitrogen constituted the remainder of the gas phase mixture (approximately 34-49 mole %). A typical production rate for these conditions is 100 to 250 kg of polyethylene per hour. A seed-bed was used and prior to polymerization start-up was washed with a small amount of triethylaluminum, TEAL to scavenge impurities. The required gas composition of ethylene, 1-hexene, hydrogen, nitrogen and pentane/ isopentane in the reactor is built to target amounts before injection of catalyst. The level of pentane/isopentane can range from 9 to 17 mole % in the reactor. The reactor was started with the catalyst feed line alone without additional scavenging with TEAL during the polymerization start-up. The polymerization reaction was initiated under conditions of lower comonomer concentration and higher hydrogen concentration, followed by gradual adjustment of the comonomer to ethylene ratio and hydrogen to ethylene ratio to achieve targeted polymer density and melt index. Pelletization of the granular resin was carried out as per TSR scale (see above).

Catalyst composition information and steady state polymerization conditions are provided in Table 1 for examples 1C-1F (C2=ethylene; C6=1-hexene; H2=hydrogen; and C6/C2, for example, is the molar feed ratio of each component to the reactor). Polymer data for the resulting resins 1C-1F are provided in Table 2.

TABLE 1

| | TSR | | Pilot Plant | | | |
|---|---|---|---|---|---|---|
| Example No. | 1A | 1B | 1C | 1D | 1E | 1F |
| Catalyst | | | | | | |
| Ti, wt % | 0.14 | 0.12 | 0.12 | 0.134 | 0.134 | 0.134 |
| Al, wt % | 9.4 | 7 | 7 | 7.86 | 7.86 | 7.86 |
| Si, wt % | 35.5 | 38.3 | 37.8 | 37.3 | 37.3 | 37.3 |
| Armostat, wt % | 2.7 | 2.5 | 2.5 | 2.5 | 2.5 | 2.5 |
| Process | | | | | | |
| Productivity (g PE/g Cat) | 3400 | 1300 | 2480 | 3675 | 5656 | 5339 |
| Ethylene (mole %) | 50 | 56 | 39 | 45 | 46 | 44 |
| Hydrogen (mol %) | 0.035 | 0.034 | 0.029 | 0.027 | 0.032 | 0.032 |
| 1-Hexene (mol %) | 0.8603 | 0.9586 | 0.6903 | 0.8562 | 0.8049 | 0.7671 |
| C6/C2 (mol/mol feed to reactor) | 0.0232 | 0.0215 | 0.0251 | 0.0260 | 0.0260 | 0.0260 |
| H2/C2 (mol/mol feed to reactor) | 0.0013 | 0.0013 | 0.0015 | 0.0015 | 0.0019 | 0.0019 |
| H2/C2 in reactor (mol/mol Gas composition) | 0.00070 | 0.00062 | 0.00075 | 0.00060 | 0.00070 | 0.00073 |
| C6/C2 in reactor (mol/mol Gas composition) | 0.0172 | 0.0173 | 0.0176 | 0.0190 | 0.0175 | 0.0175 |
| Temp (° C.) | 80 | 80 | 82.5 | 82.5 | 80.0 | 82.5 |
| Production rate (kg/hr) | 2.58 | 2.46 | 180 | 172 | 202 | 202 |
| Residence Time (hrs) | 1.8 | 1.8 | 2.6 | 2.0 | 2.4 | 2.5 |
| Bulk Density (lb per cubic foot) | 22.5 | 19.5 | 20.6 | 24.5 | 28.2 | 26.1 |
| Isopentane and Pentane in reactor, (mole %) | 0 | 11 | 17 | 11 | 12 | 11 |
| TEAL as scavenger | yes | no | no | no | no | No |

TABLE 2

| | Copolymer Properties | | | | | |
|---|---|---|---|---|---|---|
| Copolymer No. | 1A | 1B | 1C | 1D | 1E | 1F |
| density (g/cc) | 0.9208 | 0.922 | 0.922 | 0.9214 | 0.9224 | 0.9228 |
| MI, $I_2$ (g/10 min) | 0.58 | 0.53 | 0.52 | 0.57 | 0.56 | 1.22 |
| MFR, $I_{21}/I_2$ | 44.5 | 42.7 | 33.5 | 37.8 | 43 | 35.3 |
| $I_{10}/I_2$ | 10.9 | 10.6 | 9.11 | 9.67 | 10.3 | 9.1 |
| Comonomer | 1-hexene | 1-hexene | 1-hexene | 1-hexene | 1-hexene | 1-hexene |
| TREF profile | trimodal, T(low) = 71.5° C.; T(med) = 81.3° C.; T(high) = 92.3° C. | multimodal, T(high) = 93.6° C.; T(low) = 73.6° C. | multimodal, T(low) = 77.7° C.; T(high) = 93.4° C. | multimodal, T(high) = 93.1° C.; T(low) = 73.4° C. | multimodal, T(high) = 93.2° C.; T(low) = 74.4° C. | multimodal, T(high) = 93.1° C.; T(low) = 74.9° C. |
| T(med) − T(low), ° C. | 9.8 | — | NA | — | — | — |
| T(high) − T(med), ° C. | 11.0 | — | NA | — | — | — |
| T(high) − T(low), ° C. | 20.2 | 20.0 | 15.7 | 19.7 | 18.8 | 18.2 |

TABLE 2-continued

Copolymer Properties

| Copolymer No. | 1A | 1B | 1C | 1D | 1E | 1F |
|---|---|---|---|---|---|---|
| wt % at 90-105° C. | 12.9 | 15.4 | 15.4 | 15.1 | 14.6 | 13.9 |
| T(75) − T(25) (° C.) | 14.4 | 13.75 | 9.7 | 13.7 | 13.3 | 13 |
| CDBI$_{50}$ (wt %) | 65.6 | 64.1 | 70.8 | 64.2 | 65.1 | 64.9 |
| comonomer profile | reverse | reverse | reverse | reverse | reverse | Reverse |
| DSC melt temp (° C.) | 104.2, 120.3 | 106.4, 121.1 | 109.1, 120.4 | 107.2, 120.9 | 106.6, 120.7 | 108.5, 120.5 |
| % crystallinity | 46.1 | 46.8 | 49.3 | 46.6 | 48.3 | 48.7 |
| CY a-parameter | 0.0947 | 0.1228 | 0.1962 | 0.2622 | 0.2320 | 0.2221 |
| $M_n$ | $20.3 \times 10^3$ | 24228 | 26594 | 25646 | 20438 | 20022 |
| $M_w$ | $97.3 \times 10^3$ | 120830 | 119814 | 126052 | 121308 | 103207 |
| $M_z$ | $226.4 \times 10^3$ | 355544 | 319542 | 374146 | 359545 | 313009 |
| $M_w/M_n$ | 4.78 | 4.99 | 4.51 | 4.92 | 5.94 | 5.15 |
| $M_z/M_w$ | 2.33 | 2.94 | 2.67 | 2.97 | 2.96 | 3.03 |
| $C_6$ content (wt %) | 7.3 | 6.8 | 6.0 | 6.8 | 6.8 | 6.5 |
| SCB/1000 C | 12.7 | 11.8 | 10.5 | 11.8 | 11.9 | 11.3 |
| hexane extractables (wt %) | 0.94 | 0.89 | 0.60 | 0.80 | 0.90 | 0.90 |
| melt strength (cN) | 5.74 | 6.39 | 6.41 | 6.27 | 6.00 | 3.81 |
| VGP crossover phase angle ($\delta^{XO}$) | 59.6 | 62.81 | 66.49 | 64.74 | 62.01 | 67.43 |
| SCB/1000C at MW of 200,000 − SCB/1000C at MW of 50,000 | 6.1 | 6.6 | 3.7 | 5.9 | 5.9 | 5.3 |
| Shear Thinning Index (SHI) | 0.015 | 0.123 | 0.303 | 0.459 | 0.343 | 0.429 |
| 83.0 − 1.25 (CDBI$_{50}$)/($M_w/M_n$) | 65.85 | 66.94 | 63.37 | 66.69 | 69.30 | 67.25 |
| 80.7 − (CDBI$_{50}$)/($M_w/M_n$) | 66.98 | 67.85 | 65.0 | 67.65 | 69.74 | 68.10 |
| 72 [$(I_{21}/I_2)^{-1} + 10^{-6} (M_n)$] | 3.08 | 3.43 | 4.06 | 3.75 | 3.15 | 3.48 |

Resin 2A: The Second Polyethylene Copolymer.

This resin was made using a supported catalyst having the formula (1,2-(n-propyl)($C_6F_5$)Cp)Ti(N=P(t-Bu)$_3$)Cl$_2$ as is further described below.

Preparation of the Supported Catalyst.

To a slurry of dehydrated silica (122.42 g) in toluene (490 mL) was added a 10 wt % MAO solution (233.84 g of 4.5 wt % Al in toluene) over 10 minutes. The vessel containing the MAO was rinsed with toluene (2×10 mL) and added to the reaction mixture. The resultant slurry was stirred with an overhead stirrer assembly (200 rpm) for 1 hour at ambient temperature. To this slurry was added a toluene (46 mL) solution of (1,2-(n-propyl)($C_6F_5$)Cp)Ti(N=P(t-Bu)$_3$)Cl$_2$ (2.28 g) over 10 minutes. This solution may need to be gently heated to 45° C. for a brief period (5 minutes) to fully dissolve the molecule. The vessel containing the molecule was rinsed with toluene (2×10 mL) and added to the reaction mixture. After stirring for 2 hours (200 rpm) at ambient temperature a toluene (22 mL) solution of Armostat-1800 (which was previously dried according to the method above for "Drying a Catalyst Modifier") at 8.55 wt % was added to the slurry which was further stirred for 30 minutes. The slurry was filtered and rinsed with toluene (2×100 mL) and then with pentane (2×100 mL). The catalyst was dried in vacuo to less than 1.5 wt % residual volatiles. The solid catalyst was isolated and stored under nitrogen until further use. The catalyst had 2.7 wt % of Armostat present.

Polymerization

Continuous ethylene/1-hexene gas phase copolymerization experiments were conducted in a 56.4 L Technical Scale Reactor (TSR) in continuous gas phase operation. Ethylene polymerizations were run at 75° C. to 90° C. with a total operating pressure of 300 pounds per square inch gauge (psig). Gas phase compositions for ethylene and 1-hexene were controlled via closed-loop process control to values of 65.0 and 0.5-2.0 mole %, respectively. Hydrogen was metered into the reactor in a molar feed ratio of 0.0008-0.0015 relative to ethylene feed during polymerization. Nitrogen constituted the remainder of the gas phase mixture (approximately 38 mole %). A typical production rate for these conditions is 2.0 to 3.0 kg of polyethylene per hour.

Pelletization of Granular Resins.

500 ppm of Irganox 1076 and 1000 ppm of Irgafos 168 were dry blended with the granular resin prior to pelletization. The resulting powder blend was extruded on Leistritz twin-screw extruder with a screw diameter of 38 mm and L/D ratio of 33/1 under nitrogen atmosphere to minimize polymer degradation. The pelletization conditions of the extruder were set at a melt temperature of 210° C. an output rate of 20 to 25 lb/hr, a screw speed of 120 rpm and a pelletizer speed of 30 to 40 rpm. The pelleted resin was cooled and then collected for the resin characterization and film evaluation.

Steady state polymerization conditions are provided in Table 3 (C2=ethylene; C6=1-hexene; C6/C2 is the molar feed ratio of each component to the reactor) for example 2A. Polymer data for the resulting 2A resin is provided in Table 4.

TABLE 3

| Catalyst | Comp. 2A |
|---|---|
| Productivity (g PE/g Cat) | 7700 |
| Hydrogen (mol %) | 0.0298 |
| 1-Hexene (mol %) | 1.2110 |
| C6/C2 (mol/mol feed) | 0.0215 |
| Temp (° C.) | 85 |
| Production rate (kg/hr) | 2.53 |
| Residence Time (hrs) | 1.62 |
| Bulk Density (lb per cubic foot) | 17.9 |
| Isopentane (weight %) | 0 |

Also included in Table 4 are resins, 2B, 2B*, 2C, and 2D each of which may be used as the second polyethylene copolymer in the blends of the current invention. Resin 2B is an Exceed 1018DA™ ethylene copolymer of 1-hexene, which is commercially available from ExxonMobil. Resin 2B* is an Exceed 1018JA™ ethylene copolymer of 1-hexene, which is commercially available from ExxonMobil.

Resin 2C is a linear low density polyethylene having a melt index $I_2$ of 0.93 g/10 min and a density of 0.917 g/cm$^3$ which is available from NOVA Chemicals as FPs-117-C™. Resin 2D is a linear low density polyethylene having a melt index $I_2$ of 1 g/10 min and a density of 0.92 g/cm$^3$, which is available from NOVA Chemicals as FP-120-C™.

A Van Gurp-Palmen analysis is a means by which to study a polymer architecture (e.g., molecular weight distribution, linearity, etc.) as reflected by the polymer melt morphology. A VGP curve is simply a plot of the phase angle ($\delta$) versus complex modulus (G*), where the two rheology parameters are obtained using the frequency sweep test in dynamic

TABLE 4

Copolymer Properties

| | Resin No. | | | | |
|---|---|---|---|---|---|
| | 2A | 2B | 2B* | 2C | 2D |
| density (g/cm$^3$) | 0.9173 | 0.9212 | 0.9216 | 0.9168 | 0.9198 |
| MI, $I_2$ (g/10 min) | 0.95 | 0.97 | 0.96 | 0.93 | 1.04 |
| MFR, $I_{21}/I_2$ | 15.5 | 16.0 | 15.9 | 30.1 | 29.0 |
| $I_{10}/I_2$ | 5.61 | 5.65 | 5.70 | 7.52 | 8.0 |
| Comonomer | 1-hexene | 1-hexene | 1-hexene | 1-octene | 1-octene |
| TREF profile | bimodal T(low) = 81.0° C. T(high) = 91.8° C. | bimodal T(low) = 83.3° C. T(high) = 93.0° C. | bimodal, T(high) = 93.7° C. T(low) = 83.5° C. | bimodal T(low) = 78.5° C. T(high) = 94.7° C. | bimodal T(low) = 81.1° C. T(high) = 95.4° C. |
| T(med) – T(low), ° C. | NA | NA | NA | NA | NA |
| T(high) – T(med), ° C. | NA | NA | NA | NA | NA |
| T(high) – T(low), ° C. | 10.8 | 9.7 | 10.2 | 16.2 | 14.3 |
| wt % at 90-105° C. | 9.7 | 7.9% | 10.3 | 5.6 | 15.9 |
| T(75) – T(25) (° C.) | 9.7 | 10.6 | 10.1 | 8.25 | 14.4 |
| CDBI$_{50}$ (wt %) | 74.5 | 70.5 | 71.1 | 74.5 | 58.1 |
| comonomer profile | flat | slightly reverse | slightly reverse | negative | negative |
| DSC melt temp (° C.) | 109.5, 119.6 | 110.8, 118.9 | 109.7, 118.7 | 108.2, 112.3 | 109.4, 119.6 |
| % crystallinity | 44.3 | 43.0 | 45.7 | 42.5 | 44.5 |
| CY a-parameter | 0.642 | 0.733 | 0.7299 | 0.593 | 0.402 |
| $M_w$ (×10$^{-3}$) | 98.3 | 103.3 | 110.4 | 96.6 | 103.4 |
| $M_n$ (×10$^{-3}$) | 56.6 | 46.0 | 52.1 | 29.3 | 28.9 |
| $M_z$ (×10$^{-3}$) | 154.6 | 174.1 | 195.8 | 229.4 | 298.9 |
| $M_w/M_n$ | 1.74 | 2.25 | 2.12 | 3.30 | 3.58 |
| $M_z/M_w$ | 1.57 | 1.69 | 1.77 | 2.38 | 2.89 |
| comonomer content (wt %) | 6.0 | 6.0 | 6.2 | 10.4 | 9.2 |
| SCB/1000 C | 10.5 | 10.4 | 10.7 | 14.1 | 12.3 |
| hexane extractables (%) | 0.15 | 0.34 | 0.27 | 0.42 | 0.54 |
| melt strength (cN) | 3.07 | 2.60 | 2.5 | 2.48 | 3.24 |
| VGP crossover phase angle ($\delta^{XO}$) | 84.5 | 84.8 | 84.8 | 78.5 | 74.6 |
| SCB/1000 at MW of 200,000 – SCB/1000 at MW of 50,000 | 0.6 | 1.2 | 1.6 | −2.0 | −0.6 |
| Shear Thinning Index (SHI) | 0.98 | 0.99 | 0.985 | 0.94 | 0.81 |
| 83.0 – 1.25 (CDBI$_{50}$)/($M_w/M_n$) | 29.48 | 43.8 | 41.08 | 54.78 | 62.71 |
| 80.7 – (CDBI$_{50}$)/($M_w/M_n$) | 37.98 | 49.37 | 47.16 | 58.12 | 64.47 |
| 72 $[(I_{21}/I_2)^{-1} + 10^{-6} (M_n)]$ | 8.72 | 7.812 | 8.28 | 4.50 | 4.56 |

As shown in Tables 2 and 4, the first polyethylene copolymers, resins 1A-1F have a melt flow ratio that is distinct from resins 2A-2D. The resins 1A-1F have a MFR ($I_{21}/I_2$) of greater than 32, while the resins 2A, 2B and 2B* each have a melt flow ratio of less than 16.5 and resins 2C and 2D have an MFR ($I_{21}/I_2$) close to 30.

As can be seen in Table 2 all the resins 1A-1E have a reverse comonomer distribution, a multimodal TREF profile, a CDBI$_{50}$ within a range of from 45 wt % to 75 wt %, a MFR ($I_{21}/I_2$) within a range of 32 to 50, a $M_w/M_n$ within a range of from 3.5 to 6.0 and a fractional melt index ($I_2$ of less than 1.0 g/10 min. Also shown in Table 2 is resin 1F which has a reverse comonomer distribution, a multimodal TREF profile, a CDBI$_{50}$ within a range of from 45 wt % to 75 wt %, a MFR ($I_{21}/I_2$) within a range of 32 to 50, a $M_w/M_n$ within a range of from 3.5 to 6.0 and a melt index $I_2$ of about 1.2 g/10 min. Each of the resins 1A-1F shown in Table 2, have a broad unimodal molecular weight distribution.

Figure 1B:
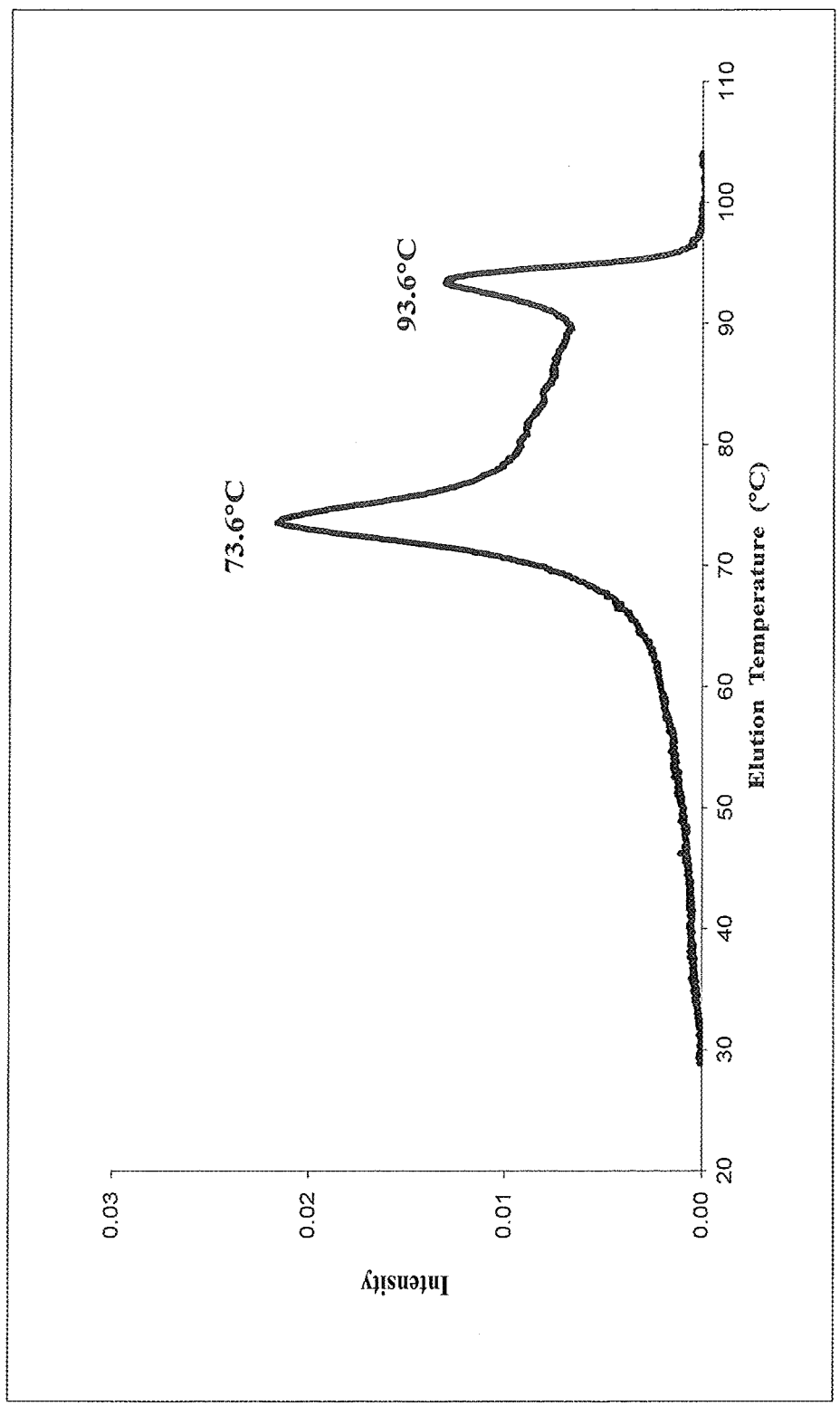
FIG. 1B shows a temperature rising elution fractionation (TREF) analysis and profile of a first polyethylene copolymer used according to the present invention.
Figure 2:
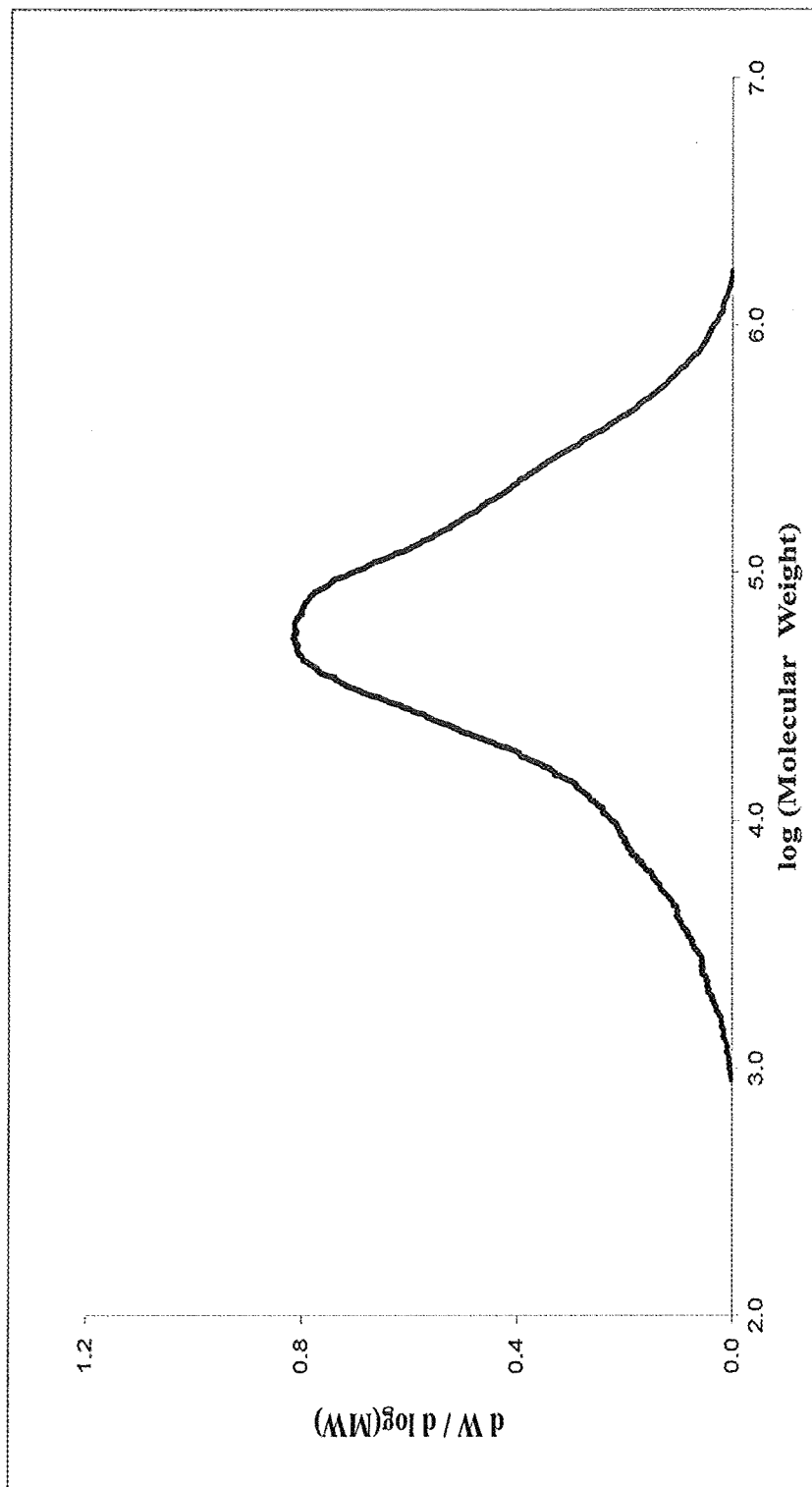
FIG. 2 shows a gel permeation chromatograph (GPC) with refractive index detection, of a first polyethylene copolymer used according to the present invention.
Figure 3:
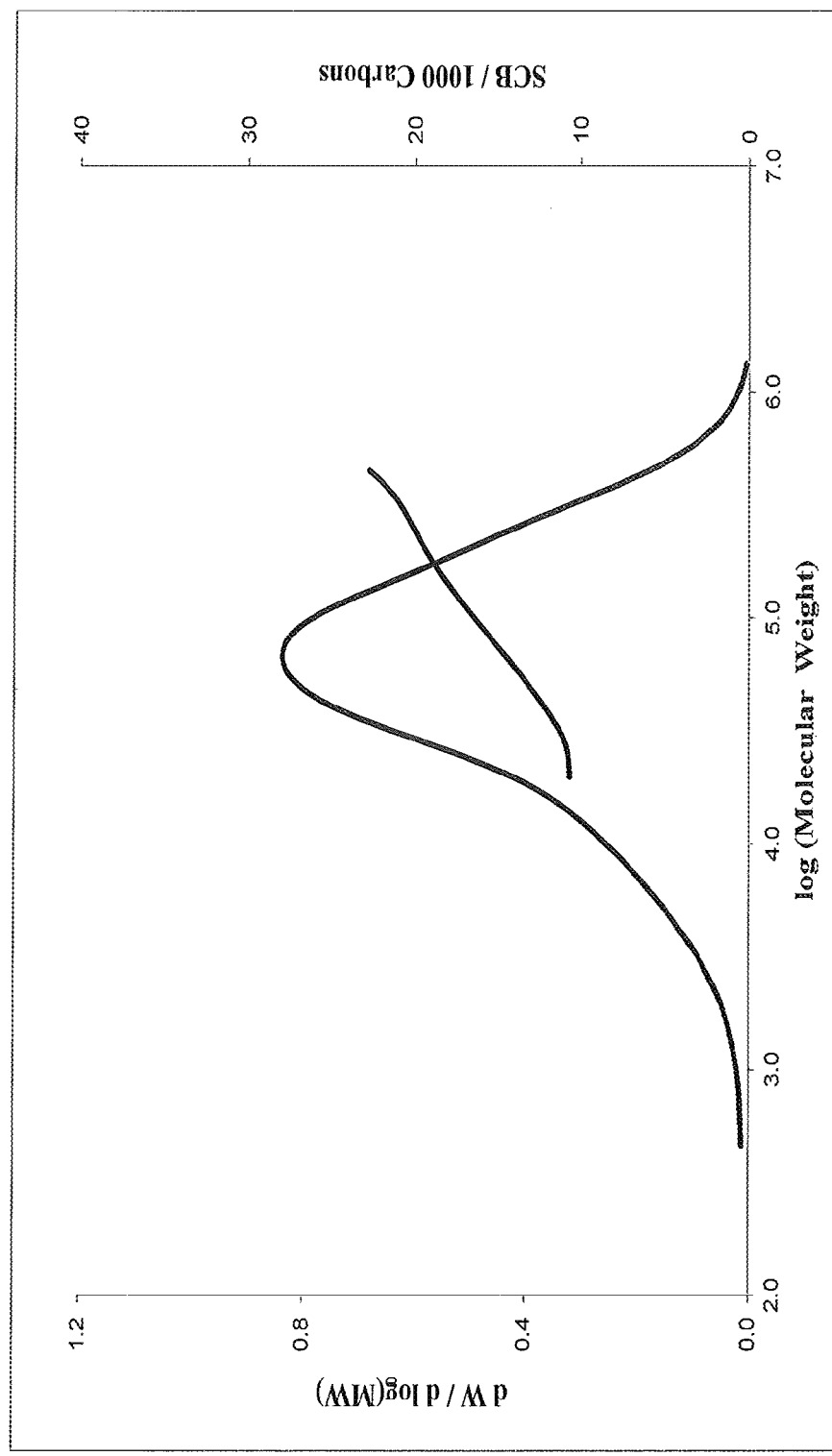
FIG. 3 shows a gel permeation chromatograph with Fourier transform infra-red (GPC-FTIR) detection obtained for a first polyethylene copolymer made according to the present invention. The comonomer content, shown as the number of short chain branches per 1000 carbons (y-axis), is given relative to the copolymer molecular weight (x-axis). The upwardly sloping line (from left to right) is the short chain branching (in short chain branches per 1000 carbons atoms) determined by FTIR. As can be seen in the Figure, the number of short chain branches increases at higher molecular weights, and hence the comonomer incorporation is said to be "reversed".

A representative TREF curve is shown in FIG. 1A for resin 1A. A representative TREF curve is shown in FIG. 1B for resin 1B. A representative GPC curve is shown for resin 1A in FIG. 2. A representative GPC-FTIR curve is shown for resin 1A in FIG. 3.

mechanical analysis (DMA). A shift of a VGP curve from a baseline curve or a decrease in the phase angles at the mid-range of complex modulus may indicate changes in the polymer melt morphology.

A VGP plot allows for a determination of the crossover rheology parameter which is defined as the intersecting point obtained between the phase angle ($\delta$) vs. complex modulus (G*) plot and a phase angle ($\delta$) vs. complex viscosity ($\eta$*) plot. Based on a linear viscoelasticity theory, the VGP crossover rheology parameter or "crossover phase angle" ($\delta^{XO}$) occurs at a frequency ($\omega$) which is equal to unity. It is the phase angle at which the numerical values of G* and the $\eta$* are equivalent. Hence the VGP crossover rheology parameter can be determined in a single DMA test.

Figure 4B:
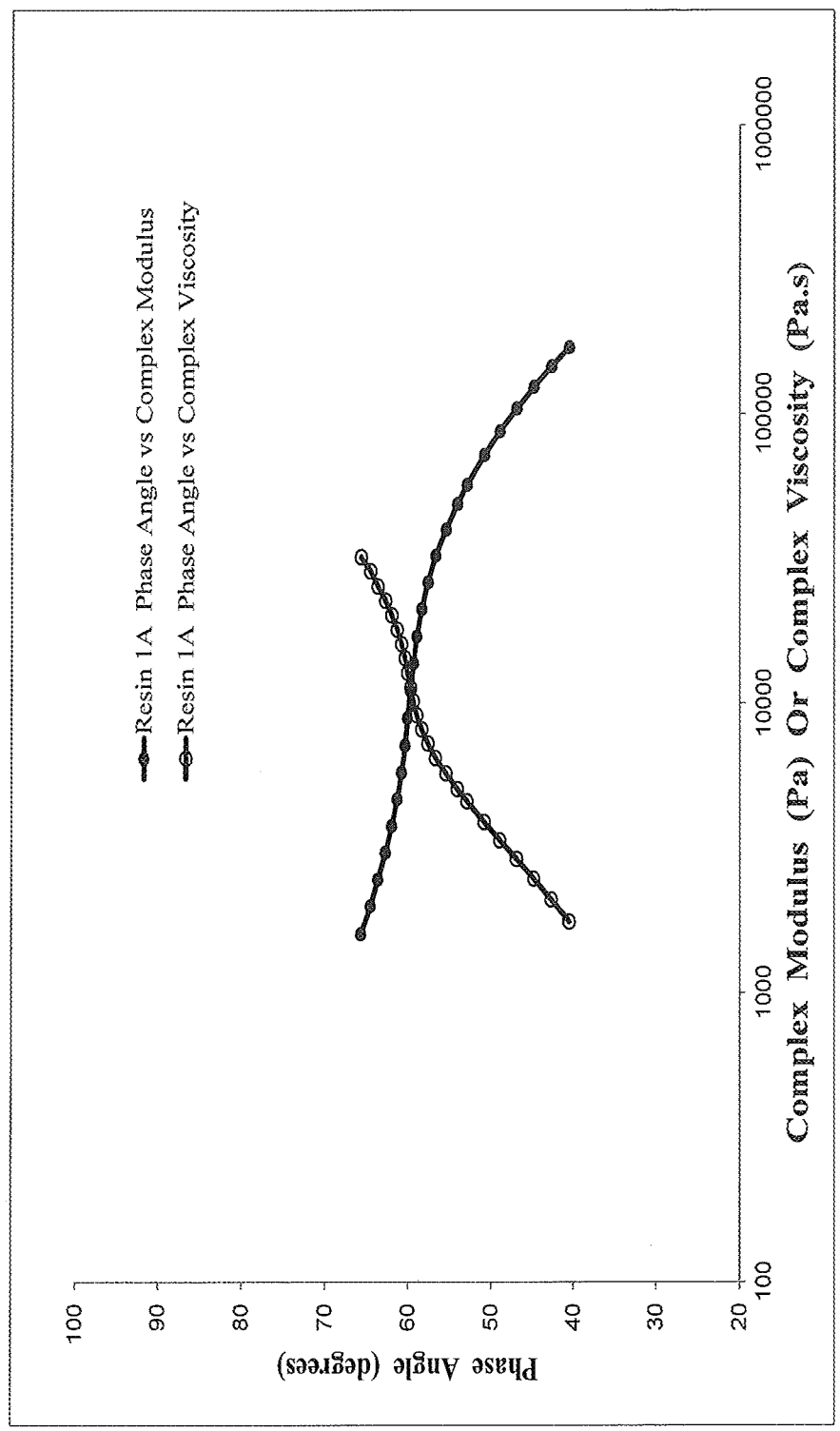
FIG. 4B show plots of the phase angle vs the complex modulus and the phase angle vs. complex viscosity for resin 1A as determined by DMA.

The VGP crossover plots for resin 2A and for a resin sold under the trade-name Exceed 1018DA™ (resin 2B) are included in FIG. 4A. The VGP crossover plots for the resin 1A are shown in FIG. 4B. The VGP crossover points are dependent upon the copolymer architecture. Generally, for resins which are easier to process such as resin 1A, the VGP phase angle at which crossover occurs defined as $\delta^{XO}$ is lower than for resins which are more difficult to process such as resins 2A and 2B (compare FIGS. 4A and 4B). Without wishing to be bound by any single theory, this may be due to the fact that resin 1A has greater melt flow ratio ($I_{21}I_2$) or a broader molecular weight distribution ($M_w/M_n$) than Resin 2A or 2B. For resins that are easier to process, the shape of the phase angle-complex viscosity curves and the shape of the phase-angle complex modulus curves, are deflected somewhat and more closely resemble mirror images of each other, relative to the curves obtained for resins which are more difficult to process (compare the curves in FIG. 4A with the curves in FIG. 4B).

As shown in Tables 2, the first polyethylene copolymers, resins 1A-1F have a $\delta^{xo}$ value that is less than about 70°. In fact resins 1A-1F have a $\delta^{xo}$ value that is between about 55° and about 70°.

Also shown in Table 2, is the fact that all of the ethylene copolymers 1A-1F satisfy the following relationships: $(M_w/M_n) \geq 72 [(I_{21}/I_2)^{-1}+10^{-6} (M_n)]$ where $M_w$, $M_n$, $I_{21}$, $I_2$ and $CDBI_{50}$ are all as defined as above. Resins 1A, 1B and 1D-1F also satisfy the following relationship $\delta^{xo} \leq 80.7-(CDBI_{50})/(M_w/M_n)$ at a $\delta^{xo}$ of 55° to 70°, where $\delta^{xo}$ is the crossover phase angle, $M_w$, $M_n$, $I_{21}$, $I_2$ and $CDBI_{50}$ are all as defined as above. Resins 1A, 1B, 1D, and 1E also satisfy the following relationship: $\delta^{xo} \leq 83.0-1.25 (CDBI_{50})/(M_w/M_n)$, where $\delta^{xo}$ is the crossover phase angle, $M_w$, $M_n$, $I_{21}$, $I_2$ and $CDBI_{50}$ are all as defined as above. In contrast, the data provided in Table 4, shows that none of the resins 2A-2D satisfy any of the conditions: $(M_w/M_n) \geq 72 [(I_{21}/I_2)^{-1}+10^{-6} (M_n)]$; $\delta^{xo} \leq 83.0-1.25 (CDBI_{50})/(M_w/M_n)$; or $\delta^{xo} \leq 80.7-(CDBI_{50})/(M_w/M_n)$ at a $\delta^{xo}$ of 55° to 70°.

Figure 5:
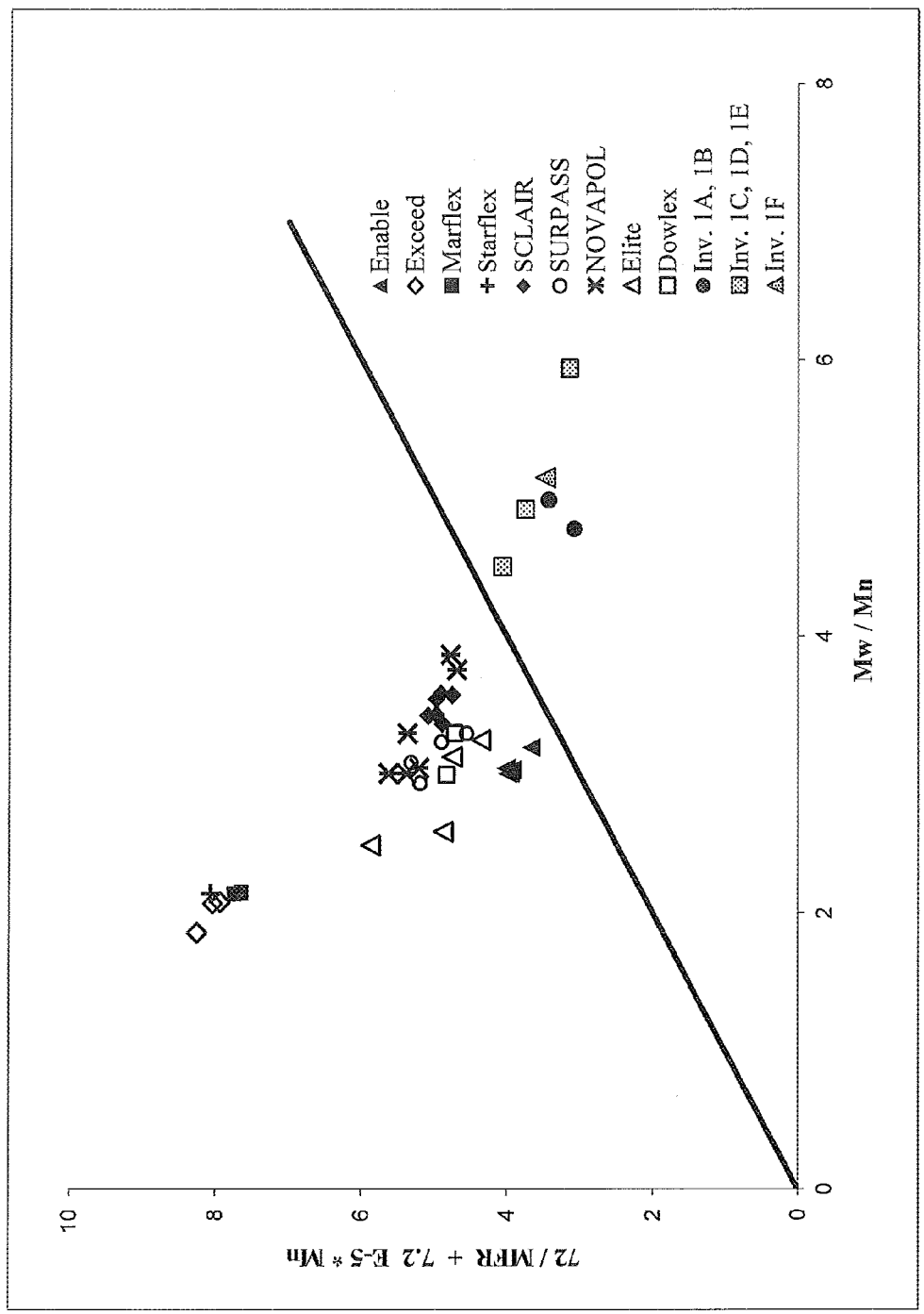
FIG. 5 shows a plot of the equation: $Mw/Mn=72 \ [(I_{21}/I_2)^{-1}+10^{-6} (M_n)]$. The values from the equation 72 $[(I_{21}/I_2)^{-1}+10^{-6} (M_n)]$ (the y-axis) are plotted against the corresponding Mw/Mn values (the x-axis) for resins 1A-1F as well as for several commercially available resins which have a melt index $I_2$ of 1.5 g/10 min or less and a density of between 0.916 and 0.930 g/cm³.

For further comparison purposes, ethylene copolymers 1A-1F have been plotted against several known commercial resins in FIG. 5. FIG. 5 shows a plot of the equation: $(M_w/M_n)=72 [(I_{21}/I_2)^{-1}+10^{-6} (M_n)]$, as well as a plot of the Mw/Mn vs. $72 [(I_{21}/I_2)^{-1}+10^{-6} (M_n)]$ values for resins 1A-1F as well as several known commercial resins. The commercial resins included in FIG. 5 for comparison purposes are all resins having an melt index $I_2$ of 1.5 g/10 min or less and a density of between 0.916 and 0.930 g/cm³ and which are sold under trade names such as, Elite™, Exceed™ Marflex™, Starflex™, Dowlex™ SURPASS™, SCLAIR™, NOVAPOL™ and Enable™ As can be seen from FIG. 5, none of these commercial grades satisfy the condition: $(M_w/M_n) \geq 72 [(I_{21}/I_2)^{-1}+10^{-6} (M_n)]$. In contrast, all of the resins 1A-1F satisfy the condition: $(M_w/M_n) \geq 72 [(I_{21}/I_2)^{-1}+10^{-6} (M_n)]$. This work demonstrates the distinct architecture of the resins used as the first polyethylene copolymer in the blends of the current invention.

Figure 6:
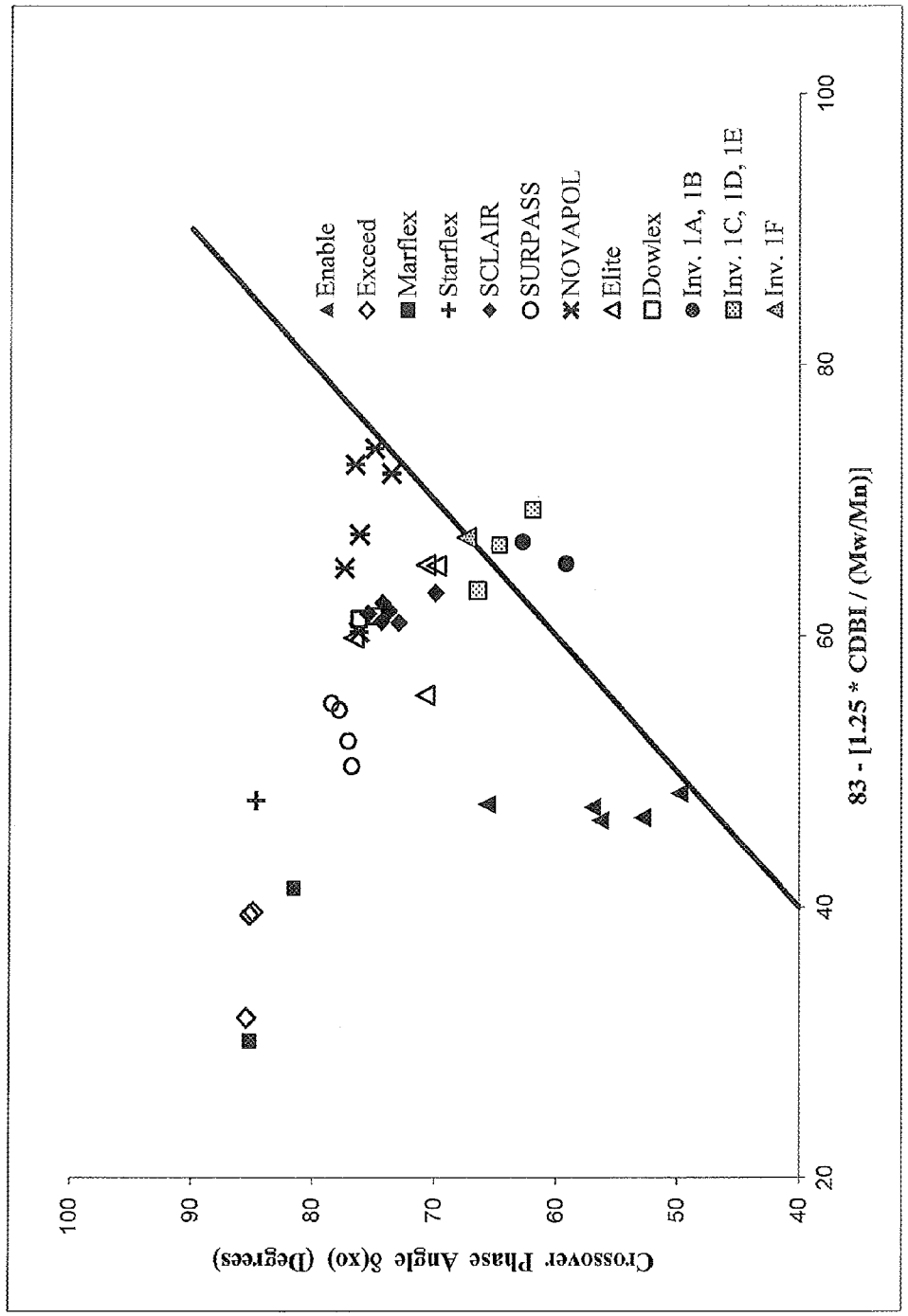
FIG. 6 shows a plot of the equation: $\delta^{XO}=83-1.25 (CDBI_{50})/(M_w/M_n)$. The values of the equation $80-1.25 (CDBI_{50}/(M_w/M_n))$ (the x-axis) are plotted against the corresponding crossover phase angle ($\delta^{XO}$) values (the y-axis) for resins 1A-1F as well as for several commercially available resins which have a melt index $I_2$ of 1.5 g/10 min or less and a density of between 0.916 and 0.930 g/cm³.

For further comparison purposes, ethylene copolymers 1A-1F have been plotted against several known commercial resins in FIG. 6. FIG. 6 shows a plot of the equation: $\delta^{xo}=83.0-1.25 (CDBI_{50})/(M_w/M_n)$, as well as a plot of the $\delta^{xo}$ vs. $83.0-1.25 (CDBI_{50})/(M_w/M_n)$ values for resins 1A-1F and several known commercial resins. The commercial resins included in FIG. 6 for comparison purposes are all resins having a melt index $I_2$ of 1.5 g/10 min or less and a density of between 0.916 and 0.930 g/cm³ and which are sold under trade names such as, Elite™, Exceed™, Marflex™ Starflex™, Dowlex™, SURPASS™, SCLAIR™, NOVAPOL™ and Enable™. As can be seen from the figure, none of these commercial grades satisfy the condition: $\delta^{xo} \leq 83.0-1.25 (CDBI_{50})/(M_w/M_n)$. In contrast, resins 1A, 1B, 1D, and 1E satisfy the condition: $\delta^{xo} \leq 83.0-1.25 (CDBI_{50})/(M_w/M_n)$. This work further demonstrates the distinct architecture of the resins used as the first polyethylene copolymer in the blends of the current invention.

Figure 7:
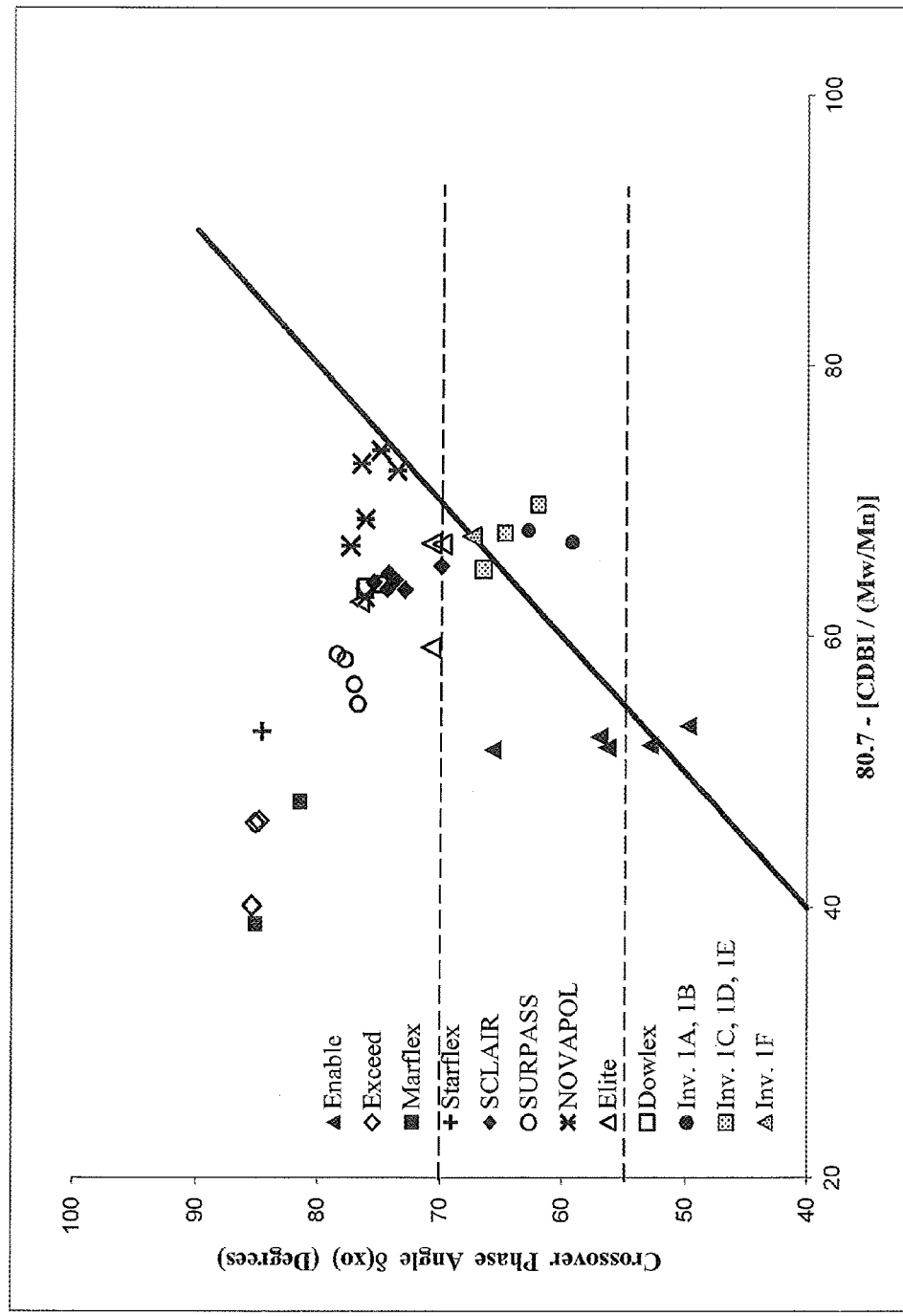
FIG. 7 shows a plot of the equation: $\delta^{XO}=80.7-(CDBI_{50})/(M_w/M_n)$. The values of the equation $80.7-(CDBI_{50})/(M_w/M_n)$ (the x-axis) are plotted against the corresponding crossover phase angle ($\delta^{XO}$) values (the y-axis) for resins 1A-1F as well as for several commercially available resins which have a melt index $I_2$ of 1.5 g/10 min or less and a density of between 0.916 and 0.930 g/cm³. The broken lines show which resins have a $\delta^{XO}$ value of between 55° and 70°.

For further comparison purposes, ethylene copolymers 1A-1F have been plotted against several known commercial resins in FIG. 7. FIG. 7 shows a plot of the equation: $\delta^{xo}=80.7-(CDBI_{50})/(M_w/M_n)$, as well as a plot of the $\delta^{xo}$ vs. $80.7-(CDBI_{50})/(M_w/M_n)$ values for resins 1A-1F and several known commercial resins. FIG. 7 also shows which of the resins 1A-1F and which of the commercial resins have a $\delta^{xo}$ of from 55° to 70°. The commercial resins included in FIG. 7 for comparison purposes are all resins having an melt index $I_2$ of 1.5 g/10 min or less and a density of between 0.916 and 0.930 g/cm³ and which are sold under trade names such as, Elite™ Exceed™, Marflex™, Starflex™, Dowlex™, SURPASS™, SCLAIR™, NOVAPOL™ and Enable™. As can be seen from FIG. 7, none of these commercial grades satisfy the condition where $\delta^{xo}=80.7-(CDBI_{50})/(M_w/M_n)$ at a $\delta^{xo}$ of from 55° to 70°. In contrast the resins 1A, 1B and 1D-1F satisfy the condition where $\delta^{xo}=80.7-(CDBI_{50})/(M_w/M_n)$ at a $\delta^{xo}$ of from 55° to 70°. This work further demonstrates the distinct architecture of the resins used as the first polyethylene copolymer in the blends of the current invention.

Polymer Blends

Inventive polymer blends were made by blending a first polyethylene copolymer (e.g., resins 1A or 1C) with a second polyethylene copolymer (e.g., resins 2A-2D). The blends were made by dry blending the components in appropriate amounts using a metering device upstream of an extruder used to feed a blown film line. Tables 5-8 show the film properties of 1 mil (thickness) films comprising 100 wt % first or second polyethylene copolymers as well as the film properties for 15 wt %:85 wt % polymer blends.

Comparative polymer blends were made by blending LF-Y819-A™ (a high pressure low density polyethylene (HPLDPE) material having a melt index $I_2$ of 0.75 g/10 min and a density of 0.919 g/cm³, available from NOVA Chemicals) with the second polyethylene copolymer (e.g. resins 2B, 2C and 2D). The film properties of these 15 wt %:85 wt % comparative blends are provided in Tables 6-8.

TABLE 5

Film Properties (Resin 1A, 2A and Inventive Blend of 1A/2A)

| | First Polyethylene Copolymer 1A 100% | Second Polyethylene Copolymer 2A 100% | Inventive Blend 15 wt % 1A/85% wt % 2A |
|---|---|---|---|
| Dart Impact (g/mil) | 638 | 508 | 686 |
| MD Tear (g/mil) | 121 | 244 | 200 |
| TD Tear (g/mil) | 455 | 330 | 415 |
| Puncture (J/mm) | 53 | 68 | 63 |

TABLE 5-continued

Film Properties (Resin 1A, 2A and Inventive Blend of 1A/2A)

|  | First Polyethylene Copolymer 1A 100% | Second Polyethylene Copolymer 2A 100% | Inventive Blend 15 wt % 1A/85% wt % 2A |
|---|---|---|---|
| 1% MD Secant Modulus (MPa) | 198 | 153 | 160 |
| 1% TD Secant Modulus (MPa) | 220 | 173 | 174 |
| 2% MD Secant Modulus (MPa) | 180 | 139 | 141 |
| 2% TD Secant Modulus (MPa) | 194 | 148 | 147 |
| MD Tensile Strength (MPa) | 51.0 | 58.9 | 59.9 |
| TD Tensile Strength (MPa) | 48.8 | 50.4 | 56.5 |
| MD Elongation at Break (%) | 477 | 568 | 570 |
| TD Elongation at Break (%) | 696 | 675 | 744 |
| MD Yield Strength (MPa) | 10.9 | 9.5 | 9.3 |
| TD Yield Strength (MPa) | 11.2 | 9.9 | 9.7 |
| MD Elongation at Yield (%) | 14 | 14 | 14 |
| TD Elongation at Yield (%) | 15 | 19 | 15 |
| Haze (%) | 11.2 | 7.4 | 4.7 |
| Gloss (%) | 50 | 63 | 75 |
| Cold Seal Strength: |  |  |  |
| SIT (° C.) | 112 | 103 | 108 |
| Maximum Force (N) | 14.3 | 10.9 | 12.3 |
| Temperature at Max. Force (° C.) | 130 | 150 | 140 |
| Extruder Pressure (psi) | 3450-3495 | 5275-5315 | 4805-4840 |
| Specific Output Rate (lb/hr/rpm) | 2.50 | 1.89 | 2.38 |
| Specific Power (lb/hr/Amp) | 2.78 | 2.13 | 2.22 |
| Specific Energy (W/lb/hr) | 68.4 | 117.5 | 92.7 |

TABLE 6

Film Properties (Resin 1A, 1C, 2B, 2B*, Inventive Blends 1A/2B, 1C/2B* and Comparative Blend HPLDPE/2B)

|  | First Polyethylene Copolymer | | Second Polyethylene Copolymer | | Inventive Blend | | Comparative Blend 15 wt % |
|---|---|---|---|---|---|---|---|
|  | 1A 100% | 1C 100% | 2B 100% | 2B* 100% | 15 wt % 1A/ 85 wt % 2B | 15 wt % 1C/ 85 wt % 2B* | LF-Y819-A/ 85 wt % 2B |
| Dart Impact (g/mil) | 638 | 707 | 707 | 709 | 743 | 485 | 224 |
| MD Tear (g/mil) | 121 | 90 | 235 | 224 | 222 | 217 | 106 |
| TD Tear (g/mil) | 455 | 438 | 370 | 364 | 439 | 400 | 652 |
| Puncture (J/mm) | 53 | 47 | 37 | 32 | 43 | 37 | 27 |
| 1% MD Secant Modulus (MPa) | 198 | 233 | 144 | 155 | 163 | 172 | 170 |
| 1% TD Secant Modulus (MPa) | 220 | 258 | 176 | 171 | 168 | 177 | 216 |
| 2% MD Secant Modulus (MPa) | 180 | 209 | 131 | 138 | 146 | 156 | 156 |
| 2% TD Secant Modulus (MPa) | 194 | 220 | 149 | 146 | 145 | 160 | 189 |
| MD Tensile Strength (MPa) | 51.0 | 59.7 | 57.3 | 52.5 | 48 | 57.2 | 41.8 |
| TD Tensile Strength (MPa) | 48.8 | 52.9 | 40.7 | 43.4 | 44.9 | 51.6 | 36.5 |
| MD Elongation at Break (%) | 477 | 518 | 574 | 561 | 552 | 537 | 536 |
| TD Elongation at Break (%) | 696 | 696 | 658 | 669 | 661 | 675 | 665 |
| MD Yield Strength (MPa) | 10.9 | 12.1 | 8.9 | 9.6 | 9.8 | 10.7 | 10.8 |
| TD Yield Strength (MPa) | 11.2 | 12.3 | 9.4 | 9.5 | 10.5 | 10.6 | 10.3 |
| MD Elongation at Yield (%) | 14 | 13 | 13 | 14 | 14 | 14 | 19 |
| TD Elongation at Yield (%) | 15 | 14 | 16 | 15 | 17 | 14 | 12 |
| Haze (%) | 11.2 | 13.3 | 13.6 | 19.7 | 8.9 | 8.7 | 4.7 |
| Gloss (%) | 50 | 43.1 | 46 | 24 | 63 | 65.5 | 78 |
| Cold Seal Strength: |  |  |  |  |  |  |  |
| SIT (° C.) | 112 | 116 | 108 | 105 | 108 | 112.2 | 107 |
| Maximum Force (N) | 14.3 | 15.8 | 10.9 | 10.7 | 12.3 | 10 | 15.5 |
| Temperature at Max. Force (° C.) | 130 | 150 | 150 | 140 | 160 | 130 | 150 |
| Extruder Pressure (psi) | 3450-3495 | 3890-3940 | 4815-4850 | 4815-4875 | 5355-5390 | 4800-4845 | 4720-4765 |
| Specific Output Rate (lb/hr/rpm) | 2.50 | 2.56 | 2.78 | 2.70 | 2.70 | 2.70 | 2.56 |
| Specific Power (lb/hr/Amp) | 2.28 | 2.63 | 2.04 | 2.04 | 2.00 | 2.08 | 2.27 |
| Specific Energy (W/lb/hr) | 68.4 | 70.3 | 86.2 | 88.2 | 91.5 | 86.9 | 83.2 |

TABLE 7

Film Properties (Resin 1A, 1C, 2C, Inventive Blends 1A/2C, 1C/2C and Comparative Blend HPLDPE/2C)

|  | First Polyethylene Copolymer | | Second Polyethylene Copolymer | Inventive Blends | | Comparative Blend 15 wt % |
|---|---|---|---|---|---|---|
|  | 1A 100% | 1C 100% | 2C 100% | 15 wt % 1A/ 85 wt % 2C | 15 wt % 1C/ 85 wt % 2C | LF-Y819-A/ 85 wt % 2C |
| Dart Impact (g/mil) | 638 | 707 | 435 | 392 | 304 | 296 |
| MD Tear (g/mil) | 121 | 90 | 326 | 269 | 263 | 129 |
| TD Tear (g/mil) | 455 | 438 | 475 | 525 | 403 | 645 |
| Puncture (J/mm) | 53 | 47 | 84 | 87 | 67 | 59 |
| 1% MD Secant Modulus (MPa) | 198 | 233 | 136 | 141 | 159 | 158 |
| 1% TD Secant Modulus (MPa) | 220 | 258 | 144 | 159 | 169 | 201 |
| 2% MD Secant Modulus (MPa) | 180 | 209 | 122 | 126 | 143 | 143 |
| 2% TD Secant Modulus (MPa) | 194 | 220 | 126 | 138 | 148 | 173 |
| MD Tensile Strength (MPa) | 51.0 | 59.7 | 57.6 | 55.1 | 51.4 | 45.2 |
| TD Tensile Strength (MPa) | 48.8 | 52.9 | 52.1 | 47.8 | 46.5 | 42.6 |
| MD Elongation at Break (%) | 477 | 518 | 580 | 563 | 491 | 530 |
| TD Elongation at Break (%) | 696 | 696 | 811 | 780 | 729 | 839 |
| MD Yield Strength (MPa) | 10.9 | 12.1 | 8.6 | 9.1 | 10.2 | 9.8 |
| TD Yield Strength (MPa) | 11.2 | 12.3 | 8.9 | 9.2 | 10.1 | 9.1 |
| MD Elongation at Yield (%) | 14 | 13 | 13 | 14 | 14 | 15 |
| TD Elongation at Yield (%) | 15 | 14 | 20 | 16 | 15 | 12 |
| Haze (%) | 11.2 | 13.3 | 10.3 | 5.9 | 7.1 | 3.9 |
| Gloss (%) | 50 | 43.1 | 48 | 70 | 66 | 78 |
| Cold Seal Strength: | | | | | | |
| SIT (° C.) | 112 | 116 | 100 | 102 | 109 | 101 |
| Maximum Force (N) | 14.3 | 15.8 | 11.5 | 12.4 | 11.5 | 14.6 |
| Temperature at Max. Force (° C.) | 130 | 150 | 130 | 160 | 150 | 150 |
| Extruder Pressure (psi) | 3450-3495 | 3890-3940 | 4005-4045 | 4030-4065 | 3875-3910 | 3540-3590 |
| Specific Output Rate (lb/hr/rpm) | 2.50 | 2.56 | 2.38 | 2.38 | 2.44 | 2.27 |
| Specific Power (lb/hr/Amp) | 2.28 | 2.63 | 2.50 | 2.56 | 2.56 | 2.86 |
| Specific Energy (W/lb/hr) | 68.4 | 70.3 | 78.8 | 76.8 | 76.8 | 72.5 |

TABLE 8

Film Properties (Resin 1A, 1C, 2D, Inventive Blend of 1A/2D, 1C/2D and Comparative Blend HPLDPE/2D)

|  | First Polyethylene Copolymer | | Second Polyethylene Copolymer | Inventive Blends | | Comparative Blend 15 wt % |
|---|---|---|---|---|---|---|
|  | 1A 100% | 1C 100% | 2D 100% | 15 wt % 1A/ 85 wt % 2D | 15 wt % 1C/ 85 wt % 2D | LF-Y819-A/ 85 wt % 2D |
| Dart Impact (g/mil) | 638 | 707 | 223 | 258 | 263 | 170 |
| MD Tear (g/mil) | 121 | 90 | 350 | 266 | 268 | 120 |
| TD Tear (g/mil) | 455 | 438 | 584 | 599 | 617 | 682 |
| Puncture (J/mm) | 53 | 47 | 73 | 75 | 71 | 51 |
| 1% MD Secant Modulus (MPa) | 198 | 233 | 158 | 169 | 171 | 208 |
| 1% TD Secant Modulus (MPa) | 220 | 258 | 202 | 193 | 205 | 238 |
| 2% MD Secant Modulus (MPa) | 180 | 209 | 146 | 151 | 159 | 184 |
| 2% TD Secant Modulus (MPa) | 194 | 220 | 169 | 162 | 181 | 204 |
| MD Tensile Strength (MPa) | 51.0 | 59.7 | 55.5 | 49.0 | 59.1 | 52.3 |
| TD Tensile Strength (MPa) | 48.8 | 52.9 | 41.5 | 44.3 | 47.8 | 44.0 |
| MD Elongation at Break (%) | 477 | 518 | 524 | 553 | 555 | 564 |
| TD Elongation at Break (%) | 696 | 696 | 748 | 760 | 751 | 852 |
| MD Yield Strength (MPa) | 10.9 | 12.1 | 10.3 | 9.9 | 11 | 10.5 |
| TD Yield Strength (MPa) | 11.2 | 12.3 | 10.6 | 10.5 | 11.6 | 10.6 |
| MD Elongation at Yield (%) | 14 | 13 | 13 | 14 | 14 | 13 |
| TD Elongation at Yield (%) | 15 | 14 | 14 | 16 | 17 | 12 |
| Haze (%) | 11.2 | 13.3 | 8.3 | 8.1 | 8.1 | 4.3 |
| Gloss (%) | 50 | 43.1 | 62 | 63 | 62 | 77 |
| Cold Seal Strength: | | | | | | |
| SIT (° C.) | 112 | 116 | 108 | 108 | 112 | 107 |
| Maximum Force (N) | 14.3 | 15.8 | 9.4 | 13.6 | 12.8 | 15.3 |

TABLE 8-continued

Film Properties (Resin 1A, 1C, 2D, Inventive Blend
of 1A/2D, 1C/2D and Comparative Blend HPLDPE/2D)

| | First Polyethylene Copolymer | | Second Polyethylene Copolymer | Inventive Blends | | Comparative Blend 15 wt % |
|---|---|---|---|---|---|---|
| | 1A 100% | 1C 100% | 2D 100% | 15 wt % 1A/ 85 wt % 2D | 15 wt % 1C/ 85 wt % 2D | LF-Y819-A/ 85 wt % 2D |
| Temperature at Max. Force (° C.) | 130 | 150 | 125 | 150 | 150 | 150 |
| Extruder Pressure (psi) | 3450-3495 | 3890-3940 | 3820-3870 | 4050-4095 | 3655-3700 | 3570-3605 |
| Specific Output Rate (lb/hr/rpm) | 2.50 | 2.56 | 2.50 | 2.44 | 2.50 | 2.33 |
| Specific Power (lb/hr/Amp) | 2.28 | 2.63 | 2.50 | 2.50 | 2.63 | 2.86 |
| Specific Energy (W/lb/hr) | 68.4 | 70.3 | 76.0 | 78.0 | 72.2 | 70.7 |

As shown in Table 5, a blend of resin 1A and resin 2A (a linear low density polyethylene with relatively low MFR ($I_{21}/I_2$) and having a narrow MWD ($M_w/M_n$) and a melt index $I_2$ of 0.95 g/10 min) in a 15/85 weight percent ratio has improved dart impact relative to either of the blend components. The blend also has a TD tear value which is more than 10% higher than the weighted average of the blend components. That is, the so called "Rule of Mixing" indicates a positive synergistic effect on the TD tear property in the blend (note: without wishing to be bound by any single theory, the rule of mixing indicates a positive synergism where a blend property is better than expected based on the weighted average of the blend components; negative synergism where a blend property is worse than expected based on the weighted average of the blend components; the rule of mixing is followed where a blend property is approximately what a person skilled in the art would expect based on the weighted average of the blend components). In addition, the blend has a haze of 4.7% and a gloss at 45° of 75, each of which is significantly improved over either of the blend components. Finally, the MD tear, and the MD and TD 1% secant modulus, which either approximately follow the Rule of Mixing or are at least comparable to that of resin 2A, are not impacted in a negative way. The blend of 1A with 2A can be extruded with a specific output of 2.38 lb/hour/rpm at an extruder head pressure of from about 4800 to 4840 psi, suggesting an improvement of film processing over resin 2A.

With reference to Table 6, a blend of resin 1A and resin 2B (a linear low density polyethylene having a relatively low MFR ($I_{21}/I_2$) and having a narrow MWD ($M_w/M_n$) and a melt index $I_2$ of about 1.0 g/10 min) in a 15/85 weight percent ratio demonstrates the synergies in the film properties of the blend. The blend has dart impact and puncture resistance values which are greater than weighted average of the blend components, a TD tear which increases more than 10% over the weighted average of the blend components, and haze and gloss values which improve to levels beyond that expected for the weighted average of the blend components. Further, when compared to a blend containing HPLDPE (e.g. LF-Y819-A) in the same amount as the first polyethylene copolymer 1A, film made from the inventive blend comprising 15 wt % 1A and 85 wt % 2B has better MD tear, dart impact and puncture resistance properties. Although a blend of resin 1C and resin 2B* (a linear low density polyethylene having a relatively low MFR ($I_{21}/I_2$) and having a narrow MWD ($M_w/M_n$) and a melt index $I_2$ of about 1.0 g/10 min) in a 15/85 weight percent ratio, has a depreciated dart impact, the MD and TD tears are greater than the weighted average of the blend components. The blend also demonstrates synergistic improvements in the haze and gloss (i.e., the haze and gloss values improve to well beyond the expected weighted average). Further, when compared to a blend containing HPLDPE (e.g., LF-Y819-A) in the same amount as the first polyethylene copolymer 1C, film made from the inventive blend comprising 15 wt % 1C and 85 wt % 2B* has better MD tear, dart impact and puncture resistance properties. The blends of 1A with 2B or 1C with 2B* can be extruded with a specific output of 2.7 lb/hour/rpm at an extruder head pressure of from 5355-5390 psi or 4800-4845 psi respectively, which is at least comparable to the blend comprising equivalent amounts of HPLDPE.

With reference to Table 7, a blend of resin 1A with 2C (a linear low density polyethylene having a melt index $I_2$ of 0.93 g/10 min and a density of 0.917 g/cm$^3$) in a 15/85 weight percent ratio has TD tear, puncture resistance, haze and gloss values which are all improved beyond that expected for a weighted average of the blended components, demonstrating some positive synergies in the film of the blend. Further, the addition of resin 1A improves optical properties without reducing the dart impact and MD tear as much as using HPLDPE (e.g., LF-Y819-A) as a blend component in equivalent amounts. Thus, compared to a blend containing HPLDPE in the same amount as the first polyethylene copolymer 1A, film made from the inventive blend comprising 15 wt % 1A and 85 wt % 2C has better MD tear, dart impact and puncture resistance properties. A blend of resin 1C with 2C in a 15/85 weight percent ratio shows positive synergy with regard to haze and gloss values, each of which are improved beyond that expected for a weighted average of the blended components. The MD and TD tear, as well as the MD and TD modulus of the blend made with resin 1C and resin 2C in a 15/85 weight percent ratio are comparable to the values expected according to the Rule of Mixing and are not impacted in a hugely negative way. Further, the addition of resin 1C improves optical properties without reducing the dart impact and MD tear as much as using HPLDPE (e.g. LF-Y819-A) as a blend component in equivalent amounts. The blends of 1A with 2C or 1C with 2C can be extruded with a specific output of 2.38 or 2.44 lb/hour/rpm respectively at an extruder head pressure of from 4030-4065 psi or 3875-3910 psi respectively, which is at least comparable to the blend comprising equivalent amounts of HPLDPE.

Table 8 shows that a blend of resin 1A with resin 2D (a linear low density polyethylene having a melt index $I_2$ of 1 g/10 min and a density of 0.92 g/cm$^3$) in a 15/85 weight percent ratio has TD tear and puncture resistance values which are higher than the weighted average expected for the blended components. Blends of resin 1A with resin 2D or resin 1C with resin 2D in a 15/85 weight percent ratio also demonstrate positive synergy in the MD and TD elongation at break, as the values for each blend are higher than the expected weighted average. The dart impact and 1% secant modulus of the blends of resin 1A with resin 2D or resin 1C with resin 2D in a 15/85 weight percent ratio are comparable to the values expected from the Rule of Mixing. It is also evident that addition of resin 1A improves optical properties without reducing the dart impact and MD tear as much as does the addition of HPLDPE (e.g., LF-Y819-A) in equivalent amounts. Similar trends are observed for a blend of 1C with 2D in a 15/85 weight percent ratio. Thus, when compared to a blend containing HPLDPE in the same amount as the first polyethylene copolymer 1A, or 1C, film made from the inventive blends has much better MD tear, dart impact and puncture resistance properties. The blends of 1A with 2D or 1C with 2D can be extruded with a specific output of 2.44 or 2.50 lb/hour/rpm respectively at an extruder head pressure of from 4050-4095 psi or 3655-3970 psi respectively, which is at least comparable to the blend comprising equivalent amounts of HPLDPE.

Overall, Tables 6-8 show that the films made from the polymer blends and which are rich in the second polyethylene copolymer (e.g., 15 wt % of 1A or 1C/85 wt % of 2A, 2B, 2B*, 2C or 2D) have dart impact values of at least 250 g/mil, have MD tear strengths of greater than 190 g/mil, an MD tear to TD tear ratio of at least 0.4, an MD or TD secant modulus at 1% strain of at least 130 MPa, a haze of less than 10%, and a gloss at 45° of at least 55. The inventive blends in Tables 6-8 demonstrate a good balance of stiffness, toughness and optical properties for use in the film applications.

Figure 8:
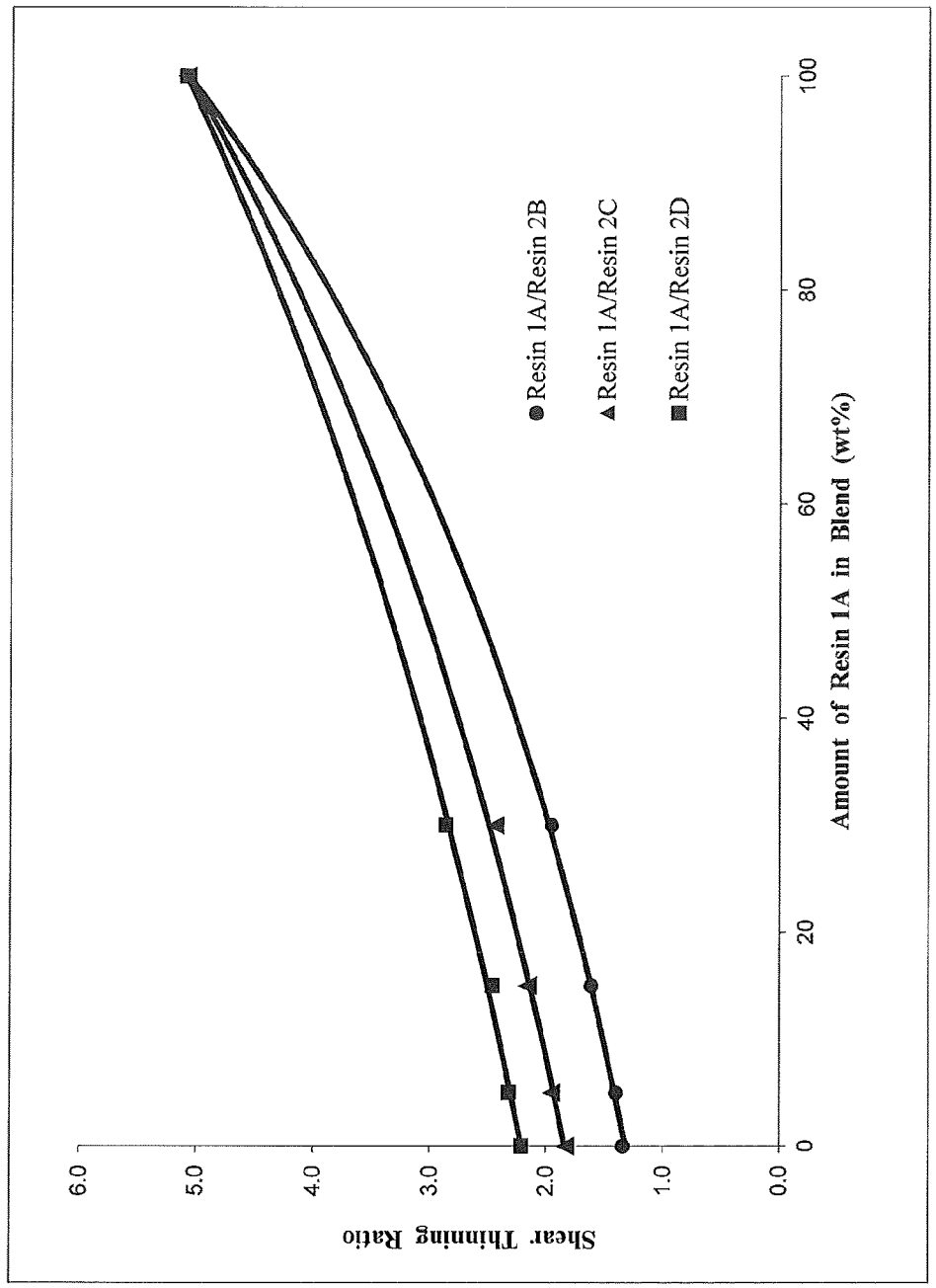
FIG. 8 shows a plot of the shear thinning ratio ($\eta^*_{0.1}/\eta^*_{10}$) against the weight fraction of the first polyethylene copolymer for blends made according to the current invention.

FIG. 8 shows that the use of the first polyethylene copolymer (e.g., resin 1A) in blends with a linear low density polyethylene material (e.g., resins 2B, 2C or 2D), improves the shear thinning ratio ($\eta^*_{0.1}/\eta^*_{10}$) as determined by dynamic mechanical analysis, which is a measure of processability, as the amount of the first polyethylene copolymer is increased in the blend. The synergy in the shear thinning ratio for the inventive blends indicates improvements in melt fracture tendency and hence processability.

Figure 9:
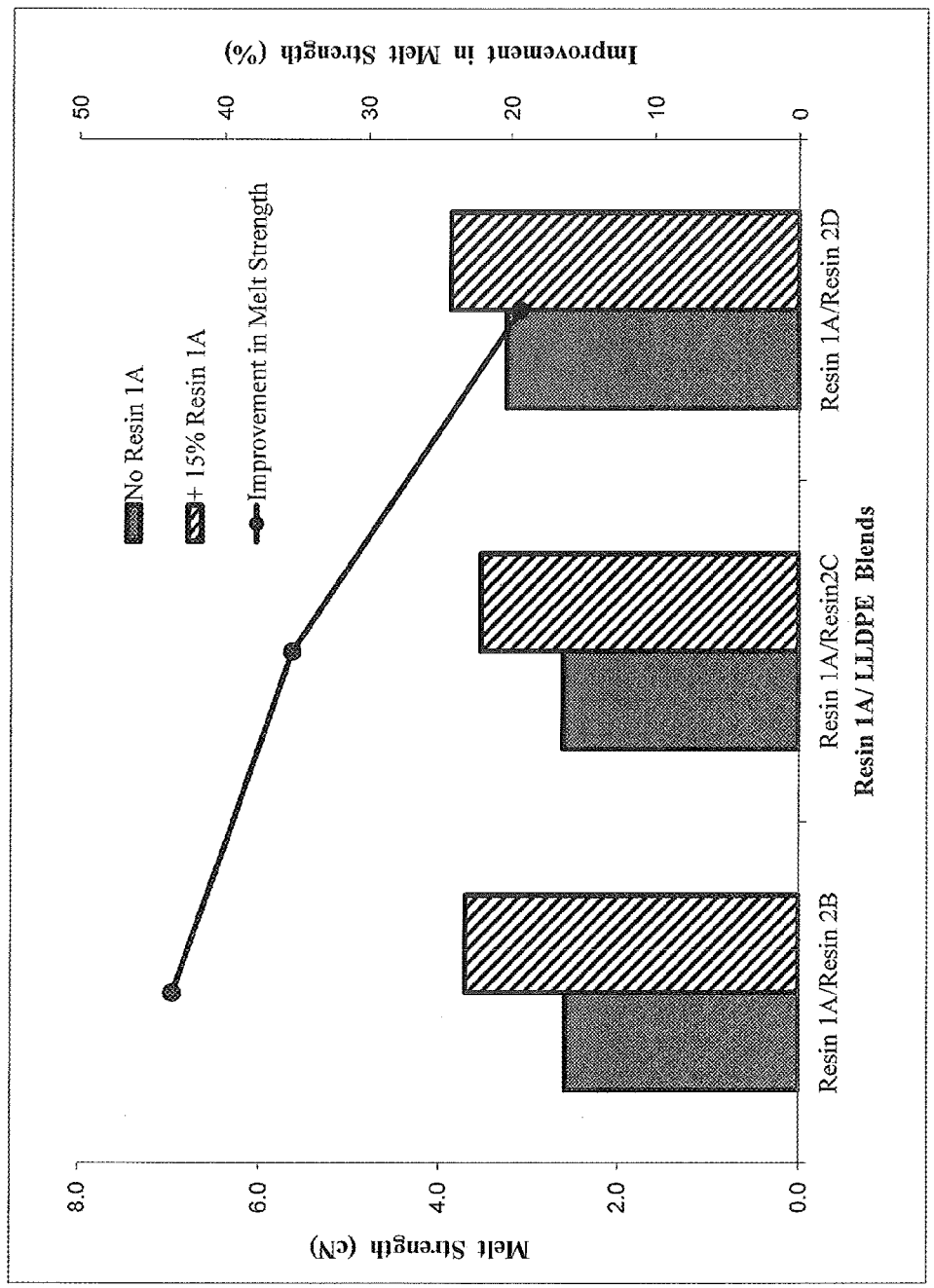
FIG. 9 shows a graph of the melt strength (cN) for blends and blend components according to various embodiments of the present invention. The Figure also shows a plot of the improvement in melt strength (in percent) for three different blends made according to the invention.

FIG. 9, shows how the melt strength (in centiNewtons, cN) of a blend with a linear low density material (e.g. resins 2B, 2C or 2D) also increases as the amount of first polyethylene copolymer (e.g. resin 1A) is increased in the blend. The improvement can be as much as from 20 to 45%, depending on the nature of the first and second polyethylene copolymer components.

In view of the above data, the resin blends disclosed herein have improved optical properties relative to either of the blend components when each is blown into film. See Tables 5, 6, 7 and 8. As shown in Table 6, 7 and 8 blending HPLDPE into a linear low density polyethylene can also improve optical properties, but this comes at the expense of other film properties, namely the dart impact value, puncture resistance and the MD direction tears.

Hence, in some embodiments, the present invention provides polymer blends having good processability which when blown into film affords good physical properties, such as impact resistance, puncture strength, tear strength and stiffness, as well as good optical properties.

In addition, use of an equivalent amount of the first polyethylene copolymer in place of a high pressure linear low density material, leads to blends having far better MD tear strength, dart impact resistance, and puncture strength without significant loss in other properties including MD modulus and MD and TD elongation at break.

In view of the forgoing, the first polyethylene copolymers described herein (e.g. resins 1A-1F) can be used as a highly successful alternative blend component to a HPLDPE material, in order to alleviate the processing deficiencies of a linear low density polyethylene material (such as for example, those having narrow molecular weight distributions and/or fractional melt indices) with better retention and balance of MD and TD film properties than HPLDPE material.

Table 9 shows the film properties of blends which are rich in the first polyethylene copolymer instead of the second ethylene copolymer (e.g. 85 wt % of 1C/15 wt % of 2B*, 2C or 2D).

TABLE 9

Film Properties (1C Rich Inventive Blends of 1C/2B*, 1C/2C and 1C/1D)

| | Inventive Blends | | |
|---|---|---|---|
| | 85 wt % 1C/15% wt % 2B* | 85 wt % 1C/15% wt % 2C | 85 wt % 1C/15% wt % 2D |
| Dart Impact (g/mil) | 468 | 539 | 464 |
| MD Tear (g/mil) | 112 | 129 | 114 |
| TD Tear (g/mil) | 405 | 449 | 444 |
| Puncture (J/mm) | 37 | 53 | 59 |
| 1% MD Secant Modulus (MPa) | 221 | 228 | 222 |
| 1% TD Secant Modulus (MPa) | 228 | 229 | 218 |
| 2% MD Secant Modulus (MPa) | 198 | 200 | 195 |
| 2% TD Secant Modulus (MPa) | 194 | 200 | 190 |
| MD Tensile Strength (MPa) | 52.4 | 56.1 | 50.9 |
| TD Tensile Strength (MPa) | 42.4 | 43.1 | 46.8 |
| MD Elongation at Break (%) | 535 | 547 | 538 |
| TD Elongation at Break (%) | 648 | 689 | 704 |
| MD Yield Strength (MPa) | 11.7 | 11.7 | 11.3 |
| TD Yield Strength (MPa) | 11.2 | 11.5 | 11.4 |
| MD Elongation at Yield (%) | 14 | 14 | 13 |
| TD Elongation at Yield (%) | 15 | 15 | 15 |
| Haze (%) | 12.8 | 13.1 | 13.3 |
| Gloss (%) | 44 | 43 | 42 |
| Cold Seal Strength: | | | |
| SIT (° C.) | 117 | 117 | 116 |
| Maximum Force (N) | 14.1 | 14.4 | 15.2 |
| Temperature at Max. Force (° C.) | 150 | 140 | 150 |
| Extruder Pressure (psi) | 4025-4060 | 3820-3865 | 3785-3820 |
| Specific Output Rate (lb/hr/rpm) | 2.56 | 2.50 | 2.56 |
| Specific Power (lb/hr/Amp) | 2.44 | 2.56 | 2.56 |
| Specific Energy (W/lb/hr) | 76.7 | 74.5 | 72.9 |

Table 9 shows that the blends of resin 1C with resin 2B*, resin 1C with resin 2C and resin 1C with resin 2D in a 85/15 weight percent ratio have similar dart impact, MD and TD tear, puncture resistance, MD and TD secant modulus, tensile properties, haze and gloss. The three inventive blends of 85 wt % of first polyethylene copolymer and 15 wt % of second polyethylene copolymer also show similar extrusion parameters in the film conversion. Such trends indicate that the film properties and processability of the blends which are rich in the first polyethylene copolymer such as 1C do not change significantly, regardless of the type of the second copolymer (e.g. a linear low density polyethylene, LLDPE) used in the blends. The first polyethylene copolymer described herein (e.g. resins 1A-1F) can be used with a wide range of second polyethylene copolymers in blends to achieve a good balance of resin processability and physical properties in film applications.

The present invention has been described with reference to certain details of particular embodiments thereof. It is not intended that such details be regarded as limitations upon the scope of the invention except insofar as and to the extent that they are included in the accompanying claims.

What is claimed is:

1. A polymer blend comprising:
   a) from about 5 to about 95 wt % of a first polyethylene copolymer having a density of from 0.916 to 0.936 g/cm$^3$, a melt index ($I_2$) of from about 0.1 to about 2.0 g/10 min, a melt flow ratio ($I_{21}/I_2$) of from about 32 to about 50, a molecular weight distribution ($M_w/M_n$) of from about 3.6 to about 6.5, a reverse comonomer distribution profile as determined by GPC-FTIR, a multimodal TREF profile, a composition distribution breadth index CDBI$_{50}$ of from 50 wt % to 75 wt % as determined by TREF and which further satisfies the relationship: $(M_w/M_n) \geq 72 [(I_{21}/I_2)^{-1} + 10^{-6} (M_n)]$; and
   b) from about 95 to about 5 wt % of a second polyethylene copolymer which is a linear low density polyethylene (LLDPE) different from the first polyethylene copolymer and having a density of from 0.912 to 0.940 g/cm$^3$, a melt index ($I_2$) of from about 0.2 to about 5.0 g/10 min, and a molecular weight distribution ($M_w/M_n$) of from about 1.5 to about 6.0.

2. The polymer blend of claim 1, wherein the first polyethylene copolymer has a $\delta^{XO}$ of from about 55° to about 70°; wherein $\delta^{XO}$ is the phase angle at which the complex modulus (G*) and the complex viscosity (η*) are numerically equivalent in a plot of phase angle vs complex modulus and complex viscosity as determined by dynamic mechanical analysis.

3. The polymer blend of claim 1, wherein the first polyethylene copolymer satisfies the relationship: $\delta^{XO} \leq 80.7 - (CDBI_{50})/(M_w/M_n)$ at a $\delta^{XO}$ of from about 55° to about 70°; wherein $\delta^{XO}$ is the phase angle at which the complex modulus (G*) and the complex viscosity (η*) are numerically equivalent in a plot of phase angle vs complex modulus and complex viscosity as determined by dynamic mechanical analysis.

4. The polymer blend of claim 1, wherein the first polyethylene copolymer satisfies the relationship: $\delta^{XO} \leq 83.0 - 1.25 (CDBI_{50})/(M_w/M_n)$; wherein $\delta^{XO}$ is the phase angle at which the complex modulus (G*) and the complex viscosity (η*) are numerically equivalent in a plot of phase angle vs complex modulus and complex viscosity as determined by dynamic mechanical analysis.

5. The polymer blend of claim 1, wherein the first polyethylene copolymer has a multimodal TREF profile comprising two intensity maxima at elution temperatures T(low) and T(high); wherein T(low) is from about 65° C. to about 85° C., and T(high) is from about 90° C. to about 98° C.

6. The polymer blend of claim 1, wherein the blend comprises from about 5 to about 50 wt % of the first polyethylene copolymer and from about 95 to about 50 wt % of the second polyethylene copolymer.

7. The polymer blend of claim 1, wherein the second polyethylene copolymer has a melt flow ratio ($I_{21}/I_2$) of less than about 36.

8. The polymer blend of claim 1, wherein the first polyethylene copolymer has a melt index ($I_2$) of from about 0.25 to about 0.80 g/10 min.

9. The polymer blend of claim 1, wherein the first polyethylene copolymer has a density of from 0.917 to 0.927 g/cm$^3$.

10. The polymer blend of claim 1, wherein the first polyethylene copolymer has a Z-average molecular weight distribution ($M_z/M_w$) of from about 2.0 to about 4.0.

11. The polymer blend of claim 1, wherein the first polyethylene copolymer has an amount eluting at a temperature of from about 90° C. to about 105° C. of from about 5 to about 30 weight percent as determined by TREF.

12. The polymer blend of claim 1, wherein the first polyethylene copolymer has an amount eluting at a temperature of above about 100° C. of about 0 weight percent as determined by TREF.

13. The polymer blend of claim 1, wherein the second polyethylene copolymer has a density of from 0.916 to 0.935 g/cm$^3$.

14. The polymer blend of claim 1, wherein the second polyethylene copolymer has a CDBI$_{50}$ of at least about 50 wt %.

15. The polymer blend of claim 1, wherein the second polyethylene copolymer has a molecular weight distribution ($M_w/M_n$) of from about 1.7 to about 5.0.

16. A film structure comprising a least one layer comprising the polymer blend of claim 1.

17. A blown film comprising the polymer blend of claim 1, the film having a haze of less than about 10% and a gloss at 45° of greater than about 55%.

18. A cast film comprising the polymer blend of claim 1, the film having a haze of less than about 10% and a gloss at 45° of greater than about 55%.

19. The polymer blend of claim 1, wherein the second polyethylene copolymer does not satisfy the relationship: $(M_w/M_n) \geq 72[(I_{21}/I_2)^{-1} + 10^{-6}(M_n)]$.

* * * * *